United States Patent
Yoshizawa

(10) Patent No.: US 8,281,113 B2
(45) Date of Patent: Oct. 2, 2012

(54) PROCESSOR HAVING ALU WITH DYNAMICALLY TRANSPARENT PIPELINE STAGES

(75) Inventor: Hideki Yoshizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 519 days.

(21) Appl. No.: 12/618,954

(22) Filed: Nov. 16, 2009

(65) Prior Publication Data

US 2010/0058030 A1   Mar. 4, 2010

Related U.S. Application Data

(63) Continuation of application No. PCT/JP2007/060161, filed on May 17, 2007.

(51) Int. Cl.
G06F 7/38 (2006.01)
G06F 9/00 (2006.01)
G06F 9/44 (2006.01)
G06F 15/00 (2006.01)

(52) U.S. Cl. ........................................ 712/226
(58) Field of Classification Search .................. None
See application file for complete search history.

(56) References Cited

U.S. PATENT DOCUMENTS

| | | | |
|---|---|---|---|
| 5,619,664 A | 4/1997 | Glew | |
| 6,826,674 B1 | 11/2004 | Sato | |
| 7,020,763 B2 * | 3/2006 | Saulsbury et al. | 712/24 |
| 7,069,376 B2 | 6/2006 | Mathewson et al. | |
| 7,076,682 B2 * | 7/2006 | Jacobson | 713/600 |
| 2002/0023201 A1 * | 2/2002 | Saulsbury et al. | 712/225 |
| 2004/0054875 A1 | 3/2004 | Segelken | |
| 2004/0251954 A1 | 12/2004 | Mathewson et al. | |
| 2005/0251645 A1 | 11/2005 | Roussel et al. | |
| 2006/0041610 A1 | 2/2006 | Hokenek et al. | |
| 2006/0253659 A1 | 11/2006 | Greenfield et al. | |
| 2008/0133947 A1 * | 6/2008 | Shimada et al. | 713/320 |

FOREIGN PATENT DOCUMENTS

| | | |
|---|---|---|
| JP | 54-143036 | 11/1979 |
| JP | 60-123930 | 7/1985 |
| JP | 4-238533 | 8/1992 |
| JP | 2003-216416 | 7/2003 |
| JP | 2004-102988 | 4/2004 |
| JP | 2005-11324 | 1/2005 |
| KR | 10-2006-0133086 | 12/2006 |
| WO | 2005091130 | 9/2005 |
| WO | 2006-092792 | 9/2006 |

OTHER PUBLICATIONS

Supplementary European Search Report dated Feb. 3, 2011, from corresponding European Application No. 07 74 3596.
Korean Notice of Preliminary Rejection dated Mar. 15, 2011, from corresponding Korean Application No. 10-2009-7019456.
International Search Report dated Aug. 21, 2007, from the corresponding International Application.

* cited by examiner

*Primary Examiner* — Corey S Faherty
(74) *Attorney, Agent, or Firm* — Katten Muchin Rosenman LLP

(57) ABSTRACT

An arithmetic-logic unit for performing an operation of a prescribed bit length in an execution stage of a processor includes a plurality of sub-arithmetic-logic units which perform in respectively different pipeline stages sub-operations created by decomposing the operation of the prescribed bit length in a bit length direction, and a plurality of pipeline registers provided so as to separate the pipeline stages from each other, wherein each of the pipeline registers operates in such a manner as to be switchable between two operation modes, a flip-flop mode in which an output value is updated in synchronism with an input trigger and a transparent mode in which an input value is directly output.

6 Claims, 68 Drawing Sheets

FIG. 16

| | | | |
|---|---|---|---|
| INSTRUCTION TYPE 1 | INSTRUCTION CODE | INSTRUCTION OPERAND (R0, R1, S0) | add r0,r1,r2 | r0+r1⇒r2 |
| INSTRUCTION TYPE 2 | INSTRUCTION CODE | INSTRUCTION OPERAND (S0) | abs r2 | \|r2\|⇒r2 |
| INSTRUCTION TYPE 3 | INSTRUCTION CODE | INSTRUCTION OPERAND (R0, ImmD, S0) | add r0,-10,r2 | r0-10⇒r2 |
| INSTRUCTION TYPE 4 | INSTRUCTION CODE | INSTRUCTION OPERAND (Ridx, ImmA, S0) | ld *(r0,10),r2 | *(r0+10)⇒r2 |
| INSTRUCTION TYPE 5 | INSTRUCTION CODE | INSTRUCTION OPERAND (ImmD) | jp #100 | #100⇒pc |
| INSTRUCTION TYPE 6 | INSTRUCTION CODE | INSTRUCTION OPERAND (R0, ImmD) | jp r0,#100 | r0+#100⇒pc |

FIG. 17A

| | |
|---|---|
| INSTRUCTION 1 | add r0,r1,r2 |
| INSTRUCTION 2 | abs r2 |
| INSTRUCTION 3 | add r0,-10,r2 |
| INSTRUCTION 4 | ld *(r0,10),r2 |
| INSTRUCTION 5 | jp #100 |
| INSTRUCTION 6 | jp r0,#100 |

FETCH SEQUENCE ↓

FIG. 17B

| | CodeS | R0#S | R1#S | Ridx# | ImmD# | ImmA# |
|---|---|---|---|---|---|---|
| INSTRUCTION 1 | add,r2 | r0 | r1 | | | |
| INSTRUCTION 2 | abs,r2 | r2 | | | | |
| INSTRUCTION 3 | add,r2 | r0 | | | -10 | |
| INSTRUCTION 4 | ld,r2 | | | r0 | | +10 |
| INSTRUCTION 5 | jp | | | | #100 | |
| INSTRUCTION 6 | jp | r0 | | | #100 | |

ISSUE SEQUENCE ↓

| SAA | r0,r1,r2 | r0−r1⇒r7 ; |r7|⇒r7 ; r2+r7⇒r2

| sub | r0,r1,r7 |
| abs | r7 |
| add | r2,r7,r2 |
| NOP | |

| CodeM | R0#M | R1#M |
|---|---|---|
| sub,r7 | r0 | r1 |
| abs | r7 | |
| add,r2 | r2 | r7 |
| nop | | |

ISSUE SEQUENCE

PROCESSOR HAVING ALU WITH DYNAMICALLY TRANSPARENT PIPELINE STAGES

CROSS REFERENCE TO RELATED APPLICATION

The present application is a continuation application based on International application No. PCT/JP2007/060161, filed on May 17, 2007.

TECHNICAL FIELD

The present invention relates to a technique for configuring a processor capable of parallel execution of a plurality of instructions.

BACKGROUND ART

VLIW (Very Long Instruction Word) processors and superscalar processors are processors known for achieving enhanced processing performance through simultaneous execution of a plurality of instructions.

FIG. 1 is a diagram schematically illustrating the configuration of a prior art VLIW processor. The VLIW processor 900 includes a fetch unit 902 which fetches a VLIW instruction from an instruction memory 901 in an instruction fetch stage (IF), decoders 911 to 914 which decode the VLIW instruction into a plurality of arithmetic-logic instructions in an instruction decode stage (ID), a plurality of arithmetic-logic units (ALUs) 921 to 924 which execute the plurality of arithmetic-logic instructions in an execution stage (EX), and a register 930 which holds the results of the operations in a writeback stage (WB).

FIG. 2 is a diagram schematically illustrating the configuration of a prior art superscalar processor. The superscalar processor 940 includes an instruction dispatcher 941 between the instruction fetch stage and the instruction decode stage. The instruction dispatcher 941 dynamically changes the number of instruction executions and the assignment of instructions to the arithmetic-logic units 921 to 924 in accordance with the usage conditions of the arithmetic-logic units 921 to 924.

Following patent document 1 discloses a data processing apparatus in which a plurality of data paths capable of operating independently of each other are formed using a plurality of processing units whose input/output interfaces are reconfigurable.

Patent document 1: Japanese Unexamined Patent Publication No. 2004-102988

SUMMARY

According to a first mode of the present invention, there is provided an arithmetic-logic unit for performing an operation of a prescribed bit length in an execution stage of a processor, wherein the arithmetic-logic unit includes a plurality of sub-arithmetic-logic units which perform in respectively different pipeline stages sub-operations created by decomposing the operation of the prescribed bit length in a bit length direction, and a plurality of pipeline registers provided so as to separate the pipeline stages from each other.

By decomposing one operation in the above manner and executing it using the technique of pipelining, a plurality of operations can be performed in parallel using a single arithmetic-logic unit.

Accordingly, a plurality of operations can be executed in parallel using fewer arithmetic-logic units than in the prior art, and the data path interconnections connecting the arithmetic-logic units to the register file and memory means can be reduced.

That is, in the prior art processor, the data paths connecting the plurality of arithmetic-logic units to the register file, etc., are provided in a dedicated fashion so that each data path is occupied by the corresponding arithmetic-logic unit throughout the cycle (hereinafter called the "basic cycle") during which that arithmetic-logic unit performs one operation; on the other hand, according to the present invention, since the plurality of operations are executed in parallel by pipelining using a single arithmetic-logic unit, accesses the register file, etc., for performing the respective operations occur at respectively different times. That is, accordingly to the present invention, since the accesses made to the register file, etc., during the parallel execution of the plurality of operations are time-division multiplexed within one basic cycle, a single data path can be shared among the plurality of operations.

The pipeline registers may each be implemented as a storage device that operates in such a manner as to be switchable between two operation modes, a flip-flop mode in which an output value is updated in synchronism with an input trigger and a transparent mode in which an input value is directly output. By configuring the pipeline registers in the above manner, the number of pipeline stages to be used in the pipeline processing performed by the arithmetic-logic unit can be changed as needed. It thus becomes possible to save power consumption by adjusting the number of instructions that the arithmetic-logic unit executes in parallel and by performing processing with a minimum number of instructions.

According to a second mode of the present invention, there is provided a processor that performs the operation of the prescribed bit length in the execution stage by using the arithmetic-logic unit of the first mode. Here, the sub-operations to be performed by the sub-arithmetic-logic units are each of a bit length equal to the prescribed bit length divided by N (N is an integer not smaller than 2), and the processor further includes a clock generating unit which drives the pipeline stages at an operating frequency having a cycle period equal in length to one-Nth of a period taken to execute one operation of the prescribed bit length.

According to a third mode of the present invention, there is provided a processor architecture for a processor that performs an operation of a prescribed bit length in an execution stage by using an arithmetic-logic unit. In this architecture, the arithmetic-logic unit is constructed using sub-arithmetic-logic units which perform in respectively different pipeline stages sub-operations created by decomposing the operation of the prescribed bit length in a bit length direction, and pipeline registers provided so as to separate the pipeline stages from each other, and storage means for storing operands to be supplied to the arithmetic-logic unit and operation results supplied from the arithmetic-logic unit is constructed using a storage device having such an access latency as to allow accesses by the pipeline stages operating at an operating frequency having a cycle period equal in length to one-Nth of a period taken to execute one operation of the prescribed bit length.

According to the present invention, the interconnection area and power consumption of a processor will be reduced. Therefore, an arithmetic-logic unit and a processor according to the present invention may be applied preferably to a LSI required to be power saving, such as a LSI for a cellular telephone, or to a low-cost electronic component.

The object and advantages of the invention can be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 16 is a diagram illustrating by way of example the types of instructions to be decoded by the processor.

FIG. 17A is a diagram (part 1) illustrating the decoding performed by a single instruction decoding unit.

FIG. 17B is a diagram (part 2) illustrating the decoding performed by the single instruction decoding unit.

DESCRIPTION OF EMBODIMENTS

Figure 1:
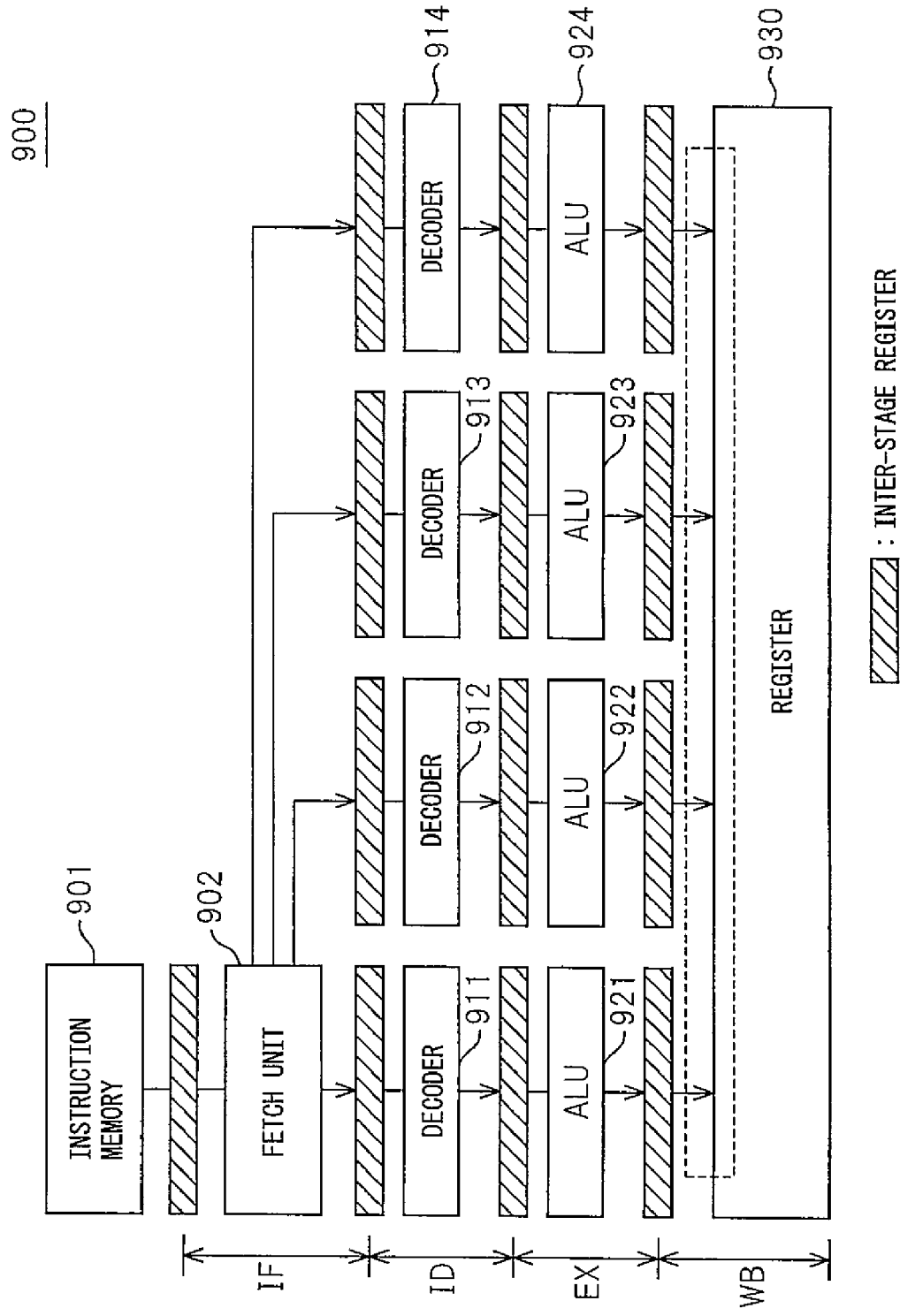
FIG. 1 is a diagram schematically illustrating the configuration of a prior art VLIW processor.
Figure 2:
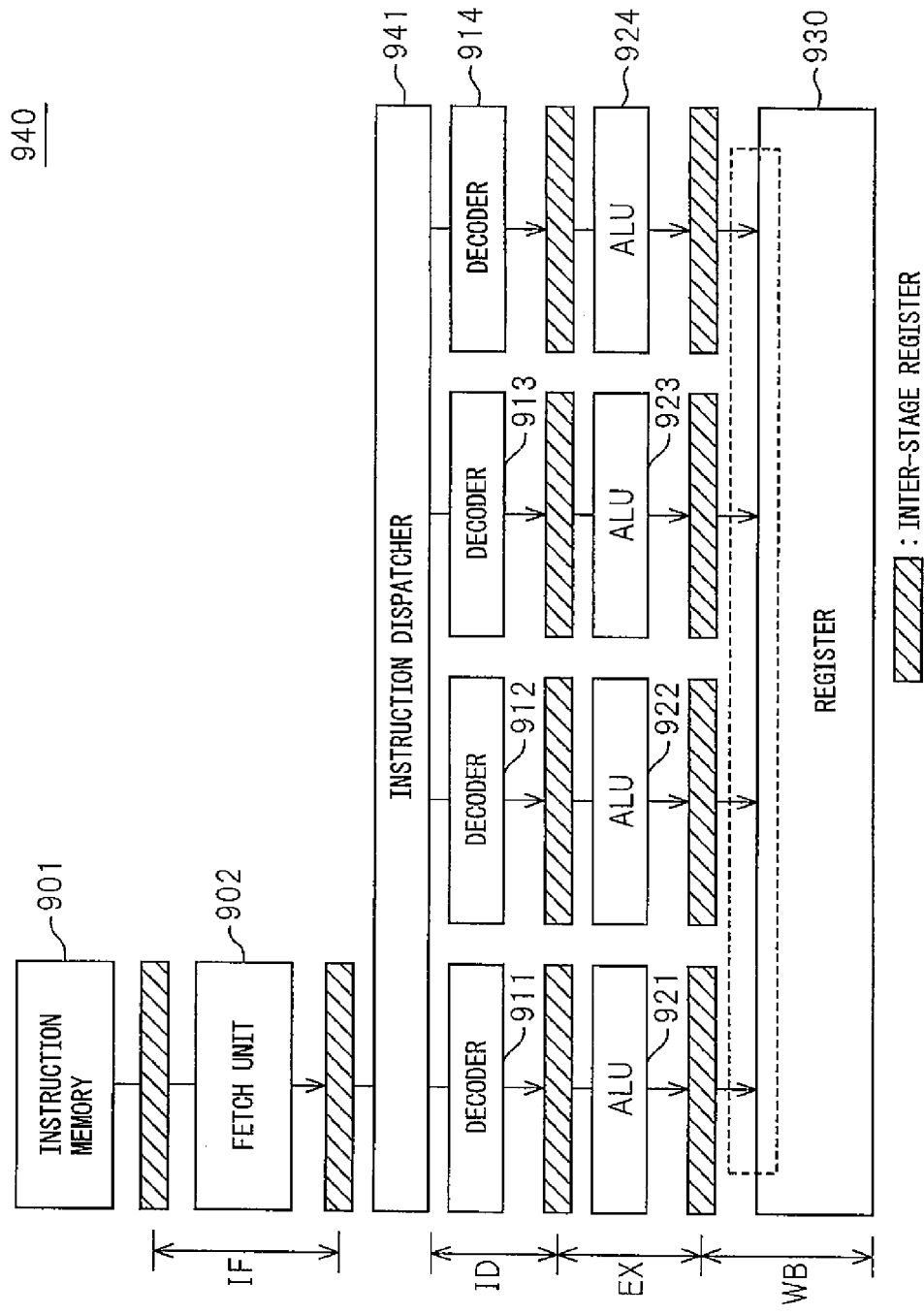
FIG. 2 is a diagram schematically illustrating the configuration of a prior art superscalar processor.
Figure 3:
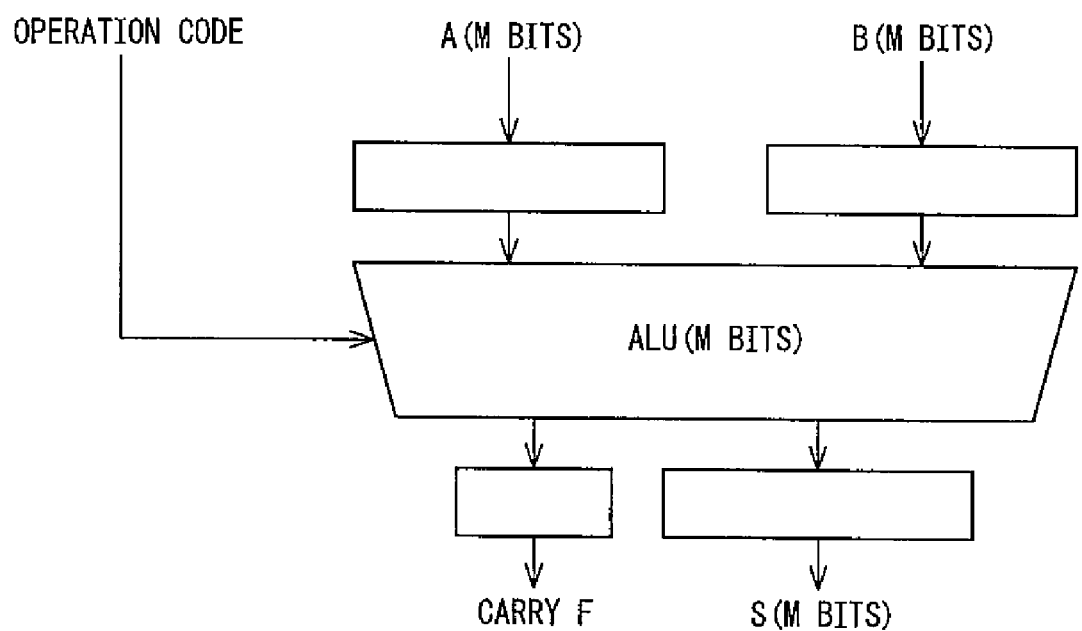
FIG. 3 is a schematic diagram of a prior art arithmetic-logic unit.
Figure 4:
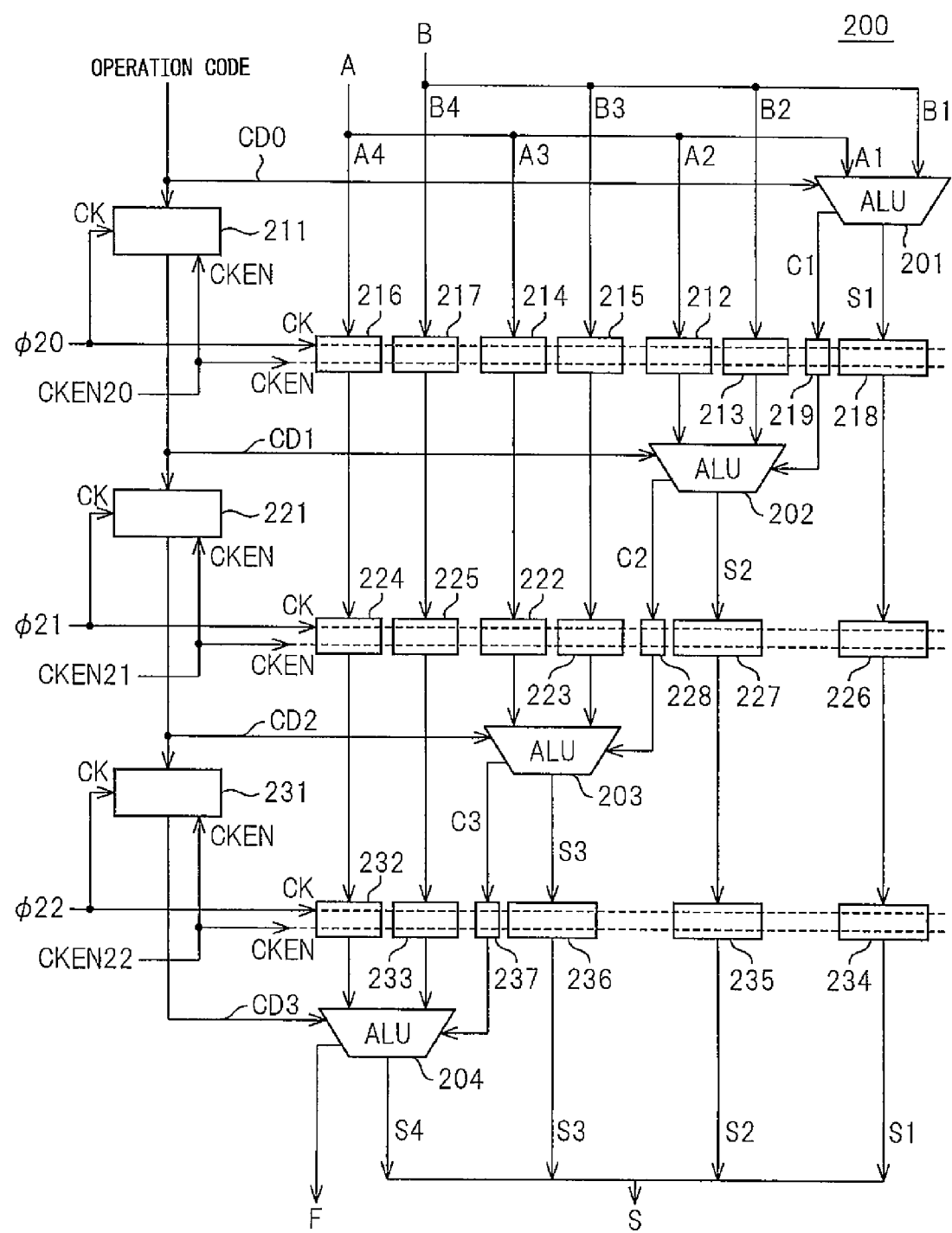
FIG. 4 is a diagram illustrating the basic configuration of an arithmetic-logic unit according to the present invention.

The basic operation of an arithmetic-logic unit according to the present invention will be described with reference to FIGS. 3 to 9. FIG. 3 is a schematic diagram of a prior art arithmetic-logic unit that performs an operation of a prescribed bit length, i.e., M bits. FIG. 4 is a diagram illustrating the basic configuration of the arithmetic-logic unit according to the present invention which performs an operation of the same bit length as the prior art arithmetic-logic unit depicted in FIG. 3. The arithmetic-logic unit depicted in FIG. 3 takes an operation code and first and second M-bit input data A and B as inputs, performs between the M-bit data A and B an arithmetic or logic operation specified by the operation code, and outputs the result S of the M-bit operation and a flag F indicating the generation of a carry, etc.

The arithmetic-logic unit 200 depicted in FIG. 4 takes an operation code and first and second M-bit input data A and B as inputs, performs between the M-bit data A and B an arithmetic or logic operation specified by the operation code, and outputs the result S of the M-bit operation and a flag F indicating the generation of a carry, etc.

The arithmetic-logic unit 200 includes first to fourth sub-arithmetic-logic units 201 to 204 which perform sub-operations created by decomposing the M-bit operation in the bit length direction. In the configuration example depicted in FIG. 4, the M-bit operation is decomposed into four sub-operations in the bit length direction, and the four sub-arithmetic-logic units are provided to perform the respective sub-operations. However, the number of sub-operations, i.e., the number of sub-arithmetic-logic units, is not limited to 4, but may be any number not smaller than 2.

The operation codes specifying the types of operation to be performed by the first to fourth sub-arithmetic-logic units 201 to 204 are input to the respective sub-arithmetic-logic units 201 to 204. The first sub-arithmetic-logic unit 201 takes as inputs the data A1 and B1 representing the first (M1)-bit portions from bit 0 to bit (M1-1) of the respective M-bit input data A and B, performs the operation specified by the operation code, and outputs the result S1 of the M1-bit operation and a carry C1.

The second sub-arithmetic-logic unit 202 takes as inputs the carry C1 from the first sub-arithmetic-logic unit 201 and the data A2 and B2 representing the succeeding (M2-M1)-bit portions from bit M1 to bit (M2-1) of the respective M-bit input data A and B, performs the operation specified by the operation code, and outputs the result S2 of the (M2-M1)-bit operation and a carry C2.

The third sub-arithmetic-logic unit 203 takes as inputs the carry C2 from the second sub-arithmetic-logic unit 202 and the data A3 and B3 representing the succeeding (M3-M2)-bit portions from bit M2 to bit (M3-1) of the respective M-bit input data A and B, performs the operation specified by the operation code, and outputs the result S3 of the (M3-M2)-bit operation and a carry C3.

The fourth sub-arithmetic-logic unit 204 takes as inputs the carry C3 from the third sub-arithmetic-logic unit 203 and the data A4 and B4 representing the succeeding (M-M3)-bit portions from bit M3 to bit (M-1) of the respective M-bit input data A and B, performs the operation specified by the operation code, and outputs the result S4 of the (M-M3)-bit operation and a flag F indicating the result of a carry decision or zero decision.

In the following description, the portion of multiple-bit data D from a lower-order bit m to a higher-order bit n may sometimes be designated as D[n:m].

The arithmetic-logic unit 200 executes a plurality of M-bit operations in parallel by pipelining with the sub-arithmetic-logic units 201 to 204 executing different sub-operations of the same M-bit operation in different clock cycles and executing sub-operations of different M-bit operations in the same clock cycle. For this purpose, the arithmetic-logic unit 200 includes pipeline registers 211 to 219, 221 to 228, and 231 to 237 for holding the input data A2 to A4 and B2 to B4, the operation codes, and the operation results from the sub-arithmetic-logic units 201 to 203. The sub-arithmetic-logic units 201 to 204 execute the respective operations in a plurality of pipeline stages separated by the respective groups of pipeline registers 211 to 219, 221 to 228, and 231 to 237.

The pipeline stages in which the first to fourth sub-arithmetic-logic units 201 to 204 perform their operations are referred to as the first to fourth pipeline stages, respectively. The pipeline registers 211 to 219 are provided between the first and second pipeline stages, the pipeline registers 221 to 228 are provided between the second and third pipeline stages, and pipeline registers 231 to 237 are provided between the third and fourth pipeline stages.

With the pipeline registers 211 to 219, 221 to 228, and 231 to 237 thus provided, the arithmetic-logic unit 200 accomplishes the pipeline processing as described below. It is assumed here that operation codes COM#i and M-bit input values A(i) and B(i) are input to the arithmetic-logic unit 200 in four consecutive cycles Ti (i=0, 1, 2, 3). Each pipeline register updates its stored value by latching an output value from the preceding pipeline stage in synchronism with cycle Ti.

In cycle T3, the operation code COM#3 and the input values A(3) [(M1-1):0] and B(3) [(M1-1):0] are input to the first sub-arithmetic-logic unit 201. The first sub-arithmetic-logic unit 201 takes A(3) [(M1-1):0] and B(3) [(M1-1):0] as inputs, and performs the operation specified by the operation code COM#3.

During this time, the pipeline register 211 holds the operation code COM#2 given to the arithmetic-logic unit 200 in cycle T2.

Further, the pipeline register 212 holds A(2) [(M2-1):M1], the pipeline register 213 holds B(2) [(M2-1):M1], the pipeline register 214 holds A(2) [(M3-1):M2], the pipeline register 215 holds B(2) [(M3-1):M2], the pipeline register 216 holds A(2) [(M-1):M3], and the pipeline register 217 holds B(2) [(M-1):M3].

On the other hand, the pipeline register 218 holds the result S1(2) of the operation performed in cycle T2 by the first sub-arithmetic-logic unit 201, and the pipeline register 219 holds the carry C1(2) from the operation result. In cycle T2, the first sub-arithmetic-logic unit 201 took A(2) [(M1-1):0] and B(2) [(M1-1):0] as inputs, and performed the operation specified by the operation code COM#2.

Further, in cycle T3, the operation code COM#2 held in the pipeline register 211, the input values A(2) [(M2-1):M1] and B(2) [(M2-1):M1] held in the pipeline registers 212 and 213, and the carry C1(2) from the operation result produced in cycle T2 by the first sub-arithmetic-logic unit 201 are input to the second sub-arithmetic-logic unit 202. The second sub-arithmetic-logic unit 202 takes the input values A(2) [(M2-1):M1] and B(2) [(M2-1):M1] and the carry C1(2) as inputs, and performs the operation specified by the operation code COM#2.

During this time, the pipeline register 221 holds the operation code COM#1 given to the arithmetic-logic unit 200 in cycle T1. Further, the pipeline register 222 holds A(1) [(M3-1):M2], the pipeline register 223 holds B(1) [(M3-1):M2], the pipeline register 224 holds A(1) [(M-1):M3], and the pipeline register 225 holds B(1) [(M-1):M3].

On the other hand, the pipeline register 226 holds the result S1(1) of the operation performed in cycle T1 by the first sub-arithmetic-logic unit 201. In cycle T1, the first sub-arithmetic-logic unit 201 takes A(1) [(M1-1):0] and B(1) [(M1-1):0] as inputs, and performs the operation specified by the operation code COM#1.

The pipeline register 227 holds the result S2(1) of the operation performed in cycle T2 by the second sub-arithmetic-logic unit 202, and the pipeline register 228 holds its carry C2(1). In cycle T2, the second sub-arithmetic-logic unit 202 takes as inputs the carry C1(1) from the operation result produced in cycle T1 by the first sub-arithmetic-logic unit 201 as well as A(1) [(M2-1):M1] and B(1) [(M2-1):M1], and performs the operation specified by the operation code COM#1.

In cycle T3, the operation code COM#1 held in the pipeline register 221, the input values A(1) [(M3-1):M2] and B(1) [(M3-1):M2] held in the pipeline registers 222 and 223, and the carry C2(1) from the operation result produced in cycle T2 by the second sub-arithmetic-logic unit 202 are input to the third sub-arithmetic-logic unit 203. The third sub-arithmetic-logic unit 203 takes the input values A(1) [(M3-1):M2] and B(1) [(M3-1):M2] and the carry C2(1) as inputs, and performs the operation specified by the operation code COM#1.

During this time, the pipeline register 231 holds the operation code COM#0 given to the arithmetic-logic unit 200 in cycle T0. Further, the pipeline register 232 holds A(0) [(M-1):M3], and the pipeline register 233 holds B(0) [(M-1):M3].

On the other hand, the pipeline register 234 holds the result S1(0) of the operation performed in cycle T0 by the first sub-arithmetic-logic unit 201. In cycle T0, the first sub-arithmetic-logic unit 201 takes A(0) [(M1-1):0] and B(0) [(M1-1):0] as inputs, and performs the operation specified by the operation code COM#0.

The pipeline register 235 holds the result S2(0) of the operation performed in cycle T1 by the second sub-arithmetic-logic unit 202. In cycle T1, the second sub-arithmetic-logic unit 202 takes as inputs the carry C1(0) from the operation result produced in cycle T0 by the first sub-arithmetic-logic unit 201 as well as A(0) [(M2-1):M1] and B(0) [(M2-1):M1], and performs the operation specified by the operation code COM#0.

The pipeline register 236 holds the result S3(0) of the operation performed in cycle T2 by the third sub-arithmetic-logic unit 203, and the pipeline register 237 holds its carry C3(0). In cycle T2, the third sub-arithmetic-logic unit 203 takes as inputs the carry C2(0) from the operation result produced in cycle T1 by the second sub-arithmetic-logic unit 202 as well as A(0) [(M3-1):M2] and B(0) [(M3-1):M2], and performs the operation specified by the operation code COM#0.

In cycle T3, the operation code COM#0 held in the pipeline register 231, the input values A(0) [(M-1):M3] and B(0) [(M-1):M3] held in the pipeline registers 232 and 233, and the carry C3(0) from the operation result produced in cycle T2 by the third sub-arithmetic-logic unit 203 are input to the fourth sub-arithmetic-logic unit 204. The fourth sub-arithmetic-logic unit 204 takes the input values A(0) [(M-1):M3] and B(0) [(M-1):M3] and the carry C3(0) as inputs, and performs the operation specified by the operation code COM#0. Then, its operation result S4(0) and flag F are output.

As can be seen from the above description, in the operation specified by the operation code COM#0, the operation corresponding to the portion from bit 0 to bit (M1-1) is performed in cycle T0 by the first sub-arithmetic-logic unit 201, the operation corresponding to the portion from bit M1 to bit (M2-1) is performed in cycle T1 by the second sub-arithmetic-logic unit 202, the operation corresponding to the portion from bit M2 to bit (M3-1) is performed in cycle T2 by the third sub-arithmetic-logic unit 203, and the operation corresponding to the portion from bit M3 to bit (M-1) is performed in cycle T3 by the fourth sub-arithmetic-logic unit 204. Then, in cycle T3, the results of the respective operations are simultaneously output from the pipeline registers 234 to 236 and the sub-arithmetic-logic unit 204.

It can also been seen that, in cycle T3, the first to fourth sub-arithmetic-logic units 201 to 204 are performing in parallel the different operations COM#0 to COM#3 input to the arithmetic-logic unit 200 in the respective cycles T3 to T0, i.e., the arithmetic-logic unit 200 is performing parallel processing.

Figure 5:
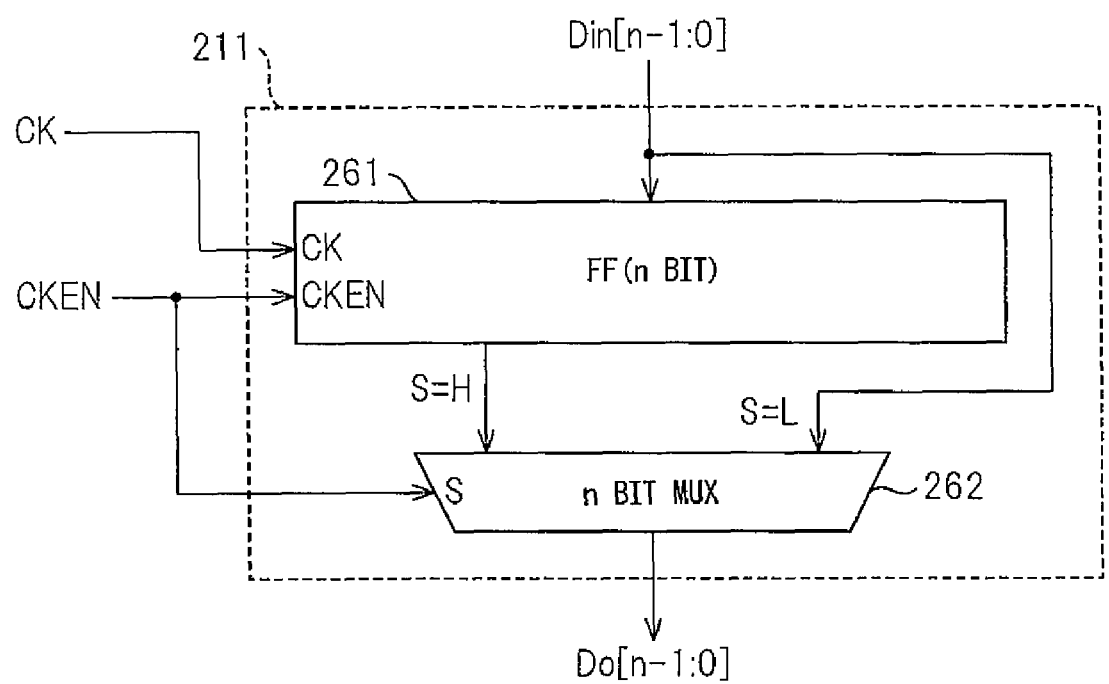
FIG. 5 is a diagram schematically illustrating the configuration of a pipeline register depicted in FIG. 4.

FIG. 5 is a schematic diagram illustrating the configuration of the pipeline register 211 depicted in FIG. 4. The configuration is the same for the other pipeline registers 212 to 219, 221 to 228, and 231 to 237. The pipeline register 211 includes a flip-flop (FF) 261 which latches n-bit input data Din in synchronism with a clock signal CK, and a multiplexer (MUX) 262 which, in accordance with the value of a mode switching signal CKEN, selects either the output value of the flip-flop 261 or the input data Din for output from the pipeline register 211. In the illustrated example, when CKEN="H", the output value of the flip-flop 261 is selected for output from the pipeline register 211, and when CKEN="L", the input data is directly output. Accordingly, when CKEN=H, the pipeline register 211 operates in a flip-flop mode in which the output value is updated in synchronism with the input clock CK, and when CKEN=L, it operates in a transparent mode in which the input value is directly output.

In the arithmetic-logic unit 200 depicted in FIG. 4, the same clock signal $\phi 20$ and the same mode switching signal CKEN20 are supplied to all the pipeline registers 211 to 219 provided between the first and second pipeline stages. Likewise, the same clock signal $\phi 21$ and the same mode switching signal CKEN21 are supplied to all the pipeline registers 221 to 228 provided between the second and third pipeline stages. Further, the same clock signal $\phi 22$ and the same mode switching signal CKEN22 are supplied to all the pipeline registers 231 to 237 provided between the third and fourth pipeline stages.

By varying the values of the respective mode switching signals CKEN20 to CKEN22 and thereby changing the operation mode of the pipeline registers, the number of pipeline stages of the arithmetic-logic unit 200, i.e., the number of operations to be executed in parallel by the arithmetic-logic unit 200, can be changed. Hereinafter, the number of operations to be executed in parallel by the arithmetic-logic unit 200 may sometimes be called the "number of parallel operations."

If all the pipeline registers are operated in the flip-flop mode, the number of pipeline stages of the arithmetic-logic unit 200 is 4, and the arithmetic-logic unit 200 can perform four different operations in parallel.

If the pipeline registers 211 to 219 and 231 to 237 are operated in the transparent mode, and the pipeline registers 221 to 228 in the flip-flop mode, the first and second pipeline stages separated by the pipeline registers 211 to 219 merge into a single pipeline stage, and the third and fourth pipeline stages separated by the pipeline registers 231 to 237 also merge into a single pipeline stage, so that the number of pipeline stages of the arithmetic-logic unit 200 is 2.

If all the pipeline registers are operated in the transparent mode, the arithmetic-logic unit 200 no longer performs pipeline processing, and the number of parallel operations in the arithmetic-logic unit 200 is then 1.

Figure 6:
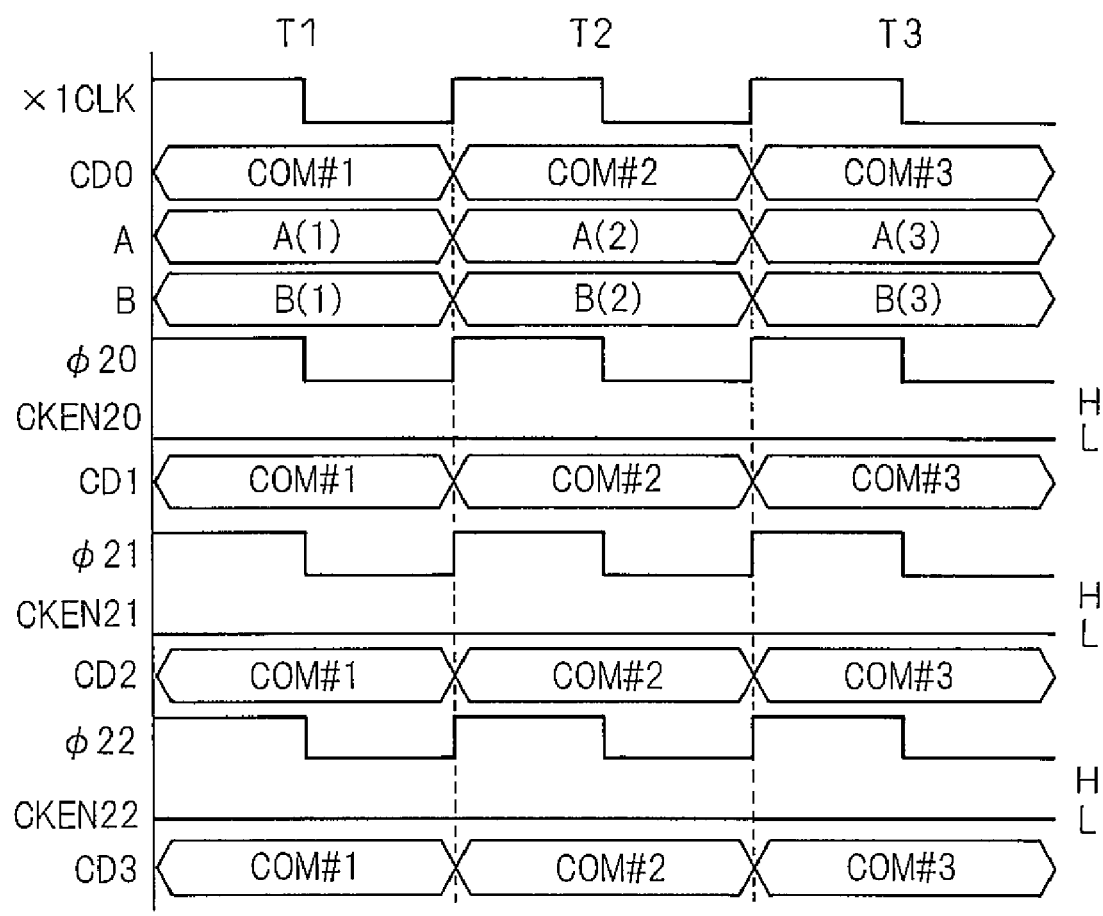
FIG. 6 is a timing chart illustrating the operation of the arithmetic-logic unit when the number of parallel operations is 1.

FIG. 6 is a timing chart illustrating the operation of the arithmetic-logic unit 200 when the number of parallel operations is 1. Square wave "×1CLK" represents the cycle that the arithmetic-logic unit 200 takes to complete the execution of one M-bit operation. Accordingly, one cycle of the square wave ×1CLK is the basic cycle.

Signal "CD0" indicates the operation code to be input to the first sub-arithmetic-logic unit 201, signal "CD1" indicates the operation code to be input to the second sub-arithmetic-logic unit 202, signal "CD2" indicates the operation code to be input to the third sub-arithmetic-logic unit 203, and signal "CD3" indicates the operation code to be input to the fourth sub-arithmetic-logic unit 204.

Further, signals "A" and "B" indicate the input data to be input to the first sub-arithmetic-logic unit 201 and the pipeline registers 212 to 217. On the other hand, "$\phi 20$" and "CKEN20" respectively indicate the clock signal and the mode switching signal to be supplied to the pipeline registers 211 to 219, "$\phi 21$" and "CKEN21" respectively indicate the clock signal and the mode switching signal to be supplied to the pipeline registers 221 to 228, and "$\phi 22$" and "CKEN22" respectively indicate the clock signal and the mode switching signal to be supplied to the pipeline registers 231 to 237.

As illustrated, the mode switching signals CKEN20 to CKEN22 are all set to "L", so that all the pipeline registers operate in the transparent mode. In this case, since the sub-arithmetic-logic units 201 to 204 simultaneously perform the respective sub-operations created by decomposing one M-bit operation, the number of parallel operations in the arithmetic-logic unit 200 is 1. The cycle period of each of the clocks $\phi 20$ to $\phi 22$ is set equal in length to the basic cycle.

Figure 7:
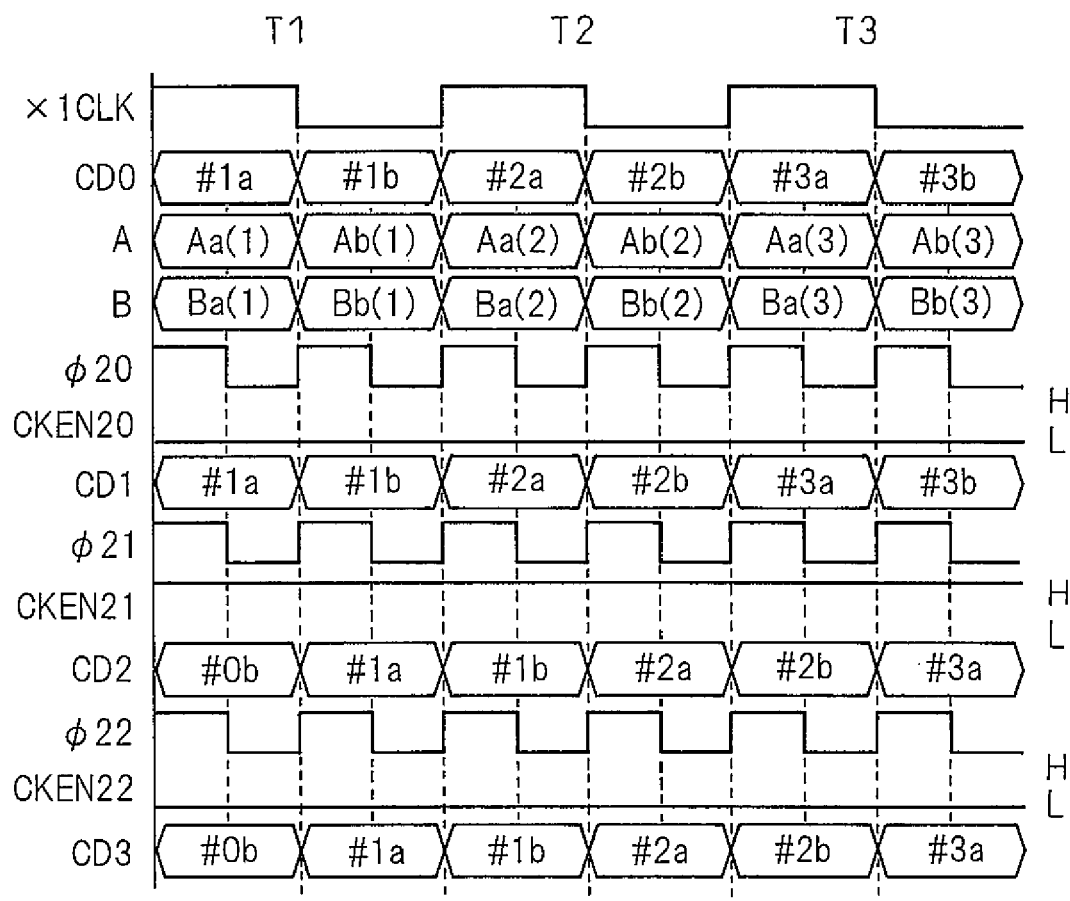
FIG. 7 is a timing chart illustrating the operation of the arithmetic-logic unit when the number of parallel operations is 2.

FIG. 7 is a timing chart illustrating the operation of the arithmetic-logic unit 200 when the number of parallel operations is 2. In this case, to perform two operations in parallel within one basic cycle, the arithmetic-logic unit 200 is operated by setting the cycle period of each of the clocks $\phi 20$ to $\phi 22$ to one half the length of the basic cycle.

Here, suppose that an instruction #ia and inputs Aa(i) and Ba(i) are given to the arithmetic-logic unit 200 in the first half of a cycle Ti (i=1, 2, 3) and an instruction #ib and inputs Ab(i) and Bb(i) are given to the arithmetic-logic unit 200 in the second half of the cycle Ti.

Further, the mode switching signal CKEN21 is set to "H", while the mode switching signals CKEN20 and CKEN22 are both set to "L". As a result, only the pipeline registers 221 to 228 provided between the second pipeline stage containing the second sub-arithmetic-logic unit 202 and the third pipeline stage containing the third sub-arithmetic-logic unit 203 operate as flip-flops. Accordingly, the first and second sub-arithmetic-logic units 201 and 202 simultaneously execute sub-operations of the same M-bit operation, and the third and fourth sub-arithmetic-logic units 203 and 204 execute sub-operations of the preceding M-bit operation that was input to the arithmetic-logic unit 200 one half of the basic cycle earlier than the M-bit operation currently being executed by the first sub-arithmetic-logic unit 201. In this way, the arithmetic-logic unit 200 execute the two operations in parallel by pipelining.

Figure 8:
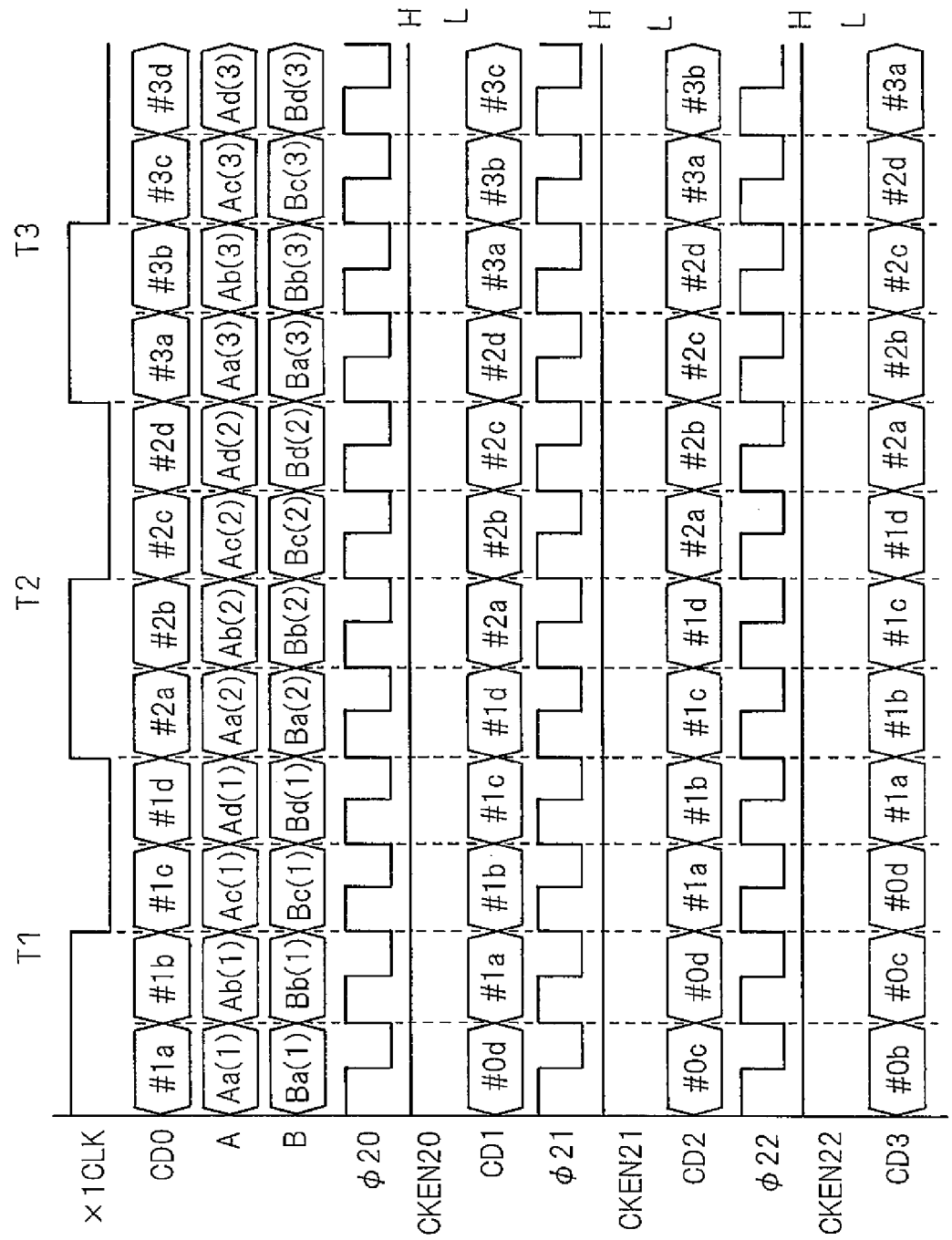
FIG. 8 is a timing chart illustrating the operation of the arithmetic-logic unit when the number of parallel operations is 4.

FIG. 8 is a timing chart illustrating the operation of the arithmetic-logic unit 200 when the number of parallel operations is 4. In this case, to execute four operations in parallel within one basic cycle, the arithmetic-logic unit 200 is operated by setting the cycle period of each of the clocks $\phi 20$ to $\phi 22$ to one quarter the length of the basic cycle.

Here, suppose that an instruction #ia and inputs Aa(i) and Ba(i) are given to the arithmetic-logic unit 200 in the first quarter of a cycle Ti (i=1, 2, 3), an instruction #ib and inputs Ab(i) and Bb(i) are given to the arithmetic-logic unit 200 in the second quarter, an instruction #ic and inputs Ac(i) and Bc(i) are given to the arithmetic-logic unit 200 in the third quarter, and an instruction #id and inputs Ad(i) and Bd(i) are given to the arithmetic-logic unit 200 in the fourth quarter.

The mode switching signals CKEN20 to CKEN22 are all set to "H". As a result, all of the pipeline registers 211 to 237 provided between the respective pipeline stages operate as flip-flops. Accordingly, the second sub-arithmetic-logic unit 202 execute a sub-operation of an M-bit operation that precedes by one quarter of the basic cycle the M-bit operation being executed by the first sub-arithmetic-logic unit 201, the third sub-arithmetic-logic unit 203 execute a sub-operation of an M-bit operation that precedes by one quarter of the basic cycle the M-bit operation being executed by the second sub-arithmetic-logic unit 202, and the fourth sub-arithmetic-logic unit 204 execute a sub-operation of an M-bit operation that precedes by one quarter of the basic cycle the M-bit operation being executed by the third sub-arithmetic-logic unit 203. In this way, the arithmetic-logic unit 200 execute the four operations in parallel by pipelining.

As described above, the arithmetic-logic unit 200 can be made to operate as an arithmetic-logic unit that performs M-bit operations one at a time or as an arithmetic-logic unit that performs two or four M-bit operations in parallel.

Figure 9:
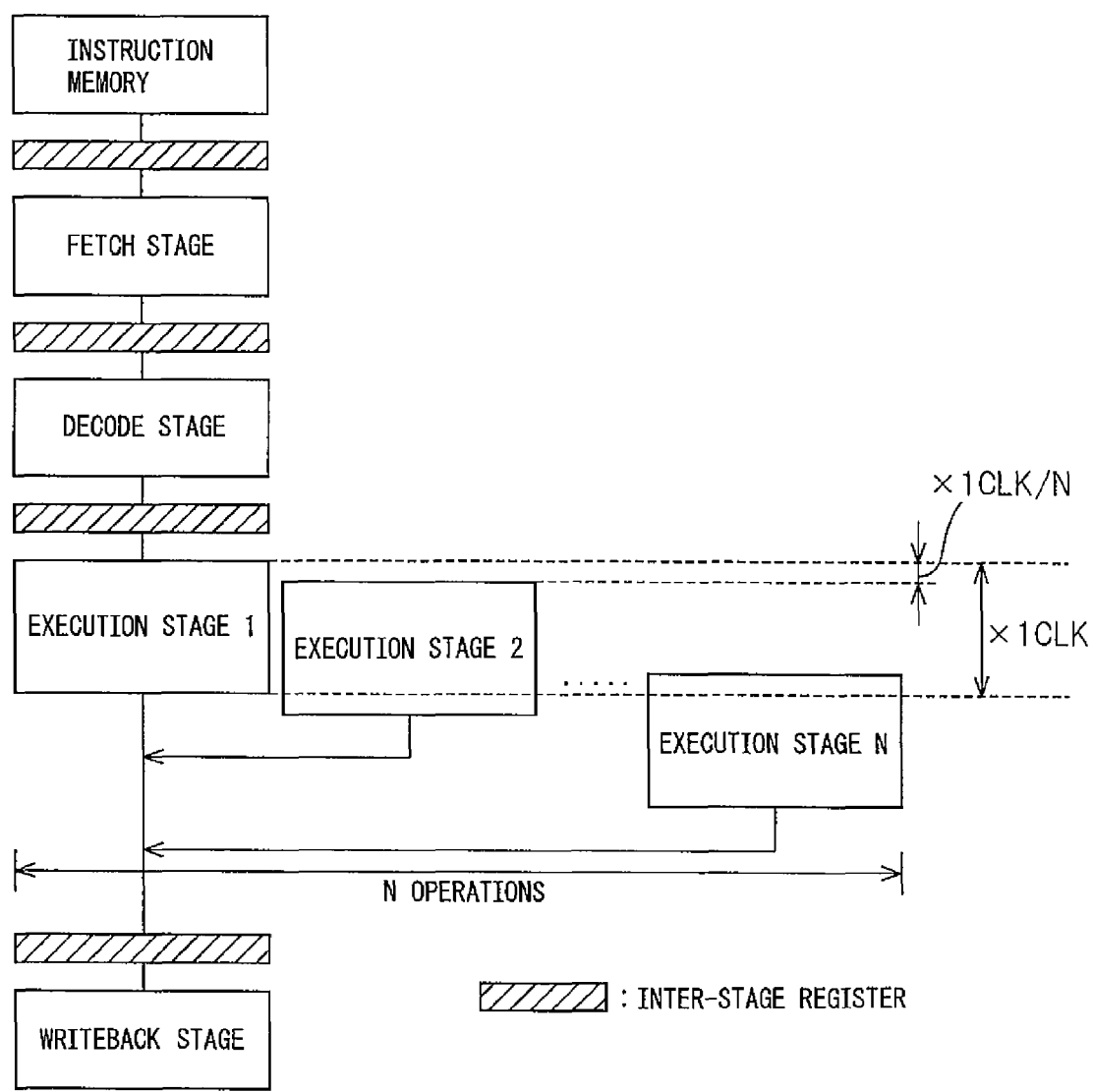
FIG. 9 is a schematic diagram illustrating the basic operation of a processor according to the present invention.

According to the arithmetic-logic unit 200 of the present invention, by employing an N-stage pipeline in which N operations are executed by sequentially shifting the execution period in increments of 1/N basic cycle in the execution stage, as illustrated in FIG. 9, a plurality of operations can be executed using a single arithmetic-logic unit. Accordingly, in a VLIW processor or a superscalar processor, a plurality of operations can be executed using fewer arithmetic-logic units than in the prior art, and the data path interconnections connecting the arithmetic-logic units to the register file and memory means can be reduced.

Furthermore, according to the arithmetic-logic unit 200 of the present invention, the number of operations to be executed in parallel in the execution stage can be increased or reduced as needed. Power consumption can be reduced by performing processing with a minimum number of instruction executions.

Figure 10:
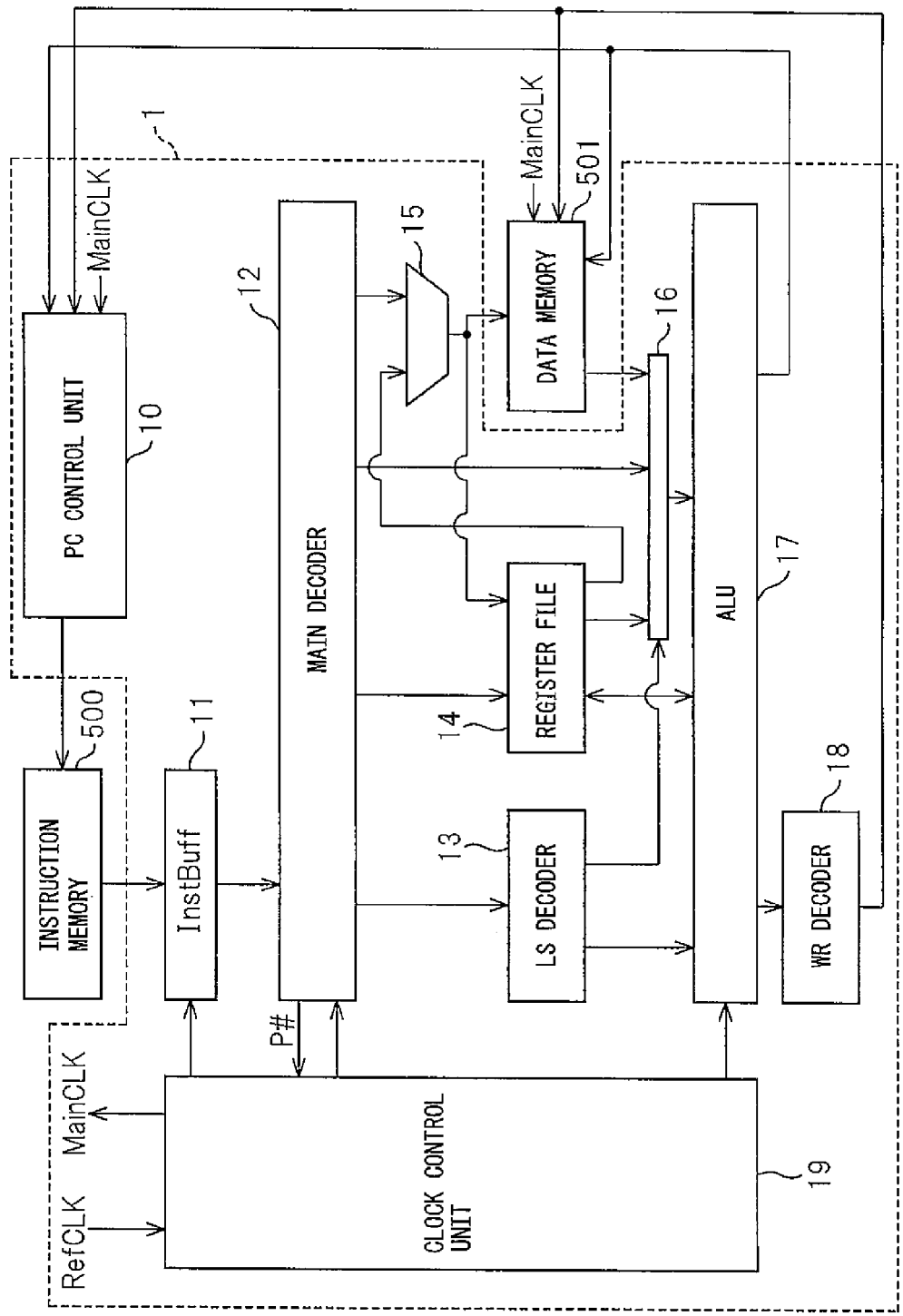
FIG. 10 is a diagram schematically illustrating the configuration of a VLIW processor according to an embodiment of the present invention.

Embodiments of the present invention will be described below with reference to the accompanying drawings. FIG. 10 is a diagram schematically illustrating the configuration of a VLIW processor according to an embodiment of the present invention. The processor 1 includes an arithmetic-logic unit 17 which performs an arithmetic or logic operation between two 32-bit data, the arithmetic-logic unit 17 having a similar configuration to that of the arithmetic-logic unit 200 described with reference to FIG. 4.

The processor 1 also includes a program counter (PC) control unit 10 which controls a program counter (PC), an instruction buffer (InstBuff) 11 which holds an instruction fetched from an address in an instruction memory 500 pointed to by the program counter, and a main decoder 12 which generates an intermediate code and operand by decoding the instruction retrieved from the instruction buffer 11.

The processor 1 further includes a register file 14 which stores various kinds of registers, such as an accumulator, general-purpose register, base register, etc., an address calculator 15 for address calculations, an LS decoder 13 which recovers an execution code and an operand select signal from the intermediate code generated by the main decoder 12, and a multiplexer 16 which, in accordance with the operand select signal, selects either a register value read out of the register file 14, an immediate operand, or data read out of a data memory 501, as a value for input to the arithmetic-logic unit 17.

The processor 1 further includes a WR decoder 18 which generates a branch control signal and a memory write control signal based on a code included in the execution code, and a clock control unit 19 which, based on a reference clock signal RefCLK, generates clock signals for operating the various parts of the processor 1 and a mode switching signal for changing the number of pipeline stages in the arithmetic-logic unit 17.

Figure 11:
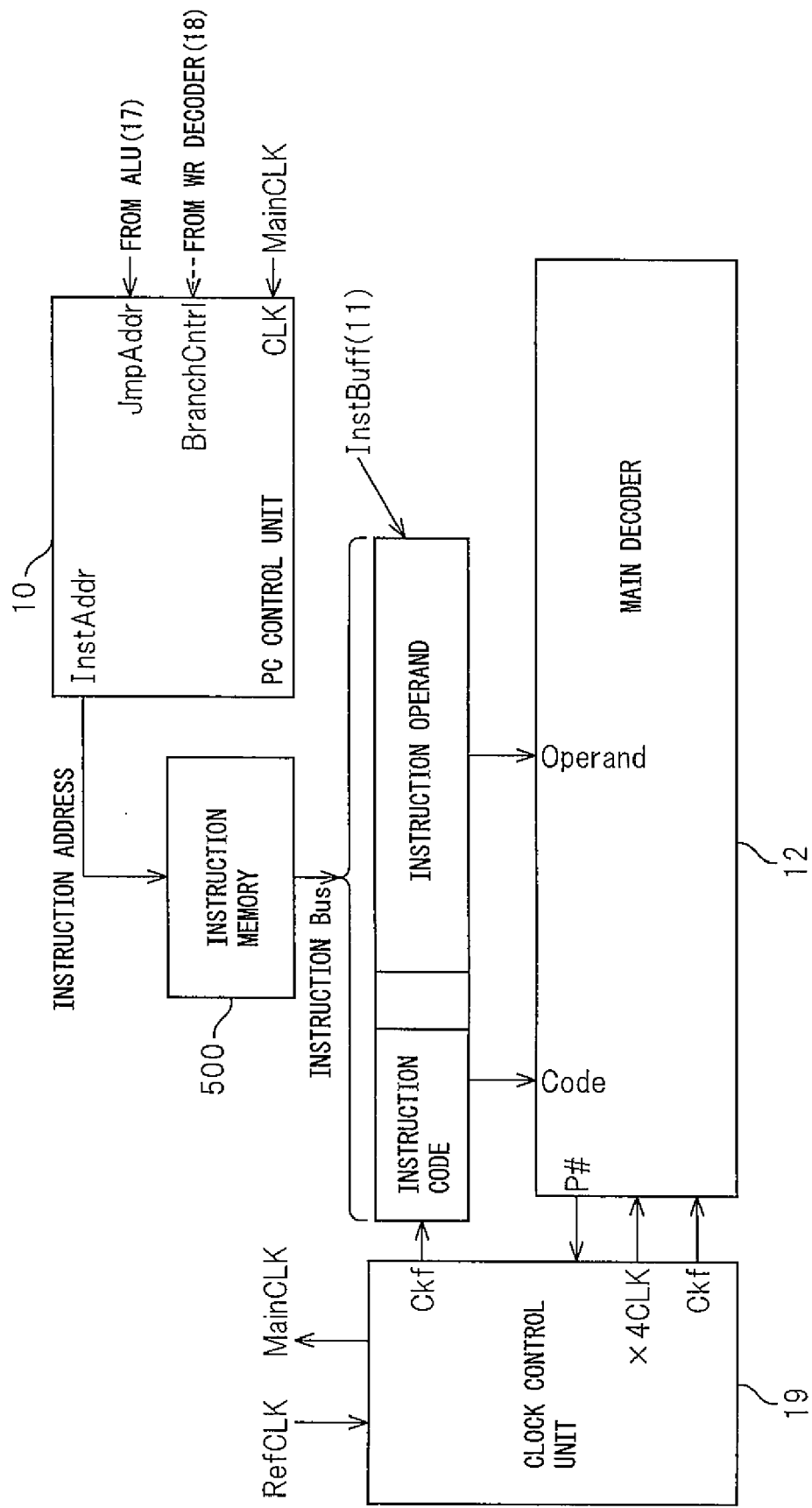
FIG. 11 is a diagram illustrating the interconnections between an instruction memory, program counter control unit, instruction buffer, main decoder, arithmetic-logic unit, WR decoder, and clock control unit.

Interconnections between the various component elements of the processor 1 will be described below with reference to FIGS. 11 to 13. FIG. 11 is a diagram illustrating the interconnections between the instruction memory 500, the program counter control unit 10, the instruction buffer 11, the main decoder 12, the arithmetic-logic unit 17, the WR decoder 18, and the clock control unit 19.

The clock control unit 19 receives the reference clock signal RefCLK, and generates a fetch timing clock signal Ckf having the same frequency and phase as the reference clock signal RefCLK and defining the timing for fetching into the instruction buffer 11 and a main clock MainCLK whose timing is delayed by one-eighth of the cycle period relative to the reference clock signal RefCLK.

When the number of parallel operations is 1, that is, when the arithmetic-logic unit 17 does not execute a plurality of 32-bit operations in parallel, the arithmetic-logic unit 17 processes one 32-bit operation in each cycle of the fetch timing clock signal Ckf. Therefore, the clock cycle of the reference clock signal RefCLK and the main clock MainCLK, each having the same cycle period as the fetch timing clock signal Ckf, may be referred to as the "basic cycle $\Delta Tb$."

The clock control unit 19 also generates a clock signal ×4CLK which is four times as fast as the main clock MainCLK. The cycle period of the clock signal ×4CLK is $\Delta Tb/4$.

The program counter control unit 10 receives the main clock MainCLK from the clock control unit 19, updates the internally stored program counter value in synchronism with the main clock MainCLK, and outputs the program counter value InstAddr to the instruction memory 500. It also receives the branch control signal (BranchCntrl) from the WR decoder 18 and the jump address from the arithmetic-logic unit 17.

The instruction buffer 11 reads the instruction stored in the instruction memory 500 at the address InstAddr specified by the program counter control unit 10, and outputs its instruction code (Code) and instruction operand (Operand) to the main decoder 12.

Figure 12:
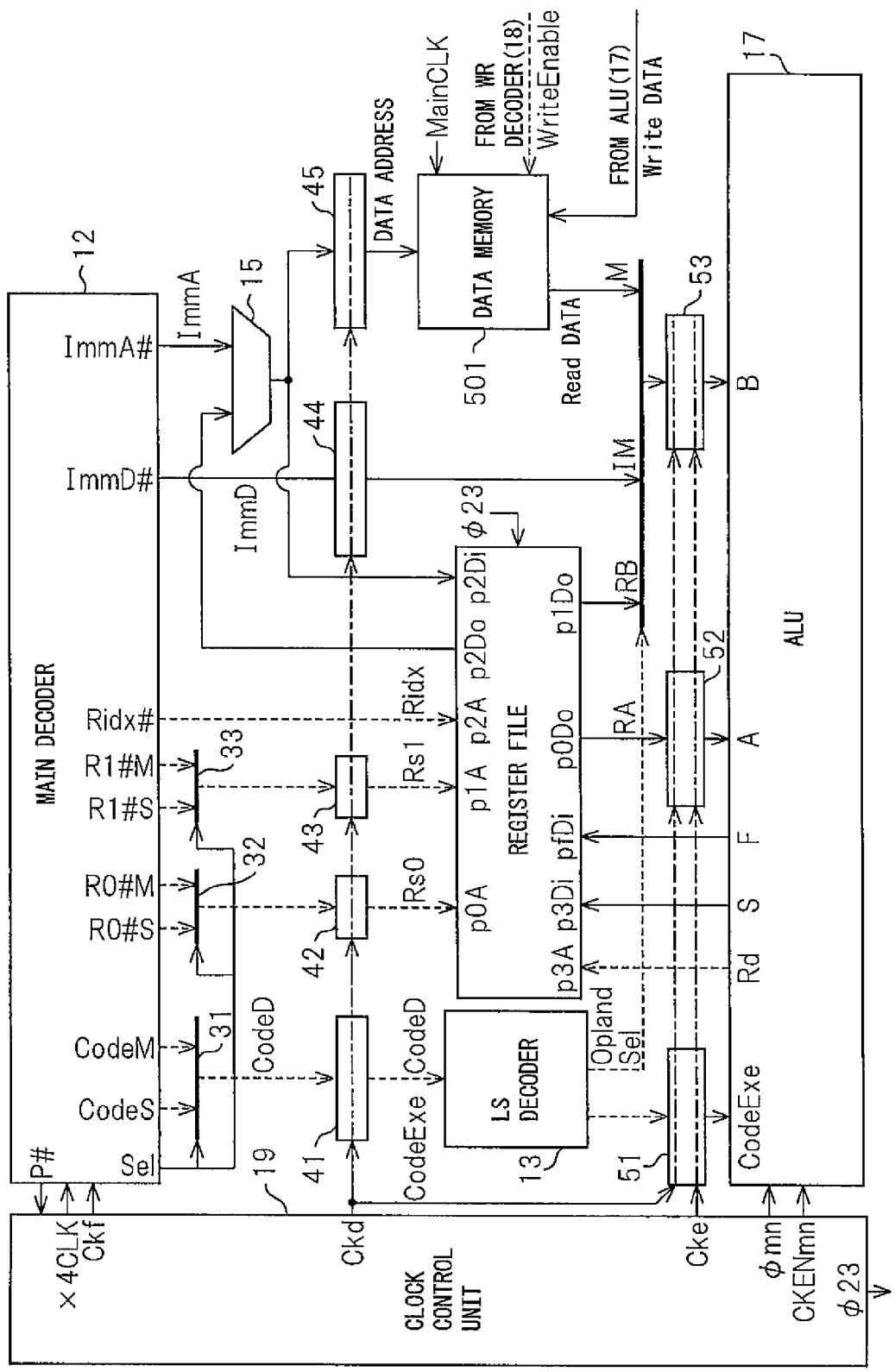
FIG. 12 is a diagram illustrating the interconnections between the main decoder, register unit, LS decoder, data memory, address calculator, arithmetic-logic unit, and clock control unit.

FIG. 12 is a diagram illustrating the interconnections between the main decoder 12, the register file 14, the LS decoder 13, the data memory 501, the address calculator 15, the arithmetic-logic unit 17, and the clock control unit 19.

The main decoder 12 decodes the instruction code and instruction operand received as a VLIW instruction from the instruction buffer 11, and outputs each operand plus the intermediate code containing the execution code specifying the type of operation to be performed by the arithmetic-logic unit 17.

The main decoder 12 that decoded the VLIW instruction received from the instruction buffer 11 detects the number of operations P# contained in the instruction. The number of operations P# indicates the number of operations to be executed in parallel in the execution stage by the arithmetic-logic unit 17. P# may also be referred to as the "number of parallel operations" in accordance with the definition of the term given in the description of the arithmetic-logic unit 200 with reference to FIG. 4.

The following signals are output from the output terminals CodeS, CodeM, R0#S, R0#M, R1#S, R1#M, Ridx#, ImmD#, and ImmA# of the main decoder 12.

The intermediate code, containing the specification of the destination register and the execution code specifying the type of operation to be performed by the arithmetic-logic unit 17, is output from the output terminals CodeS and CodeM. The intermediate code also contains a memory write control signal indicating the presence or absence of an operation result to be written to the data memory 501 and a branch control signal associated with a branch instruction or jump instruction.

When the number of parallel operations P# is 1, the main decoder 12 outputs the decoded intermediate code from the output terminal CodeS to a multiplexer 31. When the number of parallel operations P# is larger than 1, a plurality of intermediate codes are sequentially output one at a time from the output terminal CodeM to the multiplexer 31.

A register number specifying a first source register is output from the terminals R0#S and R0#M, and a register number specifying a second source register is output from the terminals R1#S and R1#M. When the number of parallel operations P# is 1, the main decoder 12 outputs the register numbers of the first and second source registers from the respective output terminals R0#S and R1#S to multiplexers 32 and 33, respectively.

On the other hand, when the number of parallel operations P# is larger than 1, the main decoder 12 sequentially outputs a plurality of first register numbers and second source register numbers, one at a time, from the respective output terminals R0#M and R1#M to the respective multiplexers 32 and 33.

The main decoder 12 generates a select signal Sel which indicates whether the number of parallel operations P# is equal to 1 or larger than 1. In accordance with the select signal Sel, the multiplexer 31 connects either the terminal CodeS or CodeM to a register 41. The intermediate code CodeD output from the selected terminal is held in the register 41.

In accordance with the select signal Sel, the multiplexer 32 connects either the terminal R0#S or R0#M to a register 42. The register number Rs0 of the first source register output from the selected terminal is held in the register 42.

In accordance with the select signal Sel, the multiplexer 33 connects either the terminal R1#S or R1#M to a register 43. The register number Rs1 of the second source register output from the selected terminal is held in the register 43.

The register number Ridx of a base register for a data transfer instruction is output from the terminal Ridx#. An immediate operand IM upon which the operation is to be performed is output from the terminal ImmD#. An offset value ImmA for a data transfer instruction is output from the terminal ImmA#.

The processor 1 according to the present embodiment employs the convention that an operation instruction involving the use of an immediate operand and a data transfer instruction be included in a VLIW instruction which is a parallel instruction; therefore, when the VLIW instruction retrieved from the instruction buffer 11 is a parallel instruction, no data is output from any of the terminals Ridx#, ImmD#, and ImmA#.

The register number Ridx is supplied to the register file 14 as a read register number specifying input p2A for reading the register file 14, and the value of the base register specified by the register number Ridx is output from an output port p2Do and received by the address calculator 15. The address calculator 15 calculates the memory address by adding the offset value ImmA to the received base register value. The memory address is received at an input port p2Di of the register file 14; this memory address is also stored in a register 45. The immediate operand IM is held in a register 44.

The registers 41 to 45 are registers for storing the decoding results from the main decoder 12 while access is being made to the register file 14 or the data memory 501. The registers 41 to 45 update the stored contents by latching the above-described signals in synchronism with a decoding result hold timing clock signal Ckd which is generated as will be described later.

The intermediate code CodeD output from the register 41 is received by the LS decoder 13. The LS decoder 13 recovers the execution code CodeExe that specifies the type of operation to be performed by the arithmetic-logic unit 17 and the operand select signal OperandSel that selects the second operand. The execution code CodeExe is held in a register 51.

The register numbers Rs0 and Rs1 of the first and second source registers, output from the respective registers 42 and 43, are received by the register file 14 as read register number specifying inputs p0A and p1A for reading the register file 14.

The contents RA of the register specified by the register number Rs0 are output from an output port p0Do and held in a register 52 as the first input data A for input to the arithmetic-logic unit 17.

The contents RB of the register specified by the register number Rs1 are output from an output port p1Do and held in the multiplexer 16.

The immediate operand IM output from the register 44 and the data M retrieved from the data memory 501 by the memory address output from the register 45 are also input to the multiplexer 16. The multiplexer 16 selects one of the data, RB, IM, or M, in accordance with the operand select signal OperandSel, and the selected data is output and held in a register 53 as the second input data B for input to the arithmetic-logic unit 17.

The registers 51, 52, and 53 are first-in, first-out (FIFO) buffers, and latch the execution code CodeExe, the first input data A, and the second input data B, respectively, in synchronism with the decoding result hold timing clock signal Ckd. Then, in synchronism with an instruction dispatch timing clock signal Cke, the stored data are sequentially output in the order in which the data were stored.

After performing the operation specified by the execution code CodeExe between the two input data A and B, the arithmetic-logic unit 17 outputs the operation result S and the flag F which are respectively supplied to input ports p3Di and pfDi of the register file 14; at the same time, the register number Rd of the destination register to which the result S is to be written is output and supplied to a write register number specifying input p3A of the register file 14.

In synchronism with the register update clock φ23 supplied from the clock control unit 19, the register file 14 updates the values of the flag register and the register specified by the write register number specifying input p3A.

The data memory 501 receives a memory write control signal WriteEnable from the WR decoder 18 to be described later. If the memory write control signal WriteEnable is one that directs data writing to the data memory 501, the data memory 501 stores the operation result produced by the arithmetic-logic unit 17.

The clock control unit 19 generates the main clock MainCLK and the clock signal ×4CLK and supplies them to the data memory 501 and the main decoder 12, respectively.

The clock control unit 19 receives the number of parallel operations P# detected by the main decoder 12. Then, in accordance with the number of parallel operations P#, the clock control unit 19 generates the decoding result hold timing clock signal Ckd, instruction dispatch timing clock signal Cke, and clock φ23.

Further, in accordance with the number of parallel operations P#, the clock control unit 19 generates the clock signals φ20 to φ22 and mode switching signals CKEN20 to CKEN22 to be applied to the arithmetic-logic unit 17 as described with reference to FIGS. 4 to 8. The configuration of the clock control unit 19 and the operation for generating each clock signal and mode switching signal will be described later.

Figure 13:
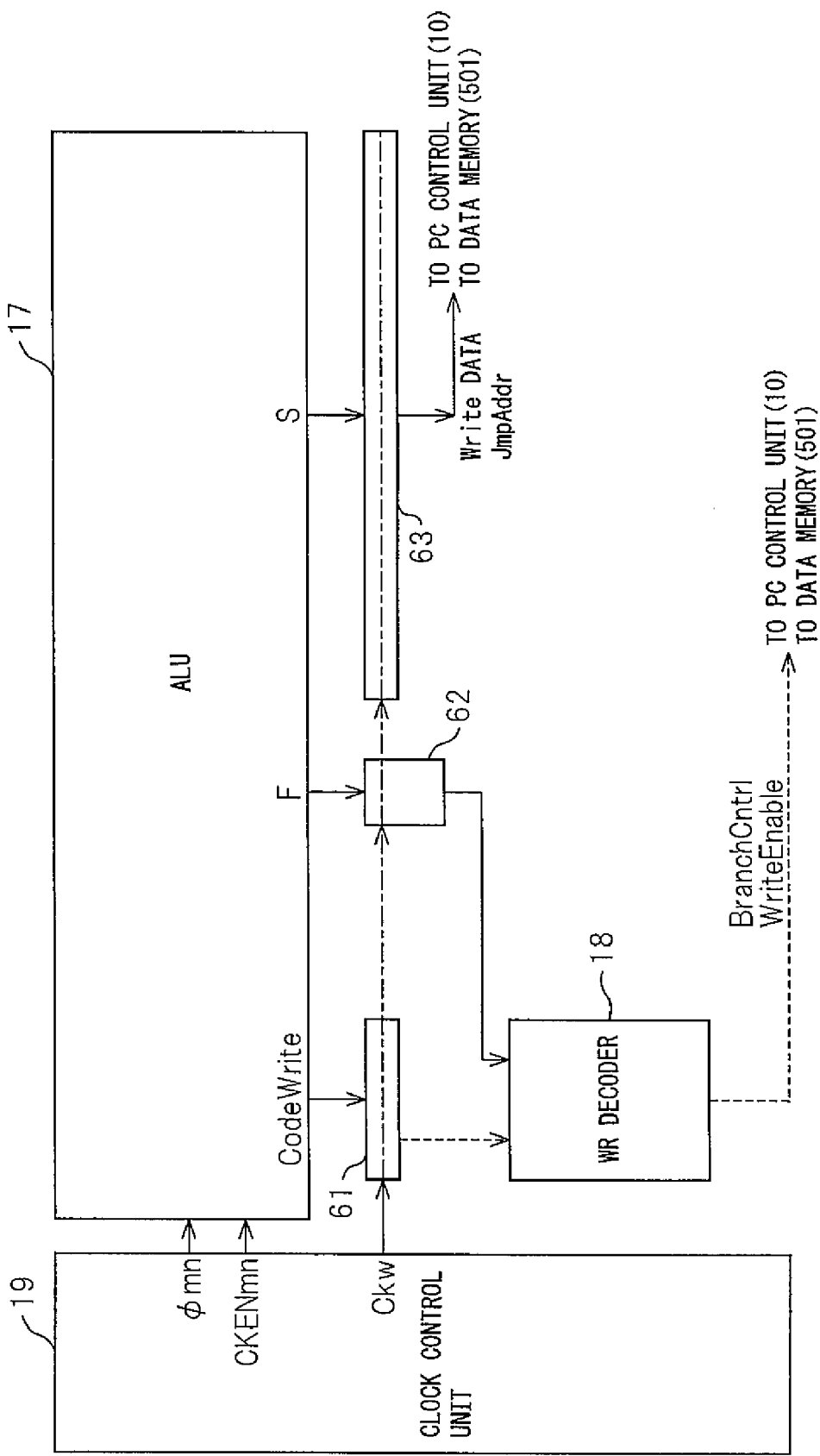
FIG. 13 is a diagram illustrating the interconnections between the arithmetic-logic unit, WR decoder, program counter control unit, data memory, and clock control unit.

FIG. 13 is a diagram illustrating the interconnections between the arithmetic-logic unit 17, the WR decoder 18, the program counter control unit 10, the data memory 501, and the clock control unit 19.

The arithmetic-logic unit 17 outputs the flag F, the operation result S, and the code CodeWrite recovered by decoding the execution code CodeExe supplied from the register 51. Registers 61, 62, and 63 outputs the code CodeWrite, the flag F, and the operation result S in synchronism with an execution result hold timing clock signal Ckw supplied from the clock control unit 19. The code CodeWrite is a code that indicates whether or not the execution code CodeExe is a branch instruction or jump instruction and whether or not the execution code CodeExe is an instruction for outputting the operation result to the data memory 501.

The WR decoder 18 generates the branch control signal BranchCntrl and memory write control signal WriteEnable, based on the code CodeWrite held in the register 61 and the value of the flag F held in the register 62. The branch control signal BranchCntrl is supplied to the program counter control unit 10, and the memory write control signal WriteEnable to the data memory 501.

If the execution code CodeExe is a branch instruction or jump instruction, the arithmetic-logic unit 17 outputs the jump address JmpAddr as the operation result S. The operation result S output from the register 63 is therefore supplied to the program counter control unit 10.

The operation result S output from the register 63 is also supplied to the data memory 501. If the execution code CodeExe is an instruction for outputting the operation result to the data memory 501, the operation result S produced by the arithmetic-logic unit 17 is written to the data memory 501.

Figure 14:
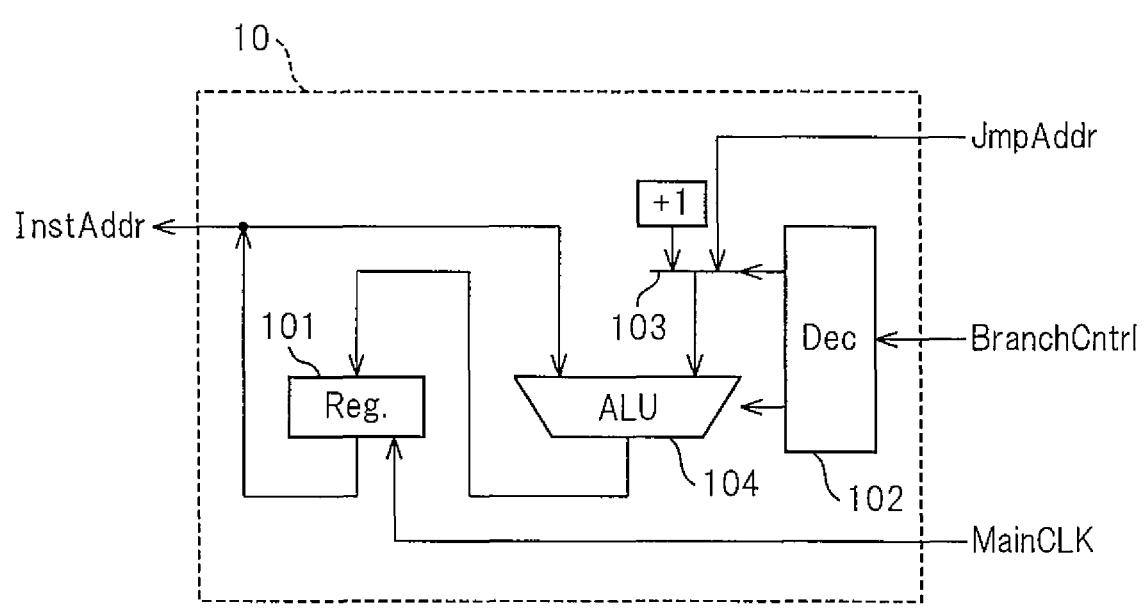
FIG. 14 is a diagram schematically illustrating the configuration of the program counter control unit.

FIG. 14 is a diagram schematically illustrating the configuration of the program counter control unit 10. The program counter control unit 10 includes a register 101 which holds the program counter value InstAddr, a decoder 102 which decodes the branch control signal BranchCntrl, a multiplexer 103 which, in accordance with the decoding result from the decoder 102, selects JmpAddr when a branch instruction was executed at the immediately preceding instant, or otherwise selects a constant 1, and an arithmetic unit 104 which calculates the next program counter from the current program counter.

Figure 15:
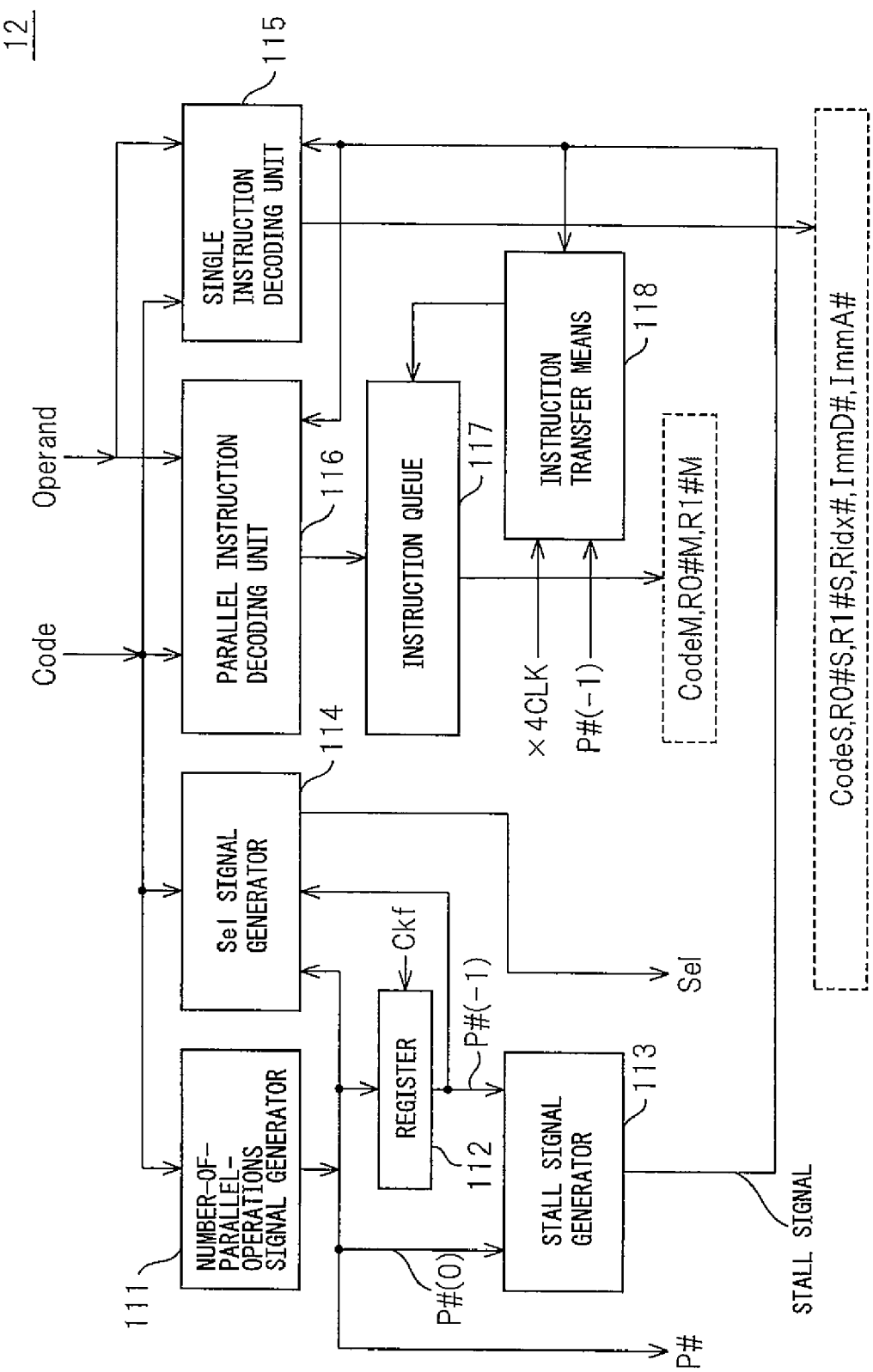
FIG. 15 is a diagram schematically illustrating the configuration of the main decoder.

FIG. 15 is a diagram schematically illustrating the configuration of the main decoder 12. The main decoder 12 includes a number-of-parallel-operations signal generator 111, a register 112, a stall signal generator 113, and a Sel signal generator 114.

The number-of-parallel-operations signal generator 111 generates a number-of-parallel-operations signal P# by detecting the number of operation instructions contained in the instruction code (Code) and instruction operand (Operand) read out of the memory buffer 11.

The stall signal generator 113 receives the number of parallel operations P#(0) contained in the instruction that the main decoder 12 received in the current fetch cycle and the number of parallel operations P#(−1) contained in the instruction that it received in the previous fetch cycle. If the number of parallel operations in the previously received instruction is larger than 1 (P#(−1)>1), and if the number of parallel operations in the currently received instruction is different from the number of parallel operations in the previously received instruction (P#(−1)≠P#(0)), then the stall signal generator 113 generates a stall signal for requesting that a NOP instruction be issued instead of the currently received instruction. The stall signal is supplied to a single instruction decoding unit 115, a parallel instruction decoding unit 116, and an instruction transfer means 118 hereinafter described.

The Sel signal generator 114 generates the select signal Sel for controlling the switching operation of the multiplexers 31 to 33 in accordance with the number of parallel operations P#.

The main decoder 12, which includes the single instruction decoding unit 115, parallel instruction decoding unit 116, and instruction transfer means 118, further includes an instruction queue 117.

If the instruction code (Code) and instruction operand (Operand) read out of the memory buffer 11 contain only one operation instruction, the single instruction decoding unit 115 decodes them and generates a single intermediate-code/operand set. Then, the intermediate code is output at the terminal CodeS, and the operands are output at the terminals R0#S, R1#S, Ridx#, ImmD#, and ImmA#. During the period that the stall signal is being received from the stall signal generator 113, the single instruction decoding unit 115 holds off outputting the generated intermediate code and operands and reading instructions from the instruction buffer 11, and issues a NOP instruction.

On the other hand, if the instruction code and instruction operand contain a plurality of operation instructions, the parallel instruction decoding unit 116 decodes them and generates a plurality of intermediate-code/and operand sets. Then, these intermediate codes and operands are supplied to the instruction queue 117. During the period that the stall signal is being received from the stall signal generator 113, the parallel instruction decoding unit 116 holds off reading instructions from the instruction buffer 11.

The instruction queue 117 holds the plurality of intermediate-code/and operand sets decoded by the parallel instruction decoding unit 116. Then, in synchronism with the instruction transfer trigger signal generated by the instruction transfer means 118, the intermediate-code/operand sets are sequentially retrieved, one set at a time, and output at the terminals CodeM, R0#M, and R1#M.

The instruction transfer means 118 receives the clock signal ×4CLK and the number of parallel operations P#(−1). If the number of parallel operations P#(−1) is 4, the instruction transfer means 118 supplies the clock signal ×4CLK as the instruction transfer trigger signal to the instruction queue 117. With this signal, the instruction queue 117 sequentially outputs the intermediate-code/operand sets at intervals of time corresponding to one quarter of the basic cycle ΔTb.

If the number of parallel operations P#(−1) is 2, the instruction transfer means 118 supplies a signal, generated by dividing the clock signal ×4CLK by 2, as the instruction transfer trigger signal to the instruction queue 117. With this signal, the instruction queue 117 sequentially outputs the intermediate-code/operand sets at intervals of time corresponding to one half of the basic cycle ΔTb.

During the period that the stall signal is being received from the stall signal generator 113, the instruction transfer means 118 instructs the instruction queue 117 to hold off outputting the generated intermediate codes and operands, and causes it to issue a NOP instruction.

The decoding operation of the main decoder 12 will be described with reference to FIGS. 16 to 18. FIG. 16 is a diagram illustrating by way of example the types of instructions to be executed by the processor 1. The instructions to be executed by the processor 1 are classified, for example, into six types from instruction type 1 to instruction type 6.

Instructions belonging to instruction type 1 contain two source register specifications R0 and R1 and one destination register specification S0, and direct that the result of the operation performed between the two source registers be written to the destination register S0. This type of instruction is, for example, "add r0, r1, r2", which writes the sum of the values of registers r0 and r1 to register r2.

Instructions belonging to instruction type 2 contain one destination register specification S0, and direct that an operation be performed based on the value of the destination register S0 and that the result be written to the destination register S0. This type of instruction is, for example, "abs r2", which takes the absolute value of the value of register r2 and writes it to register r2.

Instructions belonging to instruction type 3 contain one source register specification R0, one immediate value ImmD, and one destination register specification S0, and direct that the result of the operation performed between the source register R0 and the immediate value ImmD be written to the destination register S0. This type of instruction is, for example, "add r0, −10, r2", which writes the sum of the value of register r0 and the value "−10" to register r2.

Instructions belonging to instruction type 4 contain a base register specification Ridx, an offset value ImmA, and one register specification S0. This type of instruction is, for example, a memory transfer instruction "ld*(r0, 10), r2", which directs that the contents of the data stored in the data memory 501 at the address indicated by a value calculated by adding the offset value 10 to the value of the base register r0 be transferred to register r2.

Instructions belonging to instruction type 5 contain an immediate value ImmD. This type of instruction is, for example, a jump instruction "jp #100" for jumping to address #100.

Instructions belonging to instruction type 6 contain a register immediate value ImmD and one register specification R0. This type of instruction is, for example, "jp r0, #100" which is a jump instruction for jumping to the address calculated by adding 100 to register r0.

FIGS. 17A and 17B are diagrams illustrating the decoding performed by the single instruction decoding unit 115. The instructions in FIG. 17A, "add r0, r1, r2" (instruction 1), "abs r2" (instruction 2), "add r0, −10, r2" (instruction 3), "ld*(r0, 10), r2" (instruction 4), "jp #100" (instruction 5), and "jp r0, #100" (instruction 6), are each an instruction with the number of parallel operations=1.

Therefore, the execution code Code and instruction operand Operand containing each of these instructions are decoded by the single instruction decoding unit 115. When the main decoder 12 receives the execution code Code and instruction operand Operand containing each of the above instructions 1 to 6 in the illustrated fetch sequence, the single instruction decoding unit 115 converts each instruction into a single intermediate-code/operand set. The single instruction decoding unit 115 outputs the intermediate code and operands at the terminals CodeS, R0#S, R1#S, Ridx#, ImmD#, and ImmA# as specified in the table of FIG. 17B.

As earlier described, the intermediate code contains the destination register specification as well as the execution code such as "add" or "abs" specifying the type of operation to be performed by the arithmetic-logic unit 17. The table of FIG. 17B therefore indicates that the destination register specification is also output at the terminal CodeS. The same applies to FIG. 18B.

Figure 18A:
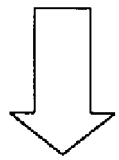
FIG. 18A is a diagram (part 1) illustrating the decoding performed by a parallel instruction decoding unit.
Figure 18B:
FIG. 18B is a diagram (part 2) illustrating the decoding performed by the parallel instruction decoding unit.

FIGS. 18A and 18B are diagrams illustrating the decoding performed by the parallel instruction decoding unit 116. The instruction in FIG. 18A, "SAA r0, r1, r2", is an instruction that adds the absolute difference between the values of registers r0 and r1 to the value of register r2.

The arithmetic-logic unit 17 is not equipped with the function of executing the instruction "SAA" in a single operation, and therefore executes the instruction by combining the following three operations:

Store the result of the subtraction r0−r1 into register r7 (operation 1),

Store the absolute value of the value of register r7 into register r7 (operation 2), and Store the sum of the values of registers r7 and r2 into register r2 (operation 3).

Hence, the number of parallel operations in the instruction "SAA" is 3.

Therefore, the execution code Code and instruction operand Operand containing the above instruction are decoded by the parallel instruction decoding unit 116. When the main decoder 12 receives the execution code Code and instruction operand Operand containing the instruction "SAA", the parallel instruction decoding unit 116 converts the instruction "SAA" into the three sets of intermediate codes and operands.

The arithmetic-logic unit 17 which has similar configuration to that of the arithmetic-logic unit 200 of FIG. 4 can operate as a single arithmetic-logic unit with the number of parallel operations=1, or as an arithmetic-logic unit that can perform two or four operations in parallel. Accordingly, when decoding the instruction "SAA" which involves three parallel operations, the number-of-parallel-operations signal generator 111 generates a number-of-parallel-operations signal "P#=4", and the parallel instruction decoding unit 116 supplies the three sets of intermediate codes and operands and one NOP instruction to the instruction queue 117.

In synchronism with the instruction transfer trigger signal having a cycle period equal in length to one quarter of the basic cycle ΔTb, the instruction queue 117 sequentially outputs the intermediate codes and operands and the NOP instruction at the terminals CodeM, R0#M, and R1#M as specified in the table of FIG. 18B.

Figure 19:
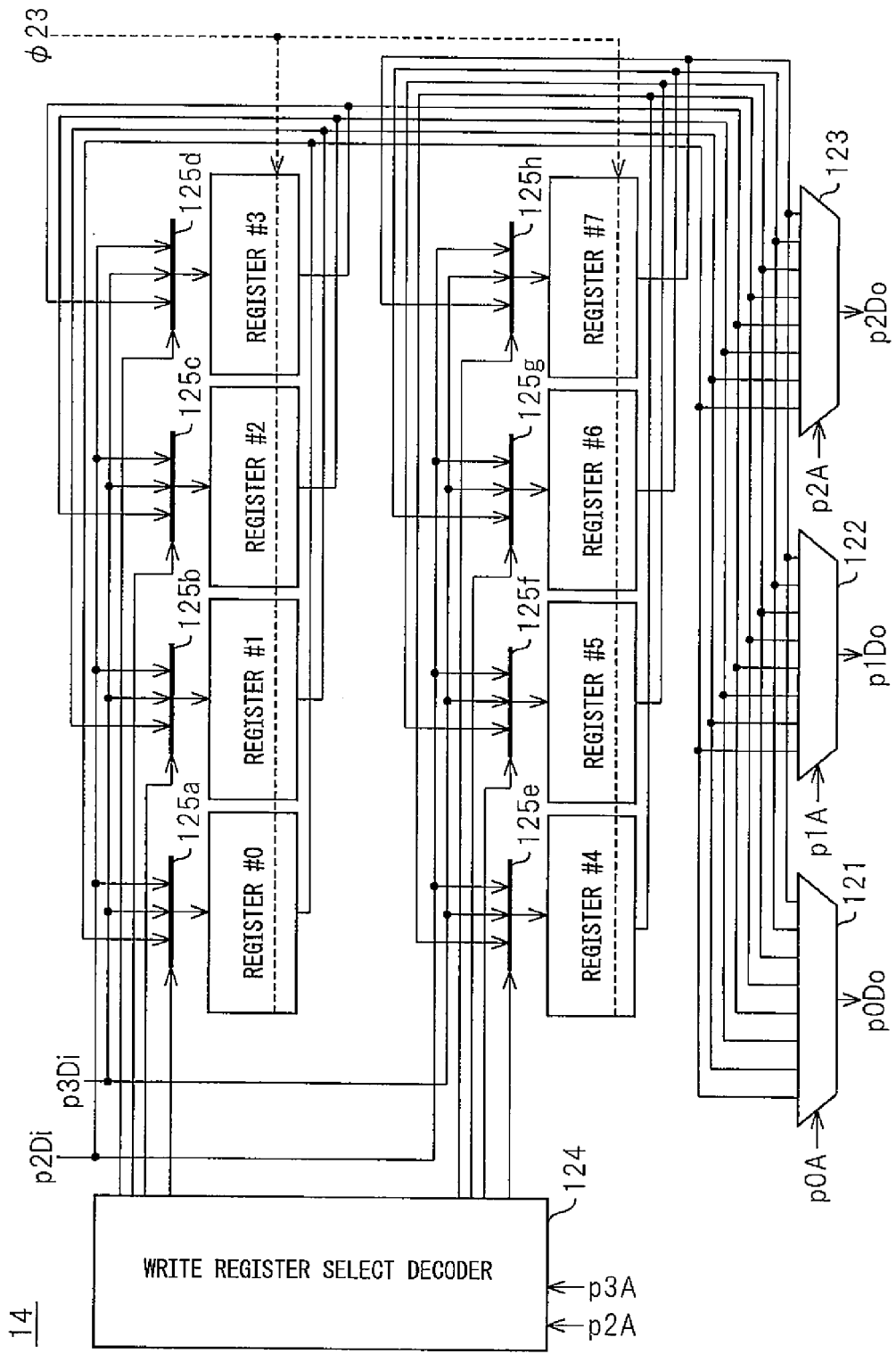
FIG. 19 is a diagram schematically illustrating the configuration of the register unit.

FIG. 19 is a diagram schematically illustrating the configuration of the register file 14. The register file 14 includes registers #0 to #7 which latch 32-bit input data in synchronism with the clock signal φ23, and multiplexers 121 to 123 which select, from among the registers #0 to #7, the registers specified by the read register number specifying inputs p0A to p2A, and which output the values of the selected registers at the respective output ports p0Do to p2Do.

The register file 14 further includes multiplexers 125a to 125h which select input values for input to the respective registers #0 to #7 from among their own stored values and the data supplied at the input ports p2Di and p3Di, and a write register select decoder 124 which generates the switching signals to the respective multiplexers 125a to 125h in accordance with the write register number specifying inputs p2A and p3A.

As earlier described, when reading from the register file 14 the operands of an instruction whose number of parallel operations P# is 4, the main decoder 12 specifies the read register numbers at intervals of time corresponding to one quarter of the basic cycle ΔTb. The upper limit of the time that the arithmetic-logic unit 17 takes to process one 32-bit operation is equal in length to the basic cycle ΔTb, i.e., the cycle in which one VLIW instruction is fetched. Accordingly, when the number of parallel operations P# is 4, the main decoder 12 specifies the read register numbers at intervals of time corresponding to one quarter of the period allowed for the arithmetic-logic unit 17 to process one 32-bit operation.

Similarly, when writing the operation results of an instruction whose number of parallel operations P# is 4, the arithmetic-logic unit 17 outputs the operation results at intervals of time corresponding to one quarter of the basic cycle ΔTb, as will be described later.

For this purpose, each of the registers #0 to #7 is constructed from a memory device capable of reading and writing with a cycle time corresponding to one quarter of the period allowed for the arithmetic-logic unit 17 to process one 32-bit operation.

Figure 20:
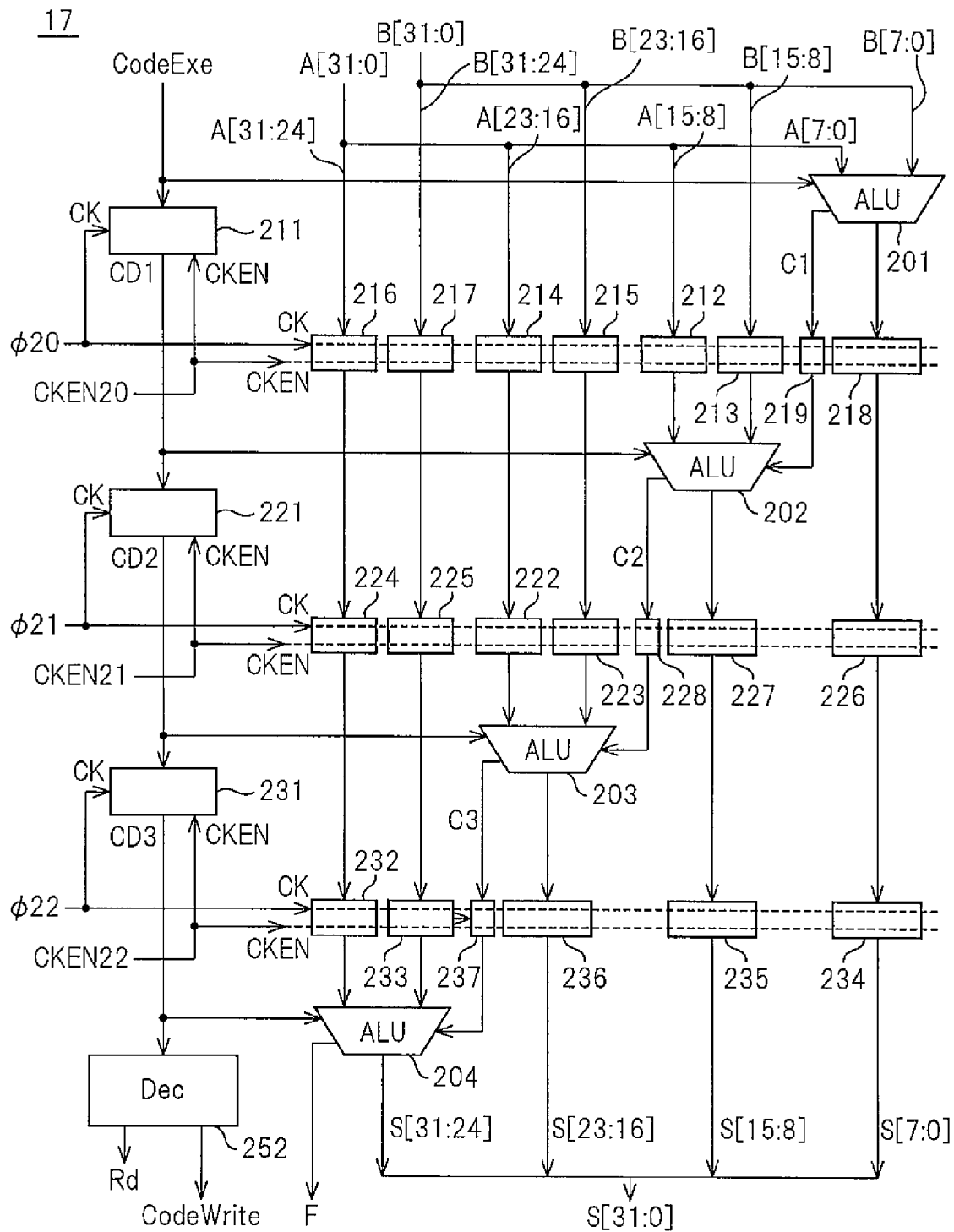
FIG. 20 is a diagram schematically illustrating the configuration of the arithmetic-logic unit.

FIG. 20 is a diagram schematically illustrating the configuration of the arithmetic-logic unit 17. The arithmetic-logic unit 17 has similar configuration to that of the arithmetic-logic unit 200 depicted in FIG. 4. Therefore, the same component elements are designated by the same reference numerals, and the description thereof will not be repeated here.

Each of the sub-arithmetic-logic units 201 to 204 in the arithmetic-logic unit 17 performs an 8-bit operation which is one quarter part of the 32-bit operation that the arithmetic-logic unit 17 performs. More specifically, the sub-arithmetic-logic unit 201 takes as inputs the data A[7:0] and B[7:0] representing the portions from bit 0 to bit 7 of the respective 32-bit input data A and B, performs the operation specified by the execution code CodeExe, and outputs the result S[7:0] of the 8-bit operation and a carry C1.

The second sub-arithmetic-logic unit 202 takes as inputs the carry C1 and the data A[15:8] and B[15:8] representing the portions from bit 8 to bit 15 of the respective data A and B, performs the operation specified by the execution code CodeExe, and outputs the result S[15:8] of the 8-bit operation and a carry C2.

The third sub-arithmetic-logic unit 203 takes as inputs the carry C2 and the data A[23:16] and B[23:16] representing the portions from bit 16 to bit 23 of the respective data A and B, performs the operation specified by the execution code CodeExe, and outputs the result S[23:16] of the 8-bit operation and a carry C3.

The fourth sub-arithmetic-logic unit 204 takes as inputs the carry C3 and the data A[31:24] and B[31:24] representing the portions from bit 24 to bit 31 of the respective data A and B, performs the operation specified by the execution code CodeExe, and outputs the result S[31:24] of the 8-bit operation and a flag F indicating the result of a carry decision or zero decision.

Then, the arithmetic-logic unit 17 outputs the flag F and the result S[31:0] of the 32-bit operation produced by combining the above operation results S[7:0], S[15:8], S[23:16], and S[31:24].

The arithmetic-logic unit 17 further includes a decoder 252 which decodes the execution code CodeExe to acquire the code CodeWrite and destination register specification Rd contained in CodeExe.

Figure 21:
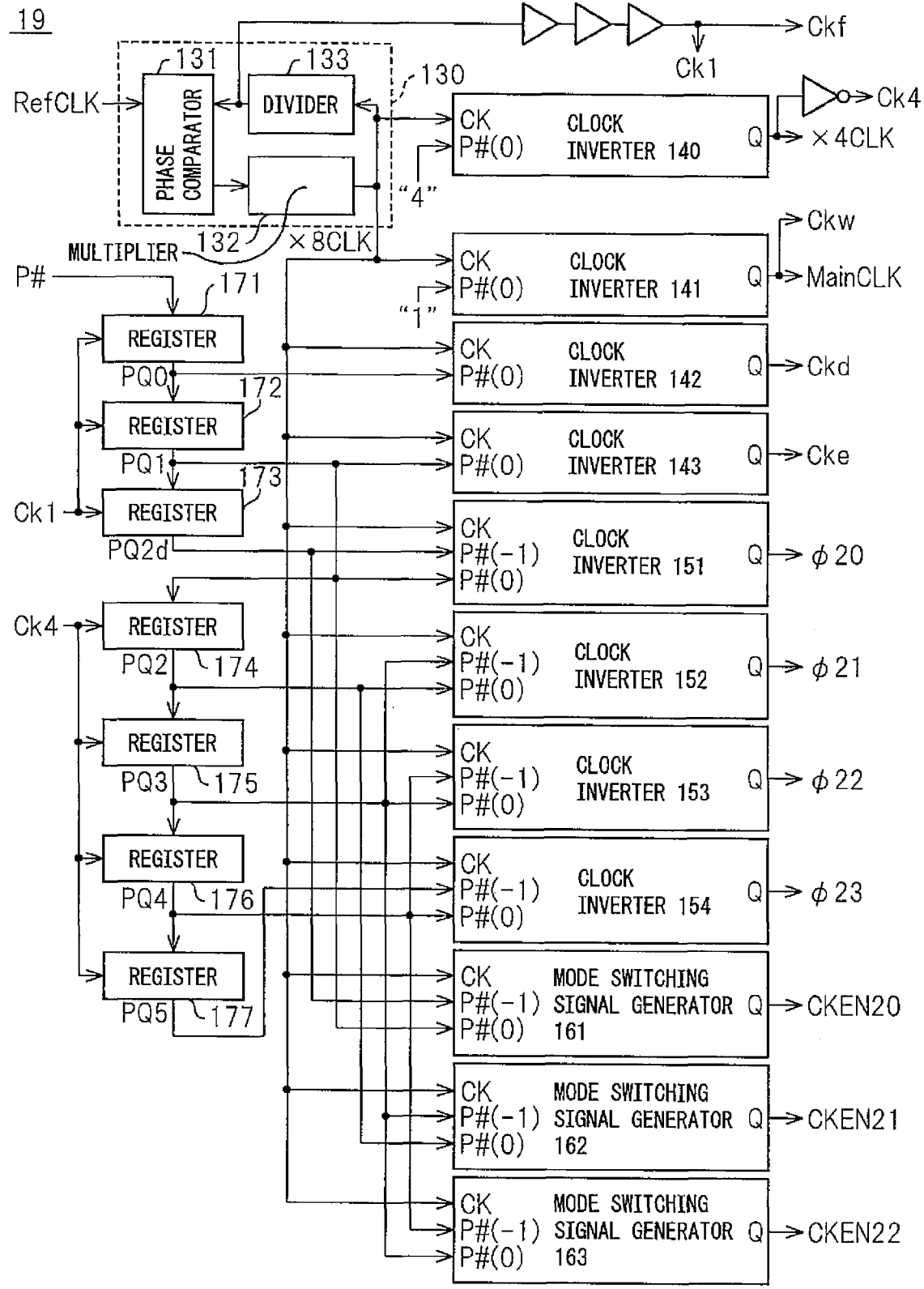
FIG. 21 is a diagram schematically illustrating the configuration of the clock control unit.

FIG. 21 is a diagram schematically illustrating the configuration of the clock control unit 19. The clock control unit 19 includes a PLL circuit 130 which synchronizes with the reference clock signal RefCLK, clock inverters 140 to 143 and 151 to 154 which generate the various clock signals, and mode switching signal generators 161 to 163 which generate the mode switching signals CKEN20 to CKEN22.

The PLL circuit 130 includes a phase comparator circuit 131, a frequency multiplier 132 which generates a clock signal ×8CLK which is eight times as fast as the reference clock signal RefCLK, and a frequency divider 133 which divides the output clock signal of the frequency multiplier 132 by 8 and thereby generates a clock signal having the same frequency and phase as the reference clock signal RefCLK. The output signal of the frequency divider 133 is used as the fetch timing clock signal Ckf and also as a clock signal Ck1.

The clock inverters 140 to 143 are each a finite-state machine which, based on the input P#(0) and the current state, updates the current state at intervals of time corresponding to one cycle of the input clock signal ×8CLK, i.e., one eighth of the basic cycle ΔTb, and outputs a logic value that matches the current state. Since each of the clock inverters 140 to 143 can output the logic value at intervals of time corresponding to one eighth of the basic cycle ΔTb, they can output a clock signal having the same cycle period as the basic cycle ΔTb, a clock signal having a cycle period equal to one half of the basic cycle ΔTb, and a clock signal having a cycle period equal to one quarter of the basic cycle ΔTb. The clock inverters 140 to 143 output the clock signal having the same cycle period as the basic cycle ΔTb, the clock signal having a cycle period equal to one half of the basic cycle ΔTb, and the clock signal having a cycle period equal to one quarter of the basic cycle ΔTb when the input P#(0) is 1, 2, and 4, respectively.

The clock inverter 140 to which a constant 4 is input as the input P#(0) generates the clock signal ×4CLK having a cycle period equal to one quarter of the basic cycle ΔTb. A clock signal Ck4 is generated by inverting the clock signal ×4CLK.

The clock inverter 141 to which a constant 1 is input as the input P#(0) generates the main clock MainCLK and the execution result hold timing clock signal Ckw both having the same cycle as the basic cycle ΔTb.

The operation of the clock inverters 142 and 143 for generating the clock signals Ckd and Cke will be described later.

The clock inverters 151 to 154 that output the clock signals φ20 to φ23 are each a finite-state machine which, based on the inputs P#(0) and P#(−1) and the current state, updates the current state at intervals of time corresponding to one cycle of the input clock signal ×8CLK, and outputs a logic value that matches the current state. As with the clock inverters 140 to 143, the clock inverters 151 to 154 can output a clock signal having the same cycle period as the basic cycle ΔTb, a clock signal having a cycle period equal to one half of the basic cycle ΔTb, and a clock signal having a cycle period equal to one quarter of the basic cycle ΔTb.

The mode switching signal generators 161 to 163 that output the mode switching signals CKEN20 to CKEN22 are also finite-state machines each of which, based on the inputs P#(0) and P#(−1) and the current state, updates the current state at intervals of time corresponding to one cycle of the input clock signal ×8CLK, and outputs a logic value that match the current state.

The operation of the clock inverters 151 to 154 for generating the clock signals φ20 to φ23 and the operation of the mode switching signal generators 161 to 163 for generating the mode switching signals CKEN20 to CKEN22 will be described later.

Figure 22:
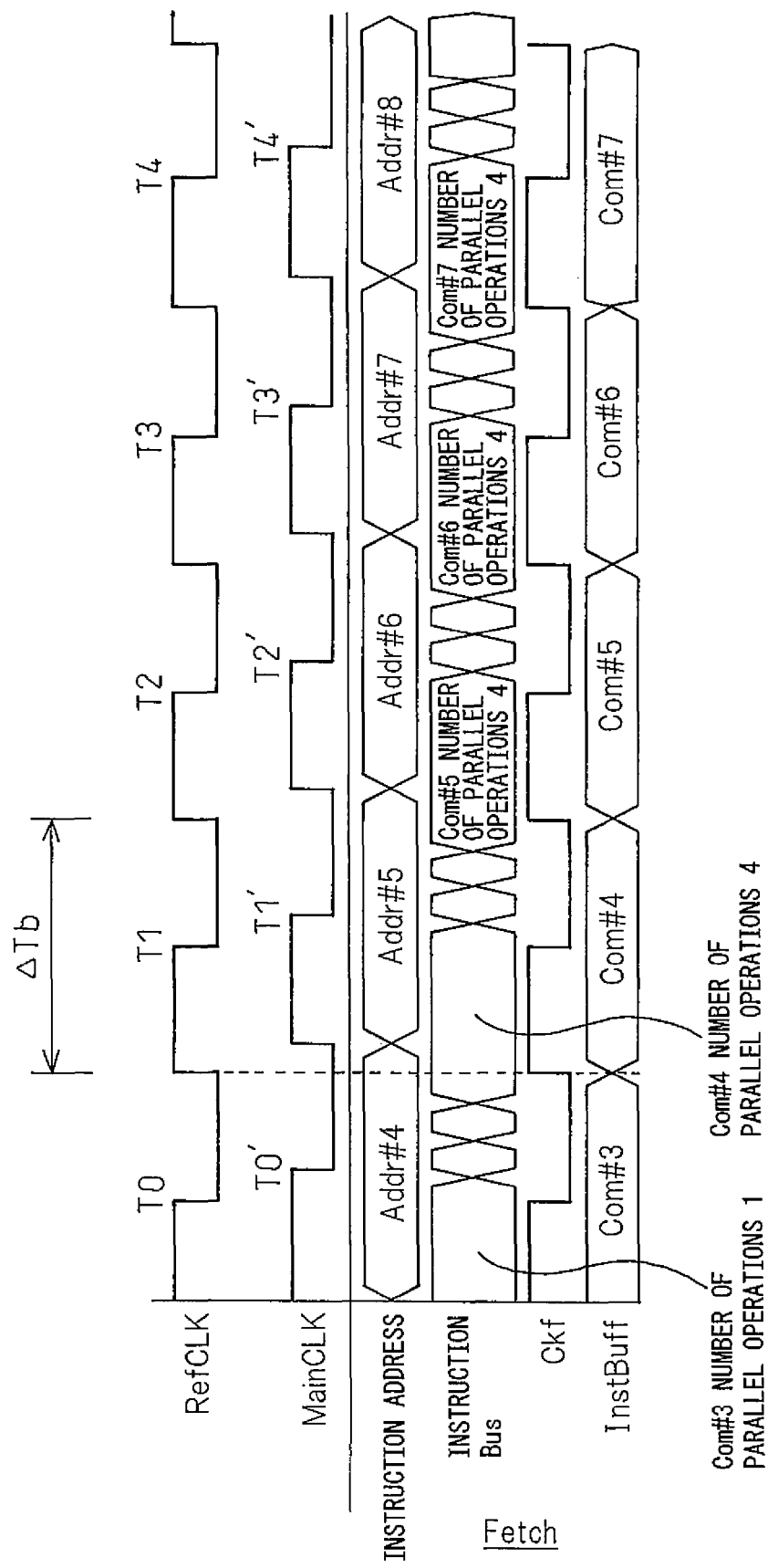
FIG. 22 is a timing chart illustrating the operation of the processor in a fetch stage when the number of parallel operations changes from 1 to 4.
Figure 24:
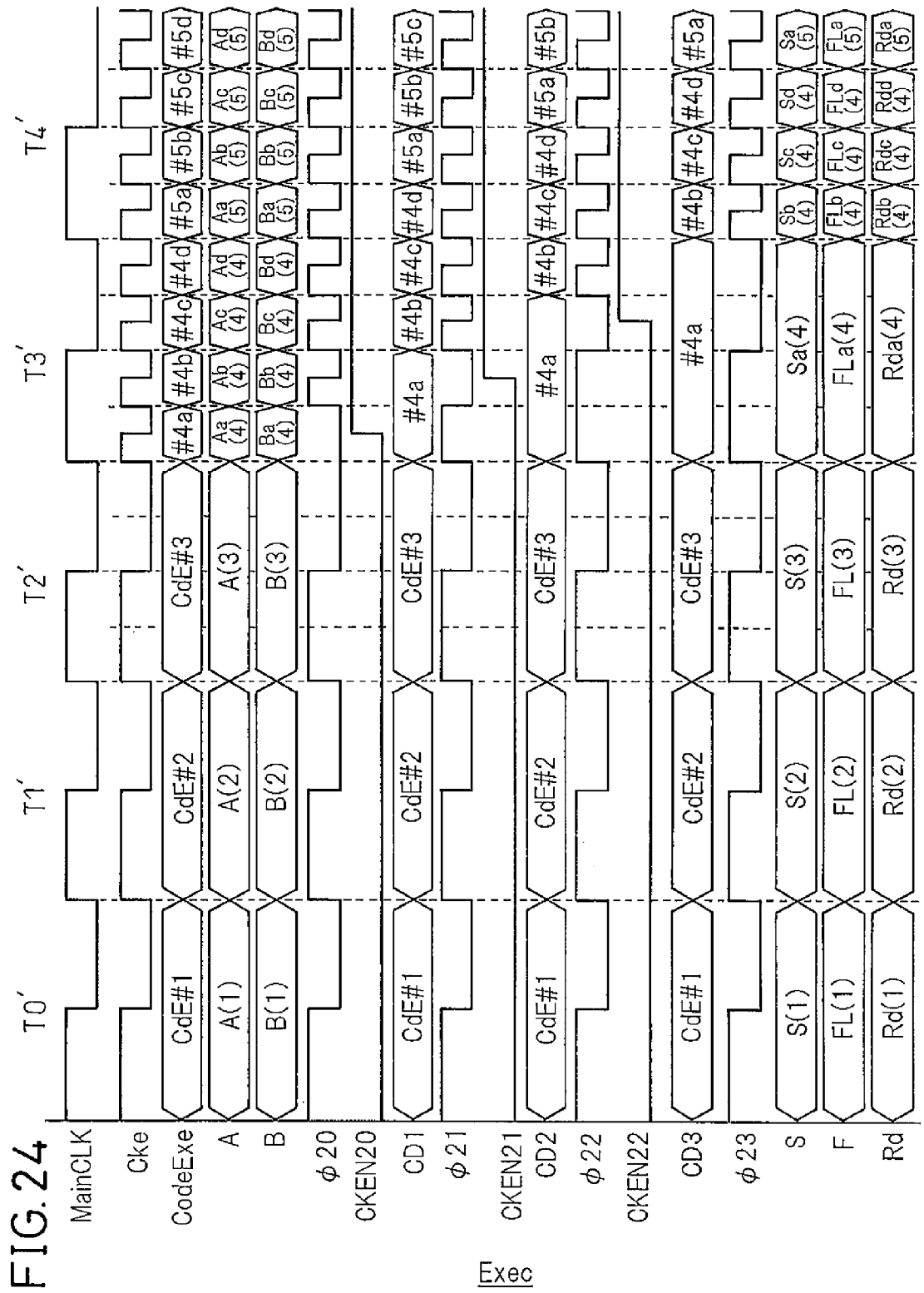
FIG. 24 is a timing chart illustrating the operation of the processor in an execution stage when the number of parallel operations changes from 1 to 4.
Figure 25:
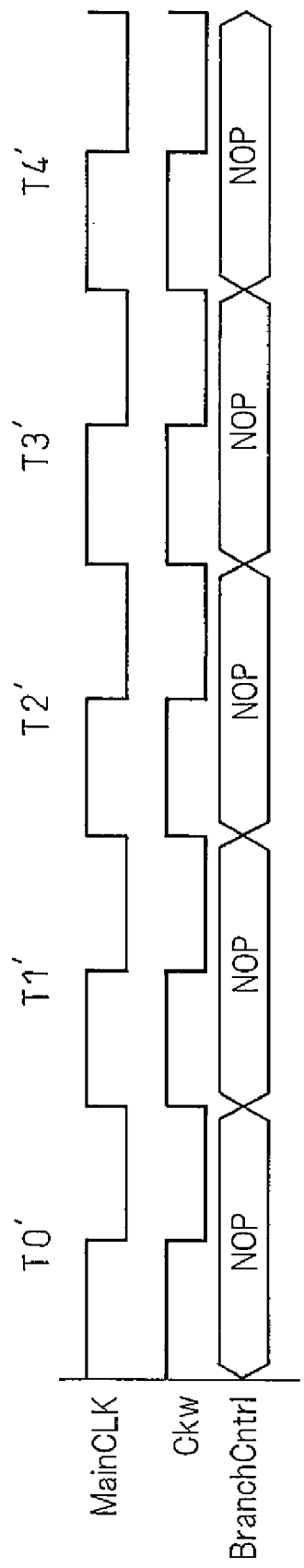
FIG. 25 is a timing chart illustrating how signals Ckw and BranchCntrl change when the number of parallel operations changes from 1 to 4.

A description will be given below of the operation of the processor 1 that changes the number of pipeline stages of the arithmetic-logic unit as the number of parallel operations changes. FIG. 22 is a timing chart illustrating the operation of the processor 1 in the fetch stage when the number of parallel operations changes from 1 to 4, FIG. 23 is a timing chart illustrating the operation of the processor 1 in the decode stage when the number of parallel operations changes from 1 to 4, FIG. 24 is a timing chart illustrating the operation of the processor 1 in the execution stage when the number of parallel operations changes from 1 to 4, and FIG. 25 is a timing chart illustrating how the execution result hold timing clock signal Ckw and the branch control signal BranchCntrl change when the number of parallel operations changes from 1 to 4.

In the processor 1, the fetch stage refers to the stage from the reading of the instruction memory 500 to the writing to the instruction buffer 11, the decode stage refers to the stage from the reading of the instruction buffer 11 to the writing to the registers 51 to 53, and the execution stage refers to the stage from the reading of the registers 51 to 53 to the writing to the registers 61 to 63.

Suppose, as depicted in FIG. 22, that in the instruction Com#3 loaded into the instruction buffer (InstBuff) 11 in cycle T0 of the reference clock RefCLK, the number of parallel operations is 1 and, in the instruction Com#4 loaded in cycle T1 that follows cycle T0, the number of parallel operations changes from 1 to 4, the number of parallel operations remaining at 4 in the instructions Com#4 to Com#7 sequentially loaded into the instruction buffer 11 in cycles T1 to T4. In cycle T1, the instruction Com#4 whose number of parallel operations P# is 4 is fetched into the instruction buffer 11.

Figure 23:
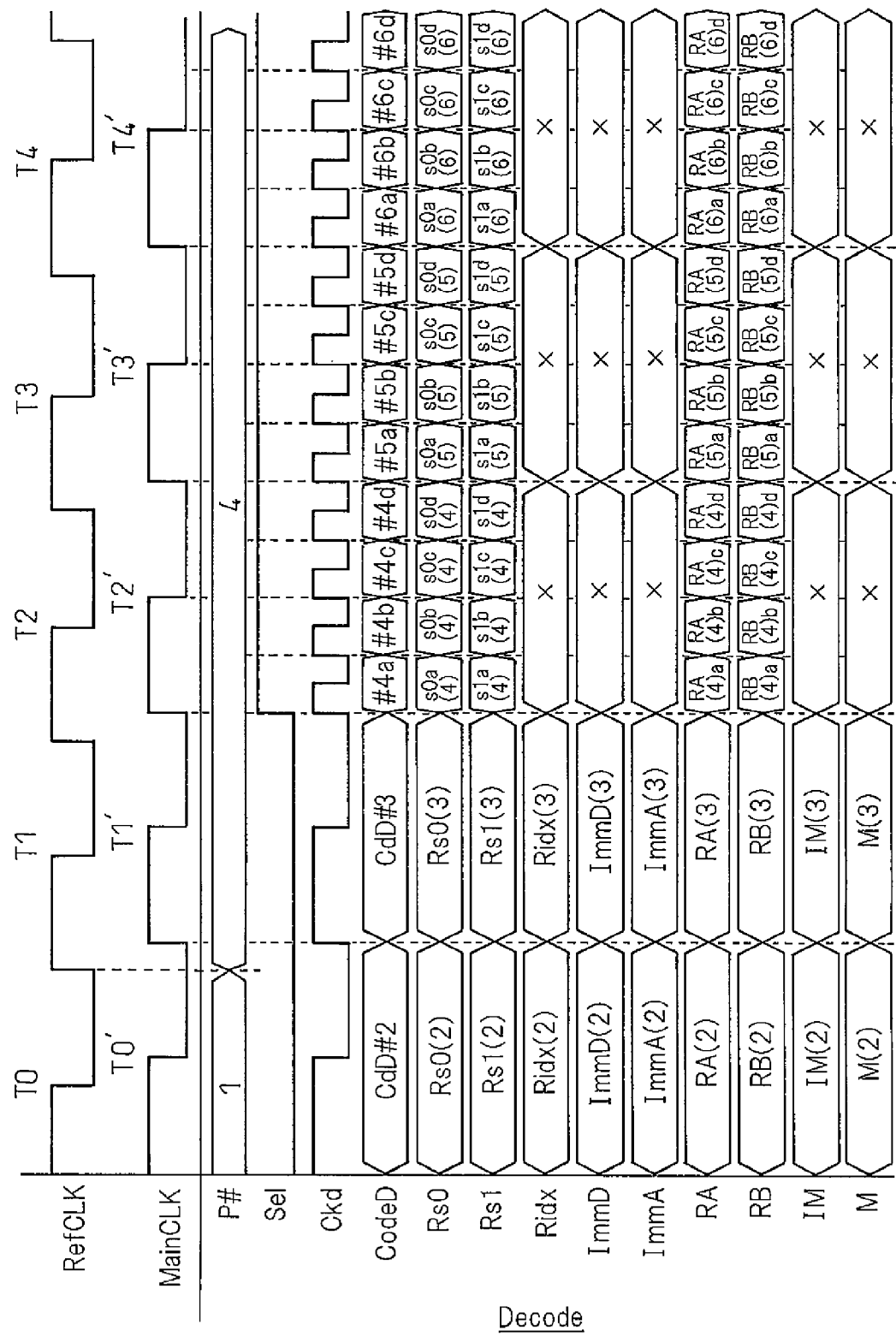
FIG. 23 is a timing chart illustrating the operation of the processor in a decode stage when the number of parallel operations changes from 1 to 4.

As depicted in FIG. 23, the number-of-parallel-operations signal generator 111 in the main decoder 12 changes the value of the number of parallel operations P# from 1 to 4 in cycle T1 upon receiving the instruction Com#4 from the instruction buffer 11. The number-of-parallel-operations signal (P#=4) is loaded into a register 171 in the clock control unit 19 illustrated in FIG. 21.

In FIG. 23, signal Sel indicates the select signal Sel output from the main decoder 12, signal Ckd indicates the decoding result hold timing clock signal Ckd, signal CodeD indicates the intermediate code CodeD latched into the register 41, signal Rs0 and Rs1 indicate the register numbers Rs0 and Rs1 latched into the registers 42 and 43, Ridx indicates the register number Ridx output from the main decoder 12, ImmD and ImmA indicate the immediate values ImmD and ImmA output from the main decoder 12, RA and RB indicate the register values RA and RB output from the register file 14, IM indicates the immediate value IM latched into the register 44, and M indicates the data value M output from the data memory 501.

The intermediate code CodeD, register numbers Rs0, Rs1, and Ridx, immediate values ImmD, ImmA, and IM, register values RA and RB, and the data value M obtained in response to decoding an instruction Com#j (j=0, 1, 2, ... ) fetched into the instruction buffer 11 are denoted by CdD#j, Rs0(j), Rs1(j), Ridx(j), ImmD(j), ImmA(j), IM(j), RA(j), RB(j), and M(j), respectively.

In particular, the plurality of intermediate codes generated by decoding an instruction Com#j whose number of parallel operations P# is not 1 are denoted by #ja, #jb, #jc, and #jd, the register numbers provided as the operands of the intermediate code #ja are denoted by s0a(j) and s1a(j), the register numbers provided as the operands of the intermediate code #jb are denoted by s0b(j) and s1b(j), the register numbers provided as the operands of the intermediate code #jc are denoted by s0c(j) and s1c(j), and the register numbers provided as the operands of the intermediate code #jd are denoted by s0d(j) and s1d(j).

The register values retrieved by the register numbers s0a(j) and s1a(j) are denoted by RA(j)a and RB(j)a, the register values retrieved by the register numbers s0b(j) and s1b(j) are denoted by RA(j)b and RB(j)b, the register values retrieved by the register numbers s0c(j) and s1c(j) are denoted by RA(j)c and RB(j)c, and the register values retrieved by the register numbers s0d(j) and s1d(j) are denoted by RA(j)d and RB(j)d.

The register 171 is a register that latches the number-of-parallel-operations signal P# from the main decoder 12 in synchronism with the clock Ck1 which is equal to the reference clock signal RefCLK, while a register 172 is a register that latches the output PQ0 of the register 171 in synchronism with the clock Ck1, and a register 173 is a register that latches the output PQ1 of the register 172 in synchronism with the clock Ck1. Accordingly, the output PQ0 of the register 171 lags one basic cycle $\Delta$Tb behind the number-of-parallel-operations signal P# output from the main decoder 12, the output PQ1 of the register 172 lags one basic cycle $\Delta$Tb behind the output PQ0 of the register 171, and the output PQ2d of the register 173 lags one basic cycle $\Delta$Tb behind the output PQ1 of the register 172.

Figure 26:
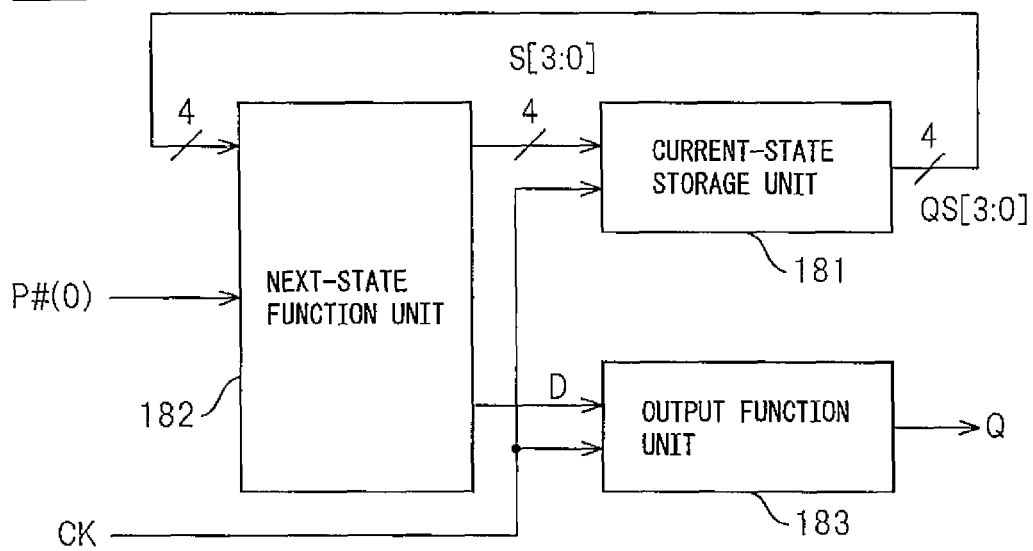
FIG. 26 is a diagram schematically illustrating the configuration of a clock inverter 140 depicted in FIG. 21.

FIG. 26 is a diagram schematically illustrating the configuration of the clock inverter 140 depicted in FIG. 21. The clock inverter 140 is a finite-state machine, as earlier described, and includes a current-state storage unit 181 which holds the current state QS, a next-state function unit 182 which determines the next state S based on the current state QS and the input P#(0), supplies the result to the current-state storage unit 181, and outputs a logic value D corresponding to the next state S, and an output function unit 183 which produces an output value Q based on the logic value D. The current-state storage unit 181 and the output function unit 183 are each constructed from a storage device, such as a flip-flop, that latches the input data by the input clock CLK to which the clock signal ×8CLK is applied. The clock inverters 141 to 143 are identical in configuration to the clock inverter 140.

Figure 27:
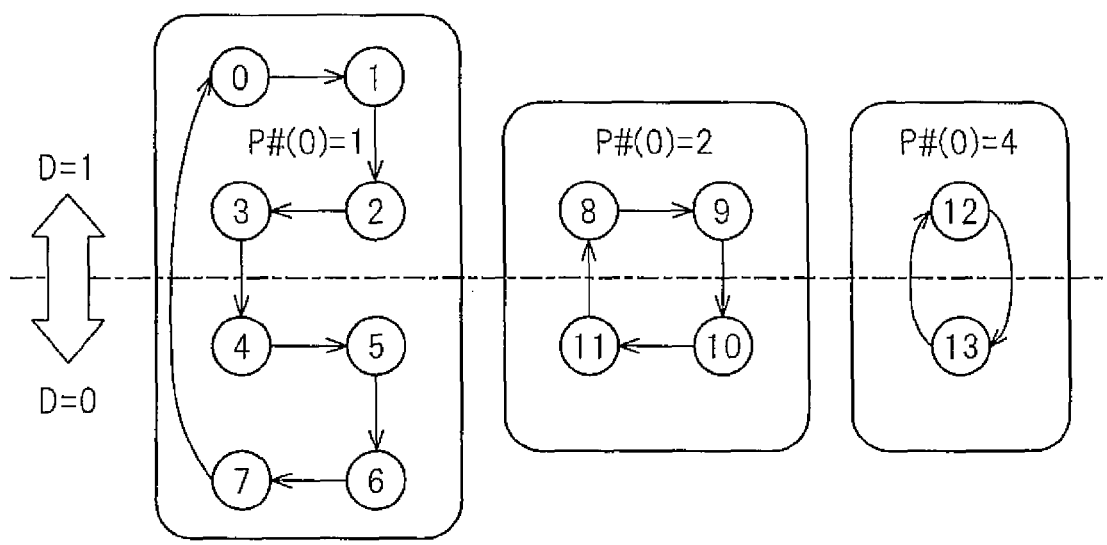
FIG. 27 is a state transition diagram of the clock inverter 140 depicted in FIG. 26.

FIG. 27 is a state transition diagram of the clock inverter 140 depicted in FIG. 26. The next-state function unit 182 determines the next state in such a manner that the state changes from "0" through to "7" in a cyclic fashion as long as the input P#(0) remains at 1. The next-state function unit 182 determines the next state in such a manner that the state changes from "8" through to "11" in a cyclic fashion as long as the input P#(0) remains at 2. The next-state function unit 182 determines the next state in such a manner that the state alternates cyclically between states "12" and "13" as long as the input P#(0) remains at 4.

Then, when the input P#(0) has changed to 1 from a value other than 1, the next state is set to "0", and when the input P#(0) has changed to 2 from a value other than 2, the next state is set to "8"; further, when the input P#(0) has changed to 4 from a value other than 4, the next state is set to "12".

The next-state function unit 182 determines the logic value D to be output to the output function 183, according to which of the states "0" to "13" is the next state S. The state transition diagram of FIG. 27 indicates that when the next state S is located above the semi-dashed line, the next-state function unit 182 outputs the logic value D=1 and, when the next state S is located below the semi-dashed line, the next-state function unit 182 outputs the logic value D=0. More specifically, the state transition diagram of FIG. 27 indicates that when the next state S takes any one of the states "0" to "3", "8", "9", and "12", the next-state function unit 182 outputs the logic value D=1 and, when the next state S takes any one of the states "4" to "7", "10", "11", and "13", the next-state function unit 182 outputs the logic value D=0.

In the state transition diagrams of FIGS. 32, 34, 36, 38, 40, 42, and 44 to be given later, the relationship between the next state S and the corresponding logic value D will also be illustrated using the same convention as that of FIG. 27.

Figure 28:
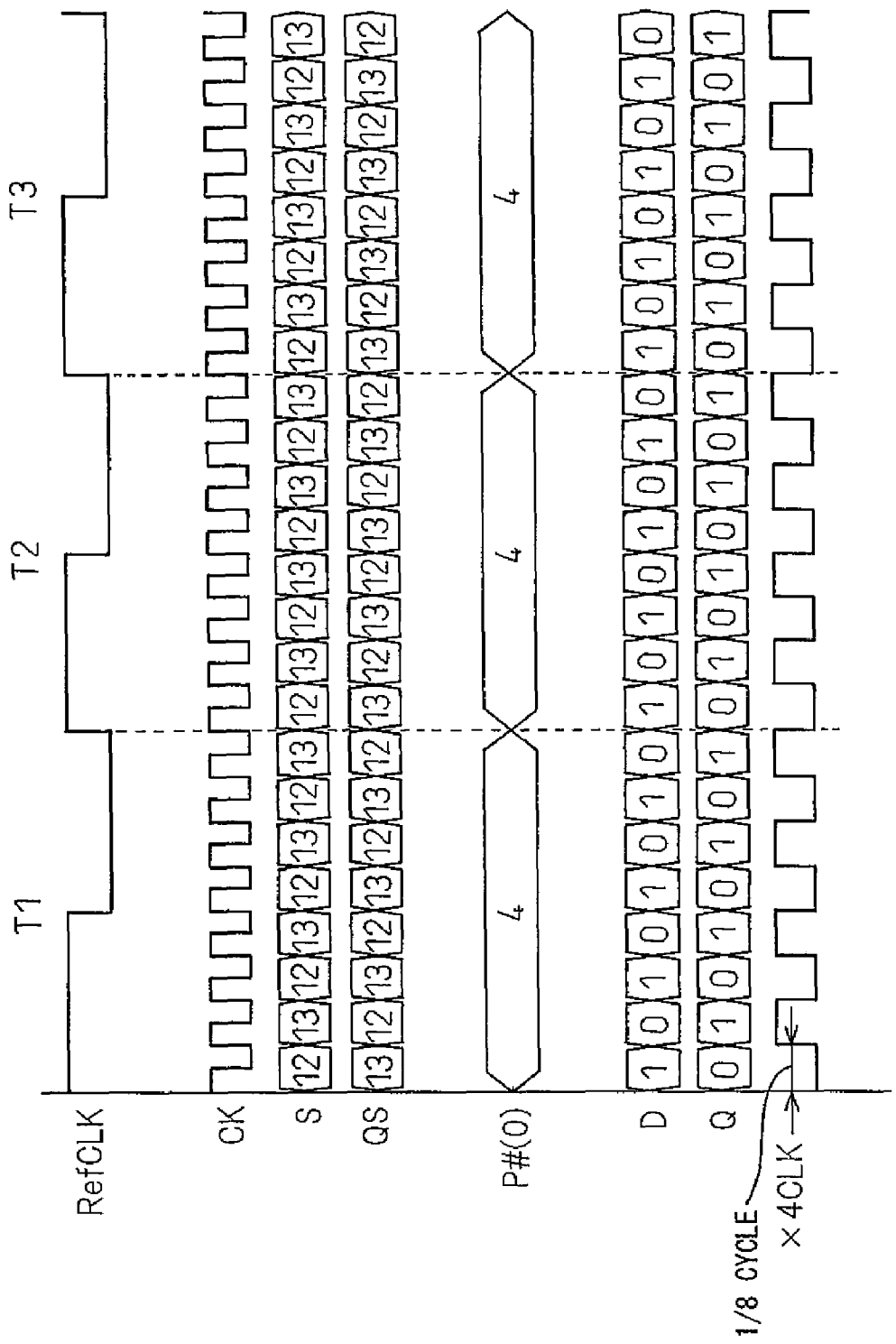
FIG. 28 is a timing chart illustrating the internal states of the clock inverter 140 depicted in FIG. 21.

FIG. 28 is a timing chart illustrating the internal states of the clock inverter 140 depicted in FIG. 21. The clock signal ×8CLK is supplied as the input clock CK to the clock inverter 140, and the constant "4" is supplied as the input P#(0) at all times. Accordingly, since the current state QS and the next state S alternately change between states "12" and "13" with a cycle corresponding to one eighth of the basic cycle $\Delta$Tb, the output Q is a clock signal whose output value changes between "1" and "0" with a cycle corresponding to one eighth of the basic cycle ΔTb, i.e., the clock signal ×4CLK.

Here, the rising edge of the clock signal ×4CLK lags ΔTb/8 relative to the rising edge of the reference clock RefCLK. This is due to the delay through the flip-flop constituting the output function unit 183.

Figure 29:
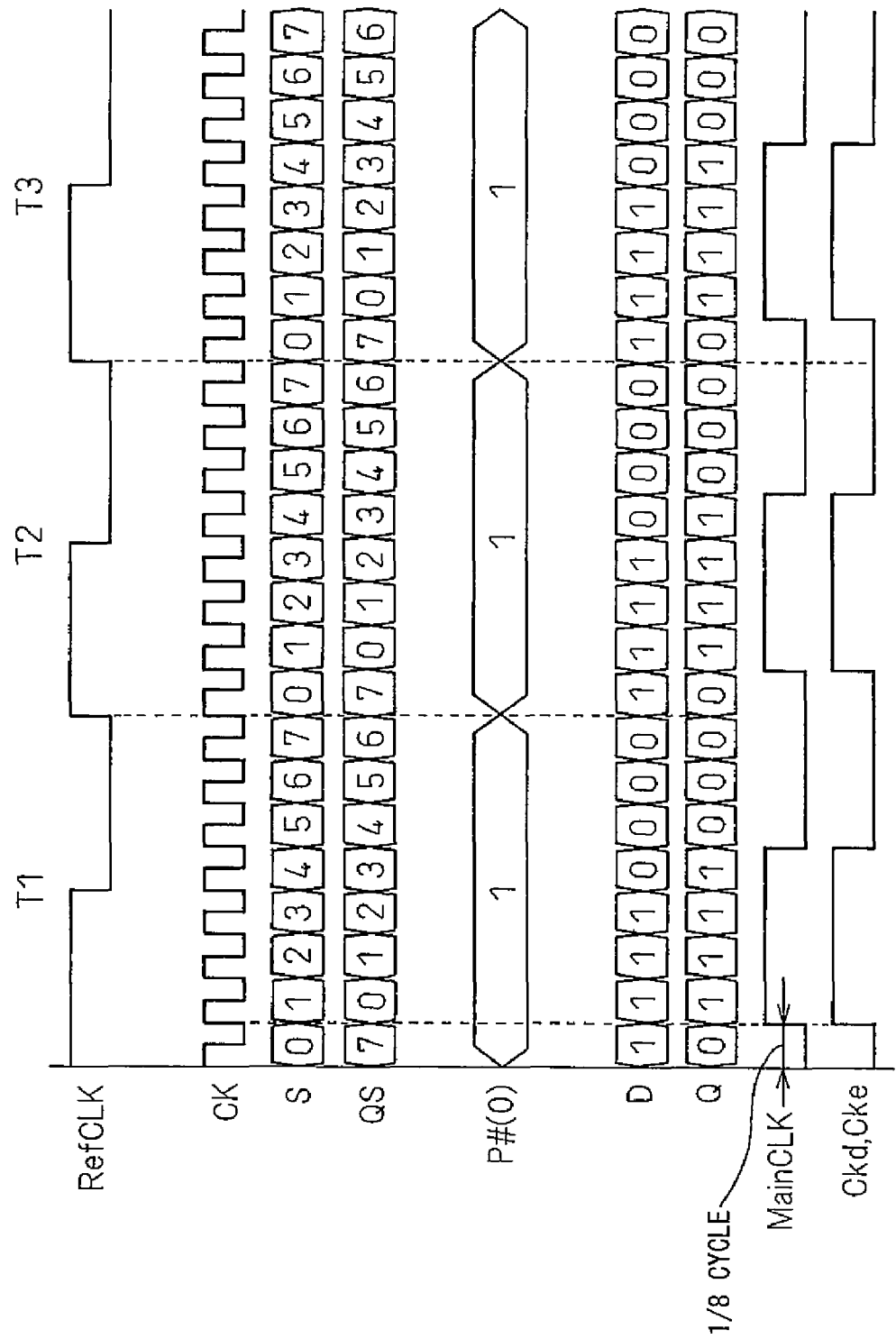
FIG. 29 is a timing chart illustrating the internal states of clock inverters 141 to 143 depicted in FIG. 21.

FIG. 29 is a timing chart illustrating the internal states of the clock inverters 141 to 143 depicted in FIG. 21.

The clock signal ×8CLK is supplied as the input clock CK to the clock inverter 141, and the constant "1" is supplied as the input P#(0) at all times. Accordingly, the current state QS and the next state S change from "0" through to "7" in a cyclic fashion with a cycle corresponding to one eighth of the basic cycle ΔTb. As a result, the output Q is a clock signal whose output value changes between "1" and "0" with a cycle of ΔTb/2. Therefore, the main clock MainCLK and execution result hold timing clock signal Ckw that the clock inverter 141 outputs are clock signals having the same cycle period as the basic cycle ΔTb.

Further, similarly to the clock signal ×4CLK, the main clock MainCLK and the execution result hold timing clock signal Ckw both lag ΔTb/8 relative to the rising edge of the reference clock RefCLK. The cycle of the main clock MainCLK that lags ΔTb/8 relative to the cycle Ti of the reference clock RefCLK (i=0, 1, 2, ... ) will hereinafter be denoted by Ti'.

As long as the input P#(0) remains at 1, the decoding result hold timing clock signal Ckd generated by the clock inverter 142 and the instruction dispatch timing clock signal Cke generated by the clock inverter 143 are the same as the main clock MainCLK.

As a result, as depicted in FIG. 23, the registers 41 to 45 that latch the inputs in synchronism with the clock signal Ckd update the decoding results at the same cycle as the cycle Ti' of the main clock MainCLK when the registers are holding the decoding results of an instruction whose number of parallel operations is 1.

As depicted in FIG. 24, the registers 51 to 53 from which data are retrieved in synchronism with the clock signal Cke output the execution code CodeExe and the input values A and B to the arithmetic-logic unit 17 at the same cycle as the cycle Ti' of the main clock MainCLK.

Figure 30:
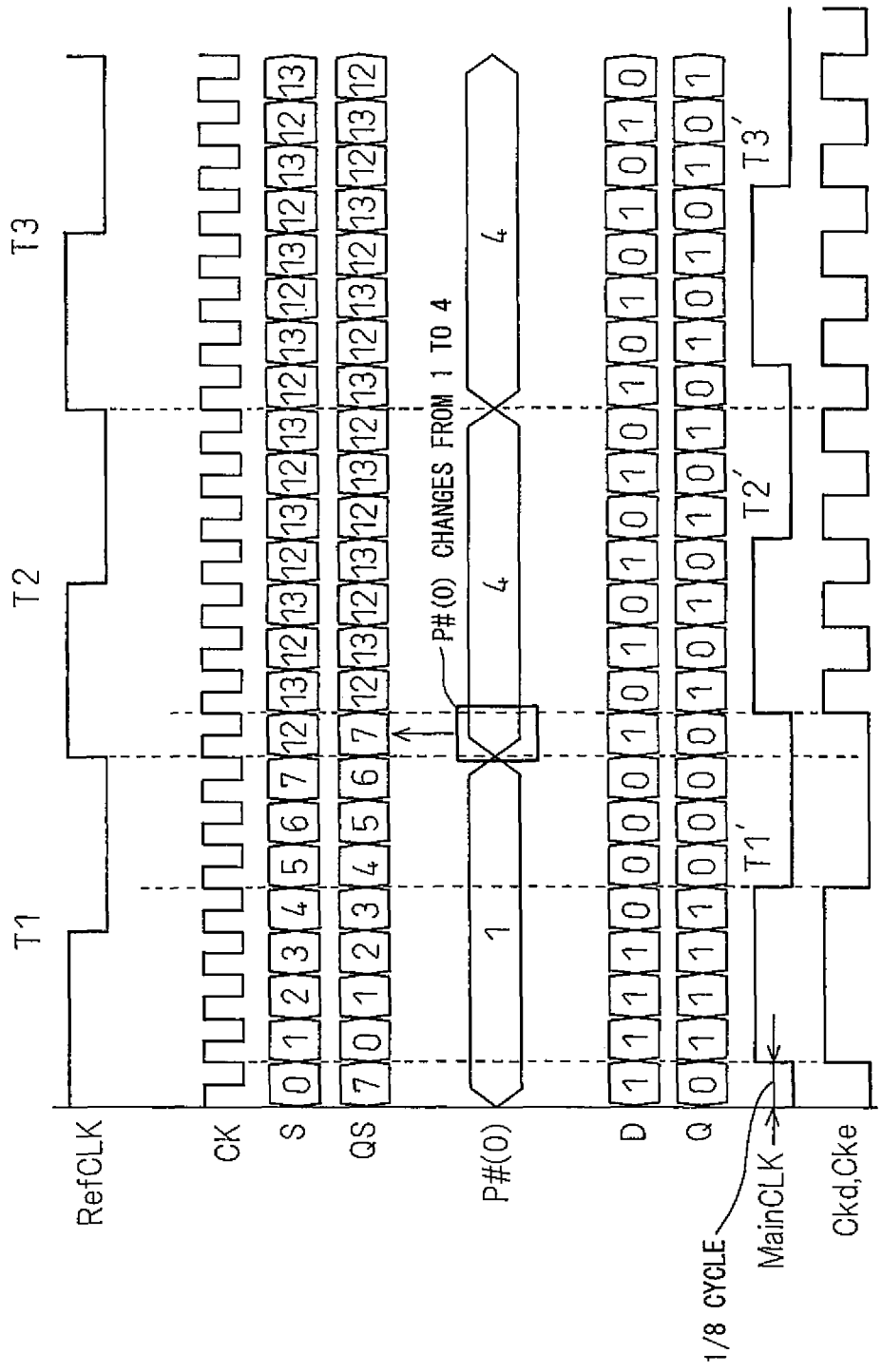
FIG. 30 is a timing chart illustrating the internal states of the clock inverters 142 and 143 depicted in FIG. 21.

FIG. 30 is a timing chart illustrating the internal states of the clock inverters 142 and 143 when the input P#(0) changes from "1" to "4". When the input P#(0) changes from "1" to "4" in cycle T2, the next state S is set to "12", and thereafter, the current state QS and the next state S alternately change between "12" and "13". As a result, the output Q begins to produce a clock signal having a cycle period of ΔTb/4, with a delay of ΔTb/8 after the input P#(0) has changed to 4.

As depicted in FIG. 21, the output PQ0 of the register 171 is applied to the input P#(0) of the clock inverter 142, and the output PQ1 of the register 172 is applied to the input P#(0) of the clock inverter 143.

Accordingly, as depicted in FIG. 23, the cycle period of the clock signal Ckd output from the clock inverter 142 changes with a delay of (1+1/8)×one basic cycle ΔTb after the change in the number-of-parallel-operations signal P# has been detected by the main decoder 12. In the illustrated timing chart, since the number-of-parallel-operations signal P# changes from "1" to "4", the cycle period of the clock signal Ckd changes from ΔTb to ΔTb/4. When an instruction whose number-of-parallel-operations signal P# is not 1 is decoded by the main decoder 12, and the intermediate codes and operands are output from the instruction queue 117 at intervals of time shorter than the basic cycle ΔTb, the registers 41 to 43 sequentially latch them by the clock signal Ckd whose cycle has been changed as described above.

Further, as depicted in FIGS. 23 and 24, the cycle period of the clock signal Cke output from the clock inverter 143 changes with a delay of one basic cycle ΔTb after the clock signal Ckd output from the clock inverter 142 has changed.

In FIG. 24, signal Cke indicates the instruction dispatch timing clock signal Cke, signal CodeExe indicates the execution code CodeExe output from the register 51 for input to the arithmetic-logic unit 17, signals A and B indicate the first and second input data A and B output from the registers 52 and 53 for input to the arithmetic-logic unit 17, signals φ20 to φ22 indicate the clock signals φ20 to φ22 supplied from the clock control unit 19 to the arithmetic-logic unit 17, signals CKEN20 to CKEN22 indicate the mode switching signals CKEN20 to CKEN22 supplied from the clock control unit 19 to the arithmetic-logic unit 17, and signal φ23 indicates the register update clock φ23 supplied from the clock control unit 19 to the register file 14.

CD1 to CD3 indicate the execution codes output from the pipeline registers 211, 221, and 231 in the arithmetic-logic unit 17 of FIG. 20 for input to the respective sub-arithmetic-logic units 202 to 204. For example, in the fourth quarter of cycle T3', the sub-arithmetic-logic unit 201 receives the execution code #4d, the sub-arithmetic-logic unit 202 receives the execution code #4c, the sub-arithmetic-logic unit 203 receives the execution code #4b, and the sub-arithmetic-logic unit 204 receives the execution code #4a.

Signals S and F respectively indicate the operation result S and flag F output from the arithmetic-logic unit 17, and signal Rd indicates the destination register specification Rd output from the decoder 252 in the arithmetic-logic unit 17.

The execution code CodeExe obtained by decoding the instruction Com#j (j=0, 1, 2, ... ) fetched into the instruction buffer 11 is denoted by CdE#j, and the first and second input data A and B to the arithmetic-logic unit 17, obtained by decoding the instruction Com#j, are denoted by A(j) and B(j), respectively.

In particular, the plurality of execution codes generated by decoding the instruction Com#j whose number of parallel operations P# is not 1 are denoted by #ja, #jb, #jc, and #jd. Further, the plurality of first input data generated by decoding the instruction Com#j whose number of parallel operations P# is not 1 are denoted by Aa(j), Ab(j), Ac(j), and Ad(j). Similarly, the plurality of second input data generated by decoding the instruction Com#j whose number of parallel operations P# is not 1 are denoted by Ba(j), Bb(j), Bc(j), and Bd(j).

The result S of the operation between the first and second input data Aa(j) and Ba(j) and the flag F associated with it are denoted by Sa(j) and FLa(j), respectively, the result S of the operation between Ab(j) and Bb(j) and the flag F associated with it are denoted by Sb(j) and FLb(j), respectively, the result S of the operation between Ac(j) and Bc(j) and the flag F associated with it are denoted by Sc(j) and FLc(j), respectively, and the result S of the operation between Ad(j) and Bd(j) and the flag F associated with it are denoted by Sd(j) and FLd(j), respectively.

Further, the destination register specifications generated by decoding the instruction Com#j whose number of parallel operations P# is not 1 are denoted by Rda(j), Rdb(j), Rdc(j), and Rdd(j).

As depicted in FIG. 20, the pipeline register 211 for holding the execution code and the pipeline registers 212 to 217 for holding the input values A and B are driven by the same clock φ20 and the same mode switching signal CKEN20; likewise, the pipeline register 221 and the pipeline registers 222 to 225 are driven by the same clock φ21 and the same mode switching signal CKEN21, and the pipeline register 231 and the pipeline registers 232 to 235 are driven by the same clock φ22 and the same mode switching signal CKEN22.

Accordingly, when receiving a given execution code #jx (x=a, b, . . . ), each of the sub-arithmetic-logic units 201 to 204 also receives the first input data Ax(j) and Bx(j) associated with the execution code #jx, at the same time when receiving the execution code #jx.

As depicted in FIG. 12, the decoding result hold timing clock signal Ckd and the instruction dispatch timing clock signal Cke are supplied to the registers 51 to 53, i.e., the first-in, first-out buffers provided between the decode and execution stages of the processor 1. The clock signal Ckd is used as a clock that defines the timing for writing data to the registers 51 to 53, and the clock Cke is used as a clock that defines the timing for reading data from the registers 51 to 53.

As depicted in FIGS. 23 and 24, the instruction being processed in the decode stage of the processor 1 lags one basic cycle ΔTb behind the instruction being processed in the execution stage. Accordingly, if the number of parallel operations P# contained in the instruction Com#j fetched in a given cycle Tj is not 1, the main decoder 12 beings to output the intermediate codes #ja, #jb, . . . and the register numbers S0a(j), S0b(j), . . . , S1a(j), S1b(j), . . . when the execution stage is in the middle of processing the instruction Com#(j−1) fetched in the preceding cycle (j−1).

Therefore, the registers 51 to 53 as the first-in, first-out buffers are provided between the decode and execution stages, and the data read clock signal Cke is delayed by one basic cycle ΔTb relative to the data write clock signal Ckd. By providing registers 51 to 53, the intermediate codes #ja, #jb, . . . and the register numbers S0a(j), S0b(j), . . . , S1a(j), S1b(j), . . . obtained by decoding the instruction Com#j can be held in the registers while the execution stage is processing the execution code obtained by decoding the preceding instruction Com#(j−1).

Figure 31:
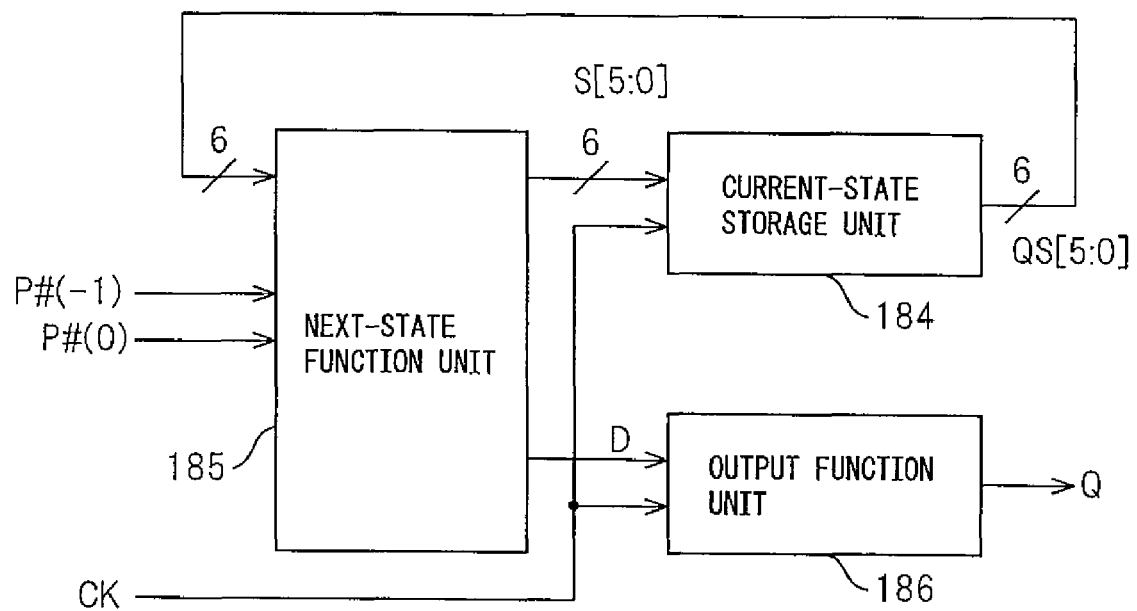
FIG. 31 is a diagram schematically illustrating the configuration of a clock inverter 151 depicted in FIG. 21.

The operation of the clock inverters 151 to 154 for generating the clock signals φ20 to φ23 depicted in FIG. 24 and the operation of the mode switching signal generators 161 to 163 for generating the mode switching signals CKEN20 to CKEN22 depicted in FIG. 24 will be described below. FIG. 31 is a diagram schematically illustrating the configuration of the clock inverter 151 depicted in FIG. 21. The clock inverter 151 is a finite-state machine, as earlier described, and includes a current-state storage unit 184 which holds the current state QS, a next-state function unit 185 which determines the next state S based on the current state QS and the inputs P#(0) and P#(−1), supplies the result to the current-state storage unit 184, and outputs a logic value D corresponding to the next state S, and an output function unit 186 which produces an output value Q based on the logic value D. The current-state storage unit 184 and the output function unit 186 are each constructed from a storage device, such as a flip-flop, that latches the input data by the input clock CLK to which the clock signal ×8CLK is applied. The clock inverters 152 to 154 are identical in configuration to the clock inverter 151.

Referring to FIG. 21, the output PQ1 of the register 172 is applied to the input P#(0) of the clock inverter 151. Accordingly, when the number of parallel operations changes, the input P#(0) of the clock inverter 151 that generates clock φ20 changes with the same timing as the input P#(0) of the clock inverter 143 that generates the instruction dispatch timing clock signal Cke. On the other hand, the output PQ2d of the register 173 is applied to the input P#(−1) of the clock inverter 151, so that the input P#(−1) lags one basic cycle ΔTb behind the input P#(0).

Figure 32:
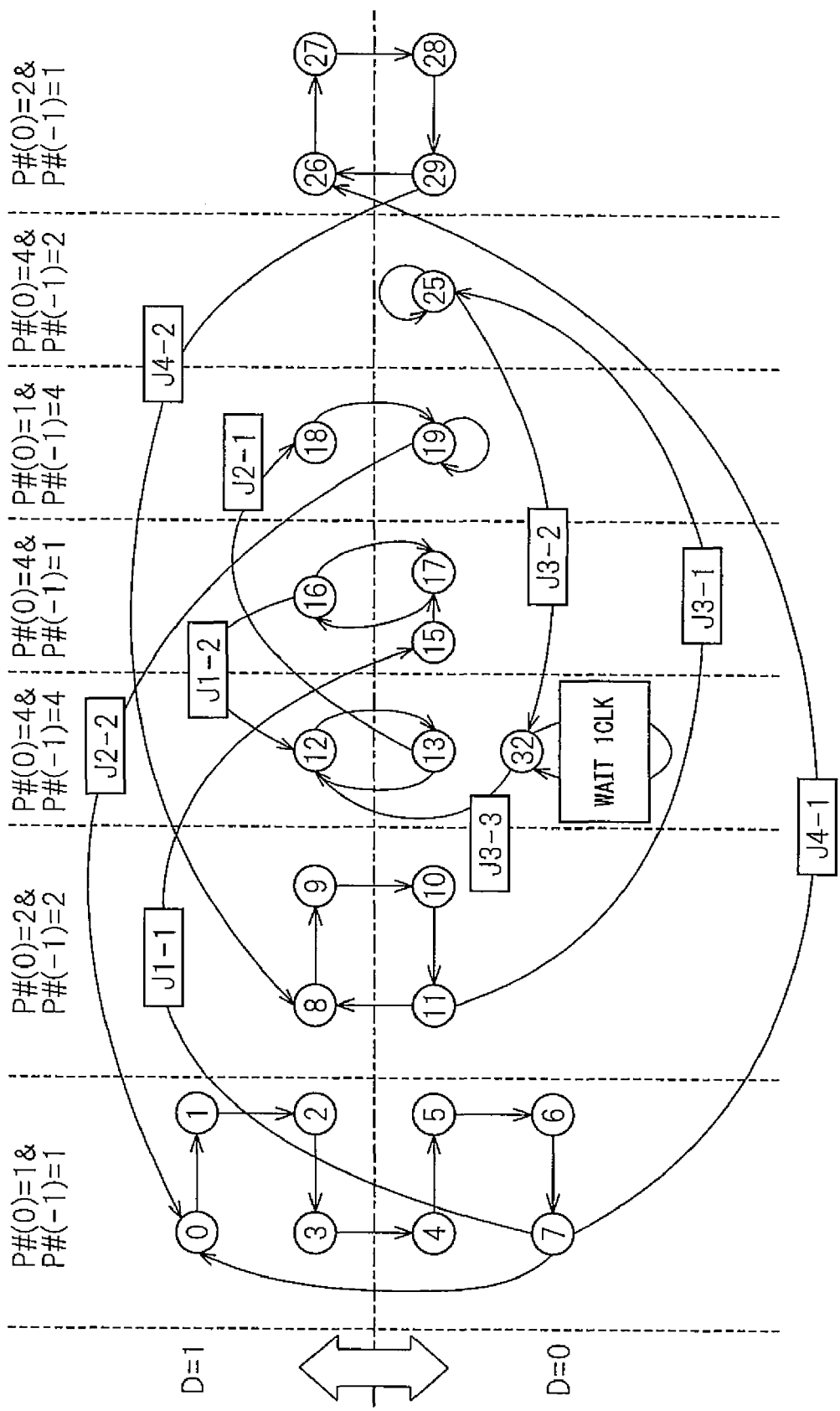
FIG. 32 is a state transition diagram of the clock inverter 151 depicted in FIG. 21.

FIG. 32 is a state transition diagram of the clock inverter 151 depicted in FIG. 21. The next state S is determined in such a manner that the state changes from "0" through to "7" in a cyclic fashion as long as the number of parallel operations remains at 1, that is, as long as P#(0)=P#(−1)=1.

When P#(0) has changed to 4 with the number of parallel operations changing from 1 to 4, the next state S changes to "15" along the line indicated by reference numeral J1-1. Then, as long as P#(0)=4 and P#(−1)=1, the next state alternates cyclically between states "17" and "16".

When one basic cycle ΔTb has elapsed after P#(0) changed to 4, P#(−1) changes to 4. At this time, the next state S changes to "12" along the line indicated by reference numeral J1-2. Thereafter, the next state alternates cyclically between states "12" and "13".

Figure 33:
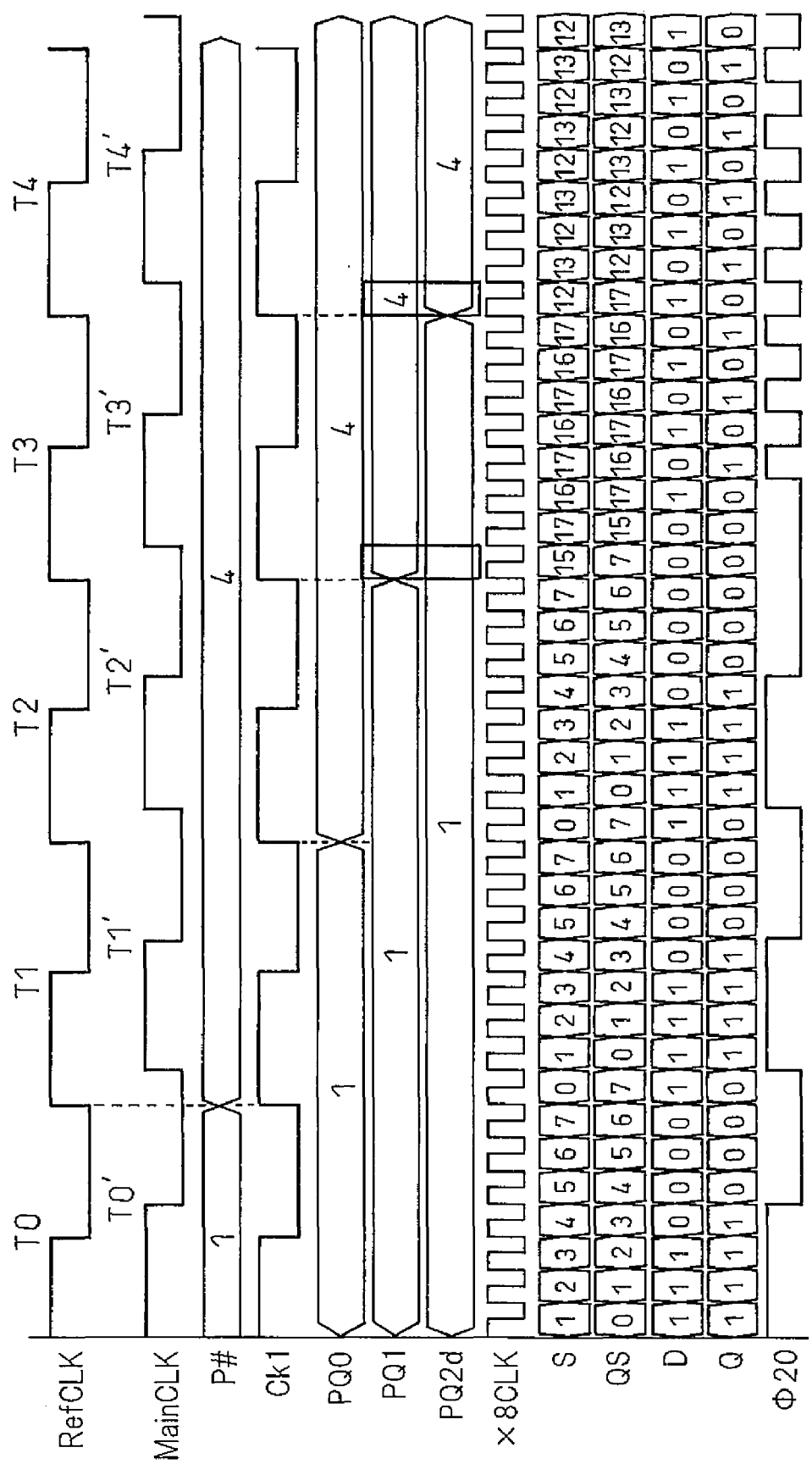
FIG. 33 is a timing chart illustrating the internal states of the clock inverter 151 when the number of parallel operations changes from 1 to 4.

FIG. 33 is a timing chart illustrating the internal states of the clock inverter 151 when the number of parallel operations changes from 1 to 4. When the number of parallel operations changes from 1 to 4, the cycle period of the output φ20 of the clock inverter 151 changes from the basic cycle ΔTb to ΔTb/4 with a delay of ΔTb/4 after the instruction dispatch timing clock signal Cke has changed.

Referring to FIG. 21, the output PQ2 of a register 174 is applied to the input P#(0) of the clock inverter 152. Here, the register 174 is a register that latches the output PQ1 of the register 172 in synchronism with the clock signal Ck4, while a register 175 is a register that latches the output PQ2 of the register 174 in synchronism with the clock signal Ck4, a register 176 is a register that latches the output PQ3 of the register 175 in synchronism with the clock signal Ck4, and a register 177 is a register that latches the output PQ4 of the register 176 in synchronism with the clock signal Ck4.

Accordingly, the output PQ2 of the register 174 lags ΔTb/4 behind the output PQ1 of the register 172, the output PQ3 of the register 175 lags ΔTb/4 behind the output PQ2 of the register 174, the output PQ4 of the register 176 lags ΔTb/4 behind the output PQ3 of the register 175, and the output PQ5 of the register 177 lags ΔTb/4 behind the output PQ4 of the register 176.

When the number of parallel operations changes, the input P#(0) of the clock inverter 152 that generates the clock signal φ21 changes with a delay of ΔTb/4 relative to the input P#(0) of the clock inverter 151 that generates the clock signal φ20. On the other hand, the output PQ3 of the register 175 is applied to the input P#(−1) of the clock inverter 152, so that the input P#(−1) lags ΔTb/4 behind the input P#(0).

Figure 34:
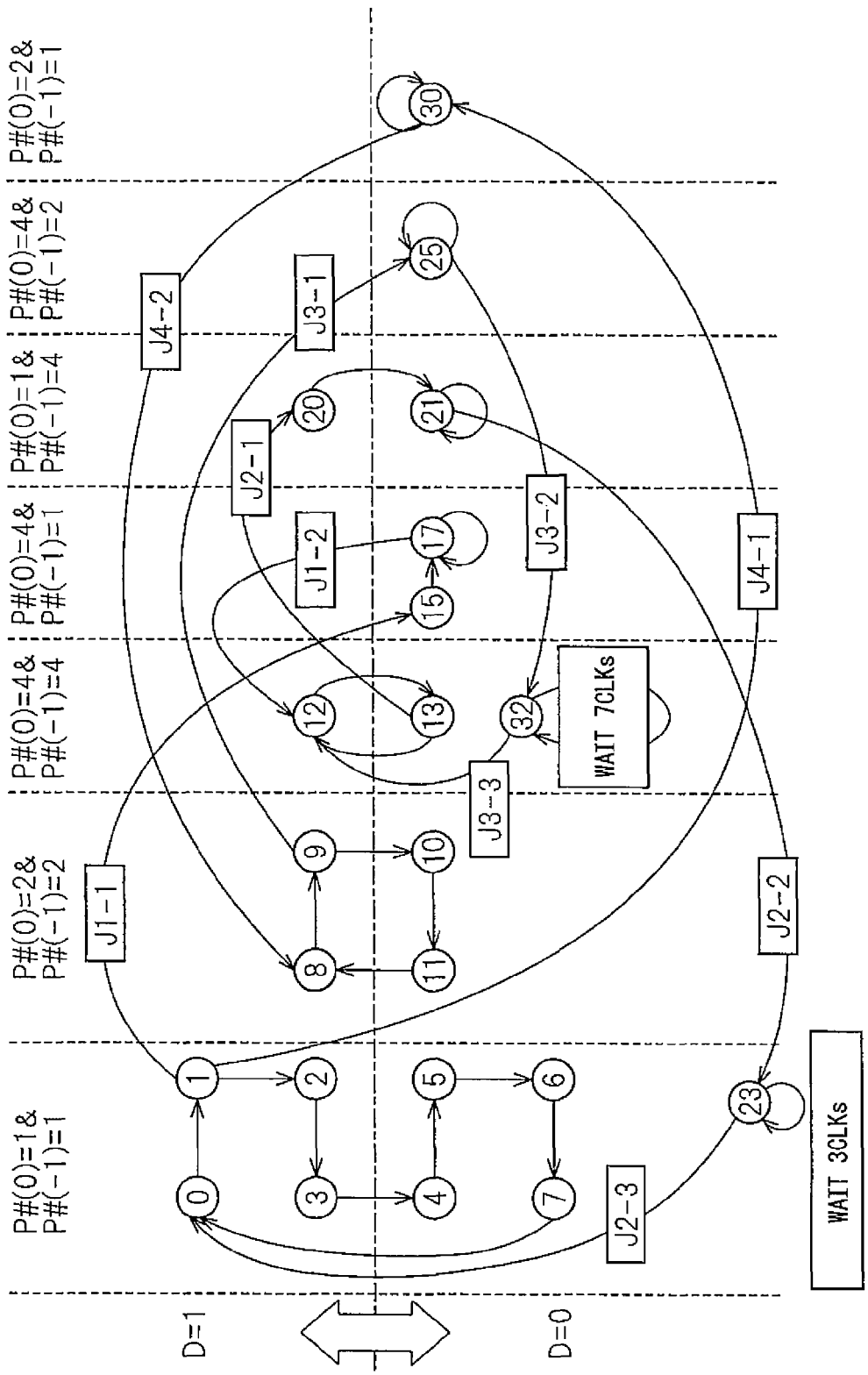
FIG. 34 is a state transition diagram of a clock inverter 152 depicted in FIG. 21.

FIG. 34 is a state transition diagram of the clock inverter 152 depicted in FIG. 21. The next state S is determined in such a manner that the state changes from "0" through to "7" in a cyclic fashion as long as the number of parallel operations remains at 1, i.e., as long as P#(0)=P#(−1)=1.

When P#(0) has changed to 4, the next state S changes to "15" along the line indicated by reference numeral J1-1. Then, as long as P#(0)=4 and P#(−1)=1, the next state remains at "17".

When ΔTb/4 has elapsed after P#(0) changed to 4, P#(−1) changes to 4. At this time, the next state S changes to "12" along the line indicated by reference numeral J1-2. Thereafter, the next state alternates cyclically between states "12" and "13".

Figure 35:
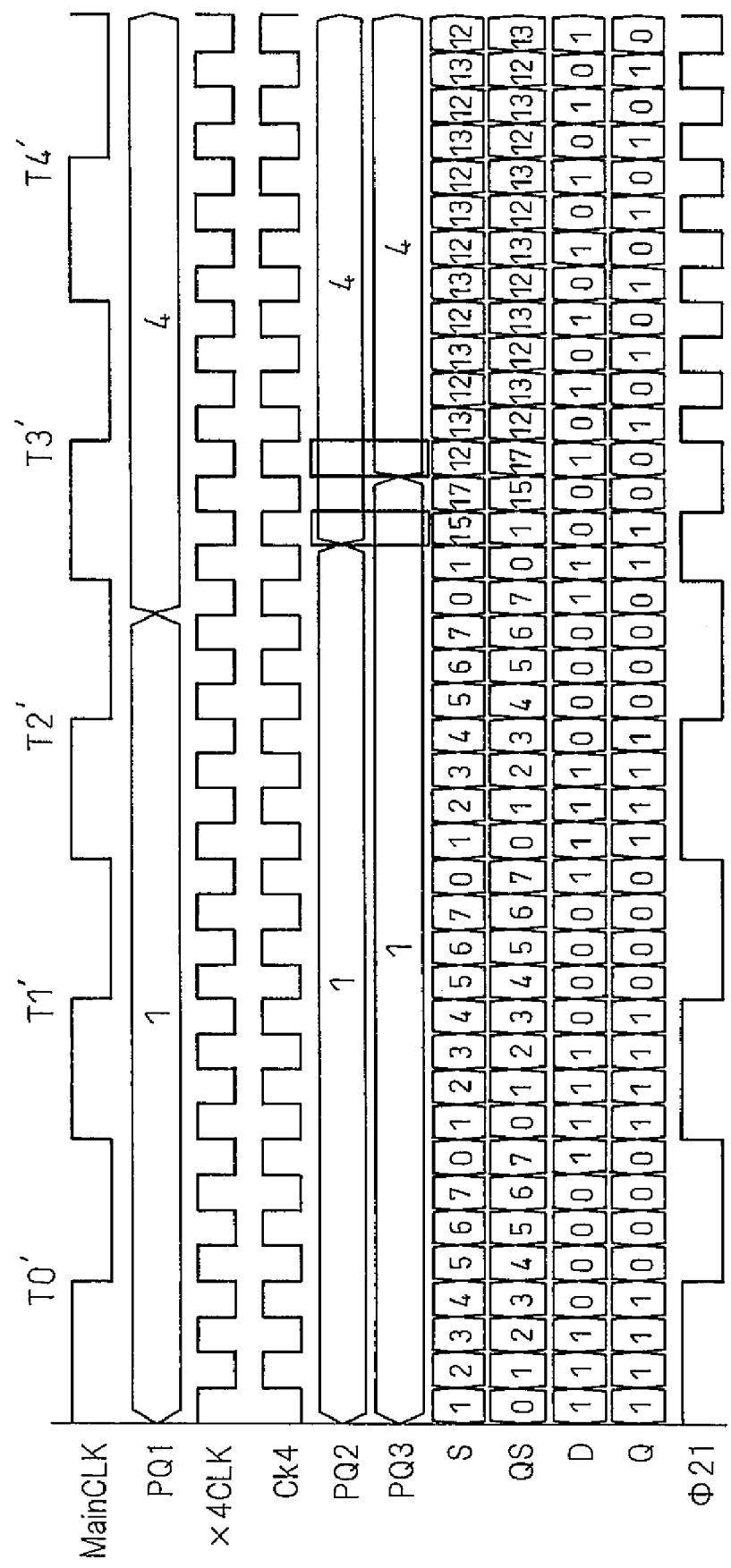
FIG. 35 is a timing chart illustrating the internal states of the clock inverter 152 when the number of parallel operations changes from 1 to 4.

FIG. 35 is a timing chart illustrating the internal states of the clock inverter 152 when the number of parallel operations changes from 1 to 4. When the number of parallel operations changes from 1 to 4, the cycle period of the output φ21 of the clock inverter 152 changes from the basic cycle ΔTb to ΔTb/4 with a delay of ΔTb/4 after the clock signal φ20 has changed.

Referring to FIG. 21, the output PQ3 of the register 175 is applied to the input P#(0) of the clock inverter 153. Accordingly, when the number of parallel operations changes, the input P#(0) of the clock inverter 153 that generates the clock signal φ22 changes with a delay of ΔTb/4 relative to the input P#(0) of the clock inverter 152 that generates the clock signal φ21. On the other hand, the output PQ4 of the register 176 is applied to the input P#(-1) of the clock inverter 153, so that the input P#(-1) lags ΔTb/4 behind the input P#(0).

Figure 36:
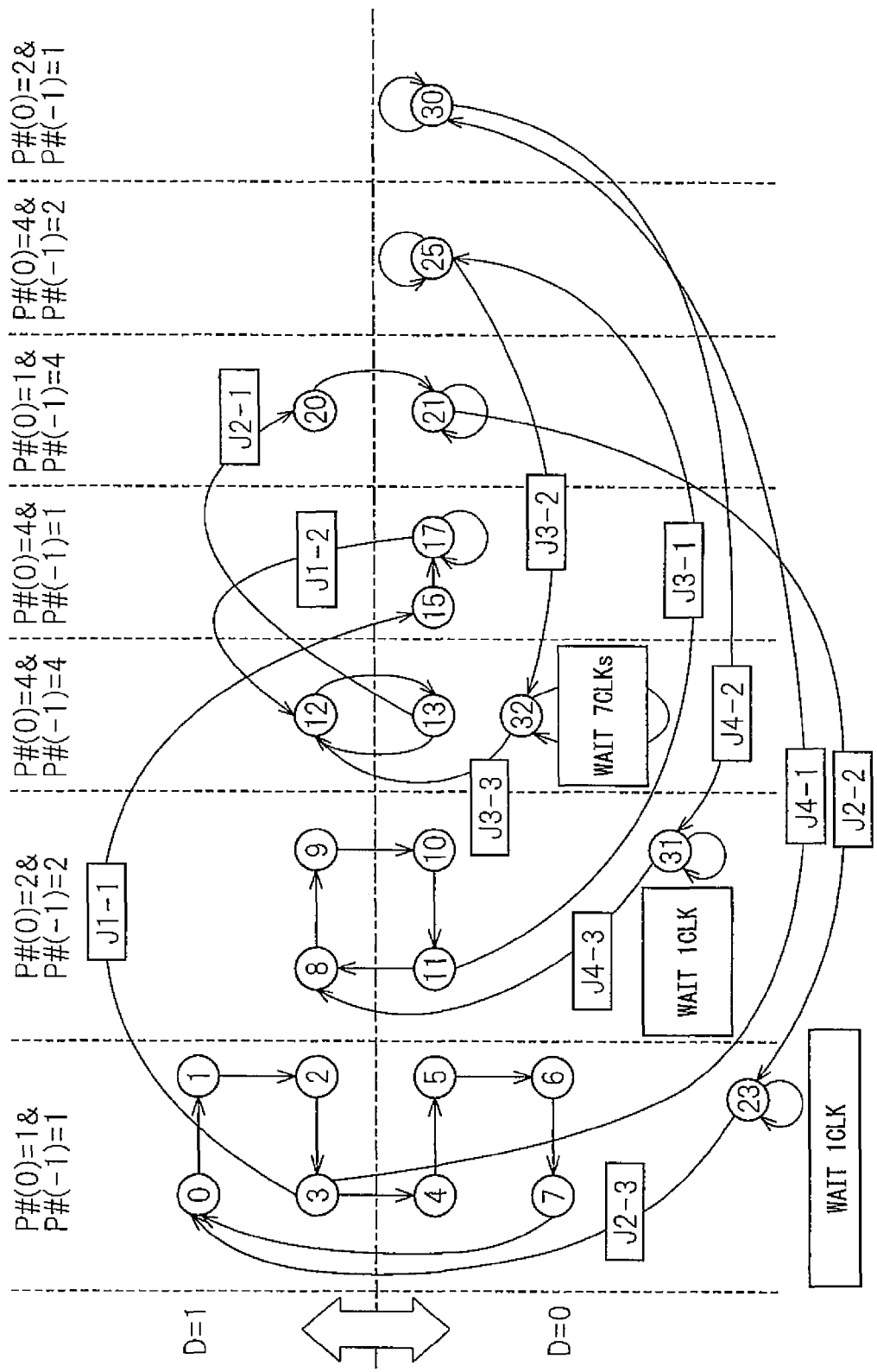
FIG. 36 is a state transition diagram of a clock inverter 153 depicted in FIG. 21.
Figure 37:
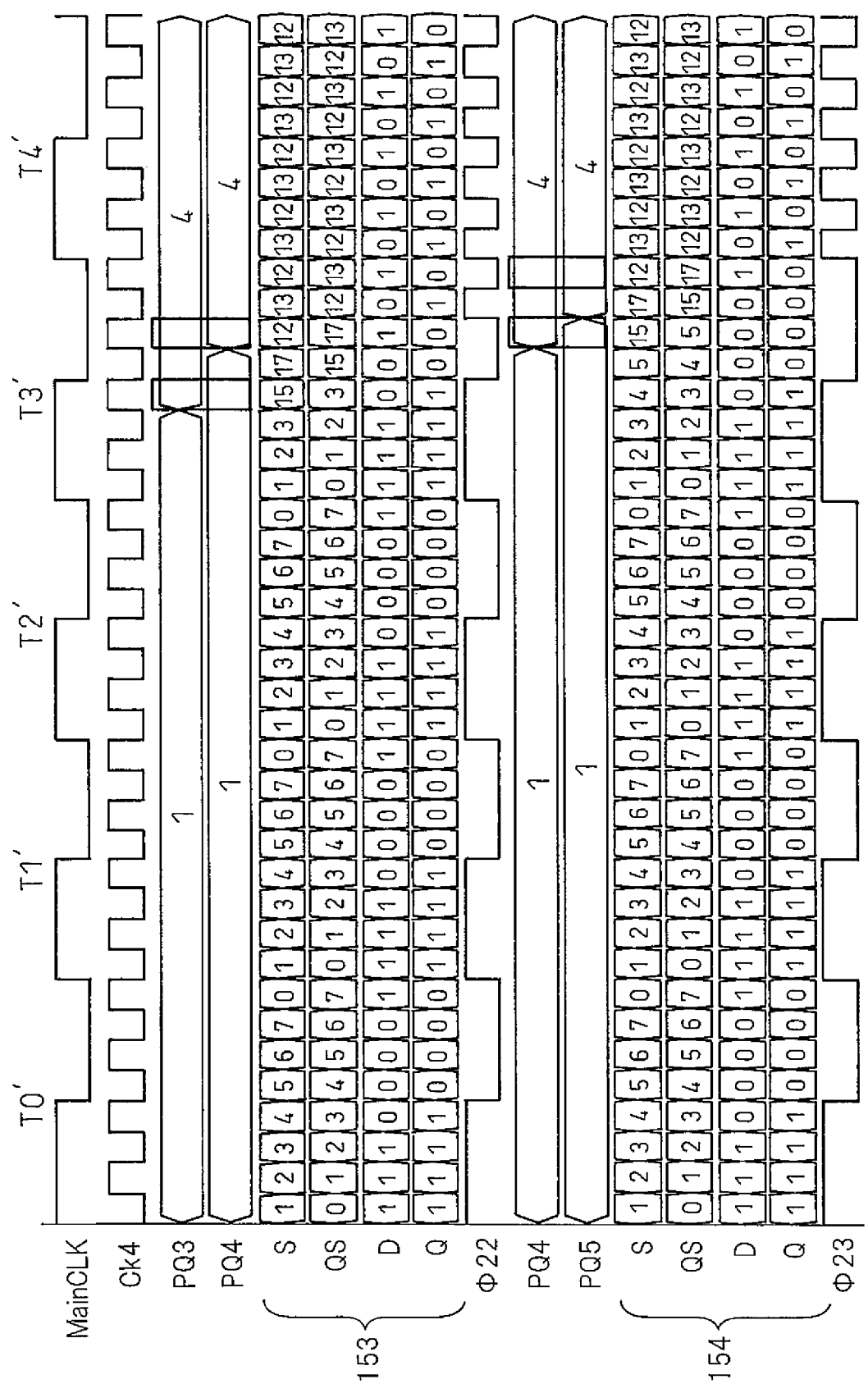
FIG. 37 is a timing chart illustrating the internal states of the clock inverters 153 and 154 when the number of parallel operations changes from 1 to 4.

FIG. 36 is a state transition diagram of the clock inverter 153 depicted in FIG. 21. The state transitions that occur in the clock inverter 153 when the number of parallel operations changes from 1 to 4 are the same as the state transitions that occur in the clock inverter 152. FIG. 37 is a timing chart illustrating the internal states of the clock inverters 153 and 154 when the number of parallel operations changes from 1 to 4. When the number of parallel operations changes from 1 to 4, the cycle period of the output φ22 of the clock inverter 153 changes from the basic cycle ΔTb to ΔTb/4 with a delay of ΔTb/4 after the clock signal φ21 has changed.

Referring to FIG. 21, the output PQ4 of the register 176 is applied to the input P#(0) of the clock inverter 154. Accordingly, when the number of parallel operations changes, the input P#(0) of the clock inverter 154 that generates the clock signal φ23 changes with a delay of ΔTb/4 relative to the input P#(0) of the clock inverter 153 that generates the clock signal φ22. On the other hand, the output PQ5 of the register 177 is applied to the input P#(-1) of the clock inverter 154, so that the input P#(-1) lags ΔTb/4 behind the input P#(0).

Figure 38:
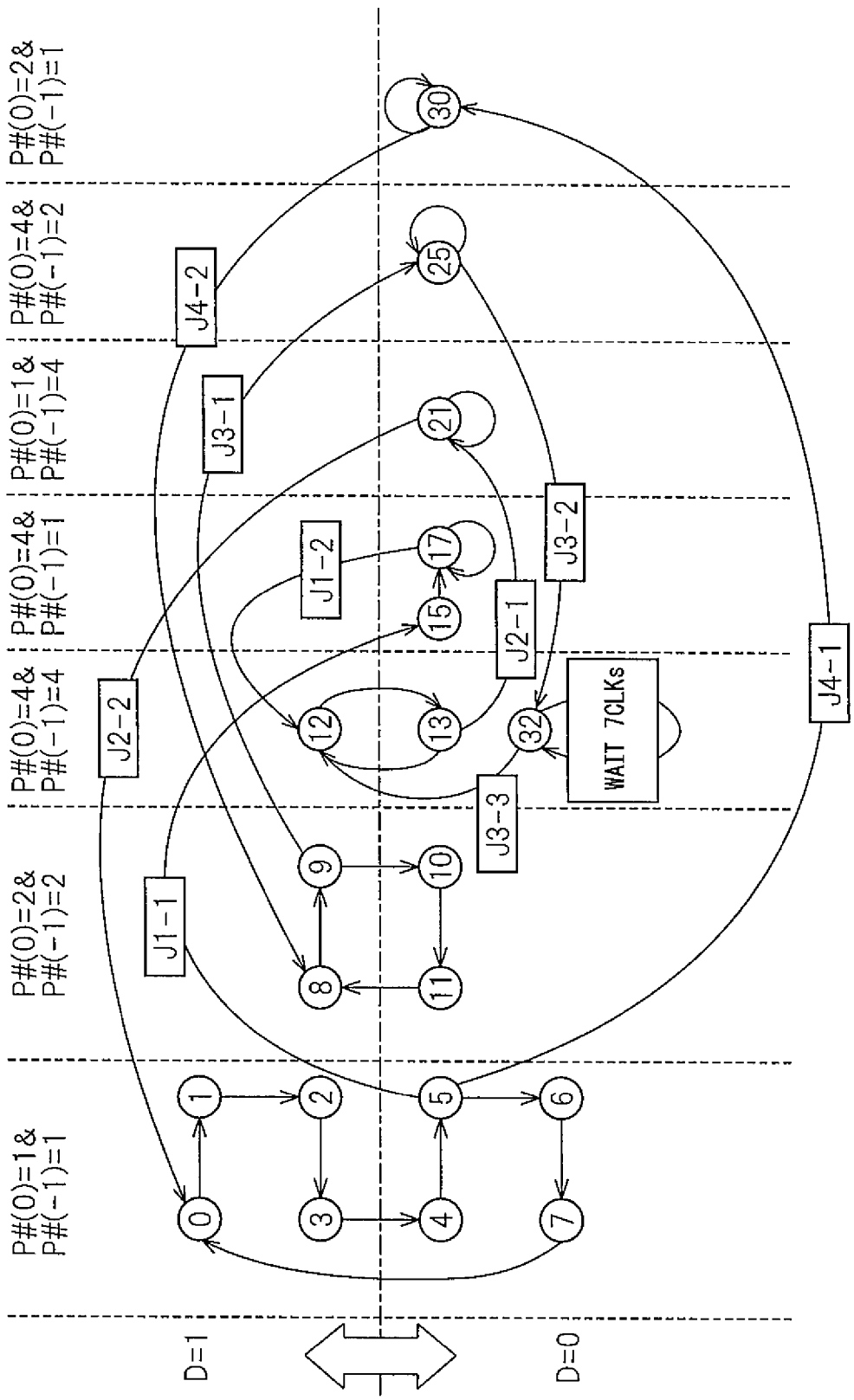
FIG. 38 is a state transition diagram of the clock inverter 154 depicted in FIG. 21.

FIG. 38 is a state transition diagram of the clock inverter 154 depicted in FIG. 21. The state transitions that occur in the clock inverter 154 when the number of parallel operations changes from 1 to 4 are the same as the state transitions that occur in the clock inverter 152. Accordingly, as depicted in FIG. 37, when the number of parallel operations changes from 1 to 4, the cycle period of the output φ23 of the clock inverter 154 changes from the basic cycle ΔTb to ΔTb/4 with a delay of ΔTb/4 after the clock signal φ22 has changed.

Figure 39:
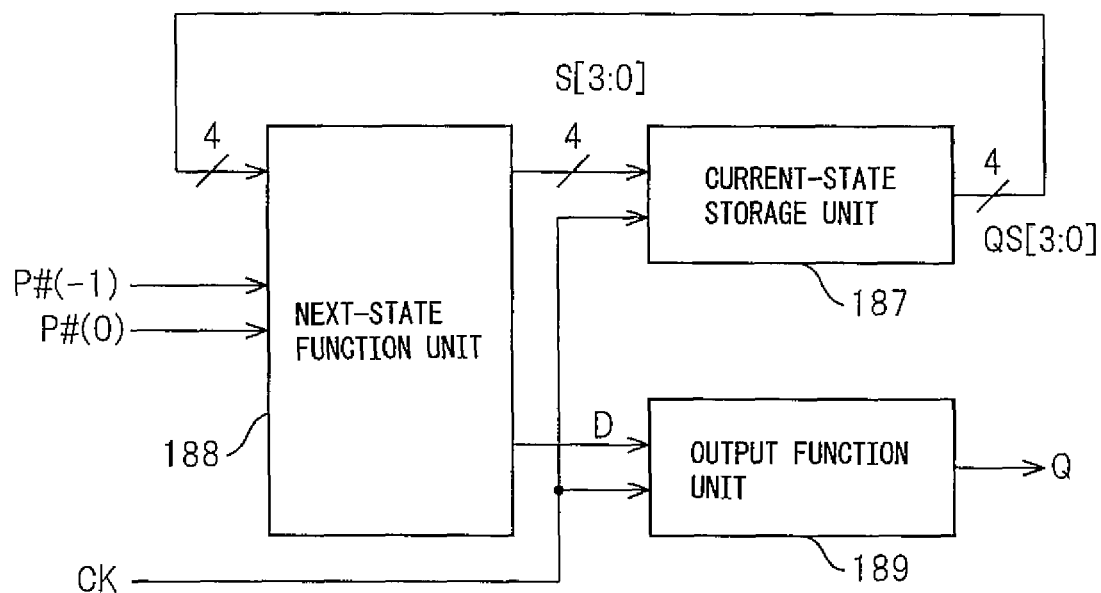
FIG. 39 is a diagram schematically illustrating the configuration of a mode switching signal generator 161 depicted in FIG. 21.

FIG. 39 is a diagram schematically illustrating the configuration of the mode switching signal generator 161 depicted in FIG. 21. The mode switching signal generator 161 is a finite-state machine, and includes a current-state storage unit 187 which holds the current state QS, a next-state function unit 188 which determines the next state S based on the current state QS and the inputs P#(0) and P#(-1), supplies the result to the current-state storage unit 187, and outputs a logic value D corresponding to the next state S, and an output function unit 189 which produces an output value Q based on the logic value D. The current-state storage unit 187 and the output function unit 189 are each constructed from a storage device, such as a flip-flop, that latches the input data by the input clock CLK to which the clock signal ×8CLK is applied. The mode switching signal generators 162 and 163 are identical in configuration to the mode switching signal generator 161.

Referring to FIG. 21, the output PQ1 of the register 172 is applied to the input P#(0) of the mode switching signal generator 161. Accordingly, when the number of parallel operations changes, the input P#(0) of the mode switching signal generator 161 changes with the same timing as the input P#(0) of the clock inverter 143 that generates the instruction dispatch timing clock signal Cke. On the other hand, the output PQ2d of the register 173 is applied to the input P#(-1) of the mode switching signal generator 161, so that the input P#(-1) lags one basic cycle ΔTb behind the input P#(0).

Figure 40:
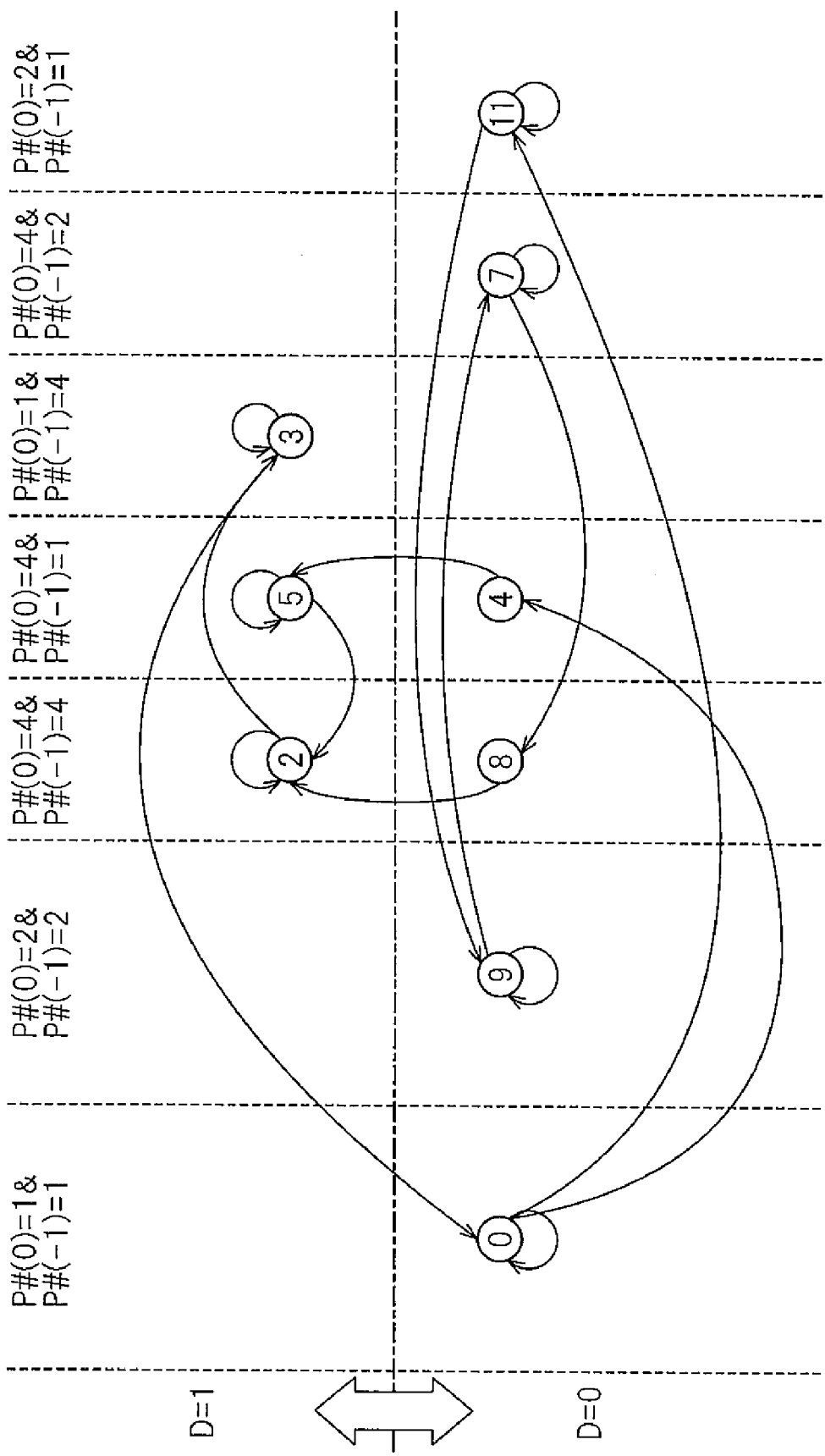
FIG. 40 is a state transition diagram of the mode switching signal generator 161 depicted in FIG. 21.

FIG. 40 is a state transition diagram of the mode switching signal generator 161 depicted in FIG. 21. As long as the number of parallel operations remains at 1, that is, as long as P#(0)=P#(-1)=1, the next state S remains at "0". When P#(0) has changed to 4, the next state S changes to "4", and thereafter, the next state S remains at "5" until P#(-1) changes to 4. Then, when P#(-1) has changed to 4, the next state changes to "2". Thereafter, as long as P#(0)=4 and P#(-1)=4, the next state S remains at "2".

Figure 41:
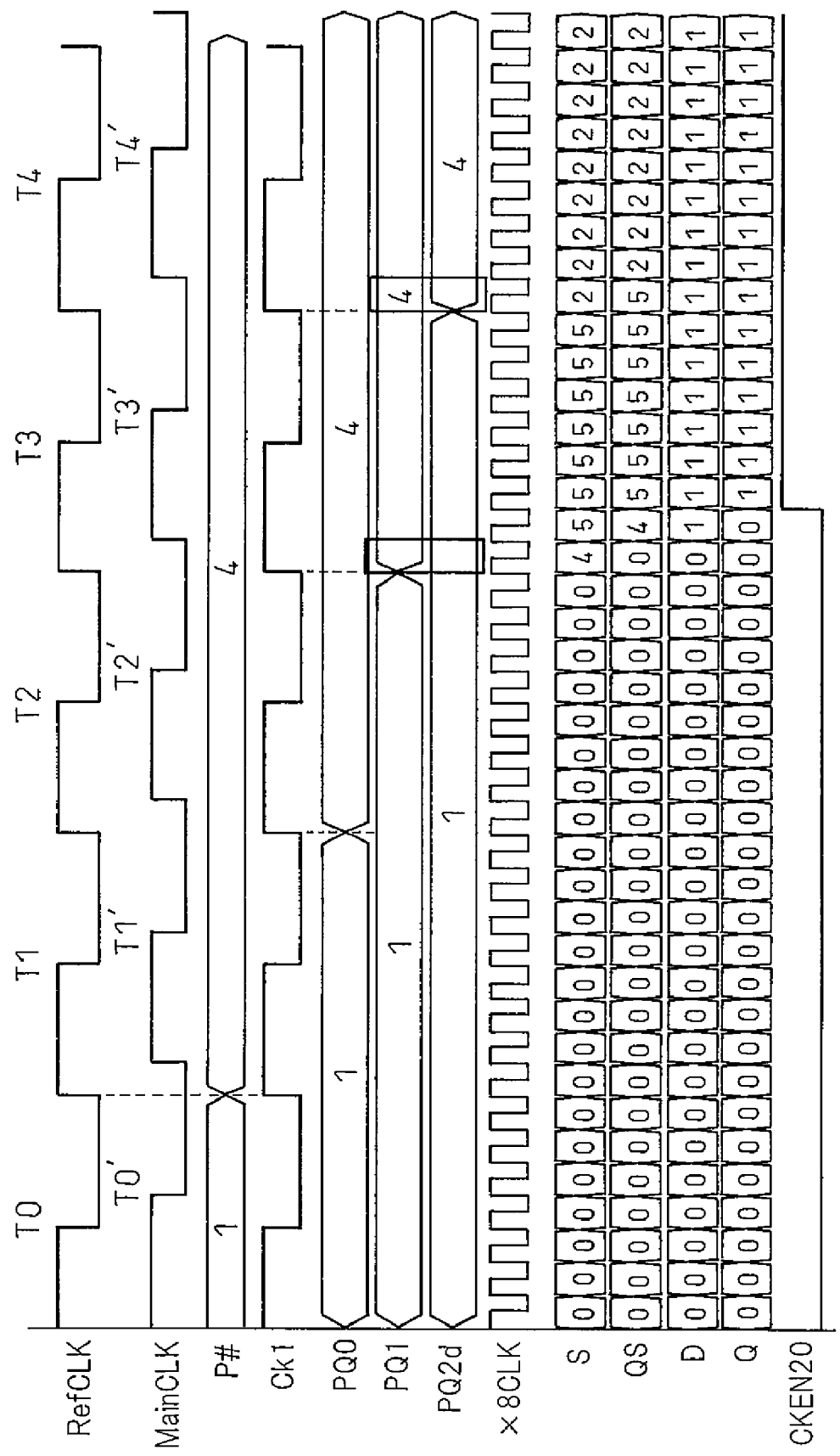
FIG. 41 is a timing chart illustrating the internal states of the mode switching signal generator 161 when the number of parallel operations changes from 1 to 4.

FIG. 41 is a timing chart illustrating the internal states of the mode switching signal generator 161 when the number of parallel operations changes from 1 to 4. The output CKEN20 of the mode switching signal generator 161 when the number of parallel operations is 1 is at "L", and the pipeline registers 211 to 219 depicted in FIG. 20 operate in the transparent mode in which the input values are directly output.

When the number of parallel operations changes from 1 to 4, the state of the mode switching signal CKEN20 changes to "H" ΔTb/8 earlier than the cycle period of the clock signal φ20 changes to ΔTb/4, and the pipeline registers 211 to 219 begin to operate in the flip-flop mode.

Referring to FIG. 21, the output PQ2 of the register 174 is applied to the input P#(0) of the mode switching signal generator 162. Accordingly, when the number of parallel operations changes, the input P#(0) of the mode switching signal generator 162 changes with a delay of ΔTb/4 relative to the input P#(0) of the mode switching signal generator 161 that generates the mode switching signal CKEN20. On the other hand, the output PQ3 of the register 175 is applied to the input P#(-1) of the mode switching signal generator 162, so that the input P#(-1) lags ΔTb/4 behind the input P#(0).

Similarly, the output PQ3 of the register 175 is applied to the input P#(0) of the mode switching signal generator 163. Accordingly, when the number of parallel operations changes, the input P#(0) of the mode switching signal generator 163 changes with a delay of ΔTb/4 relative to the input P#(0) of the mode switching signal generator 162 that generates the mode switching signal CKEN21. On the other hand, the output PQ4 of the register 176 is applied to the input P#(-1) of the mode switching signal generator 163, so that the input P#(-1) lags ΔTb/4 behind the input P#(0).

Figure 42:
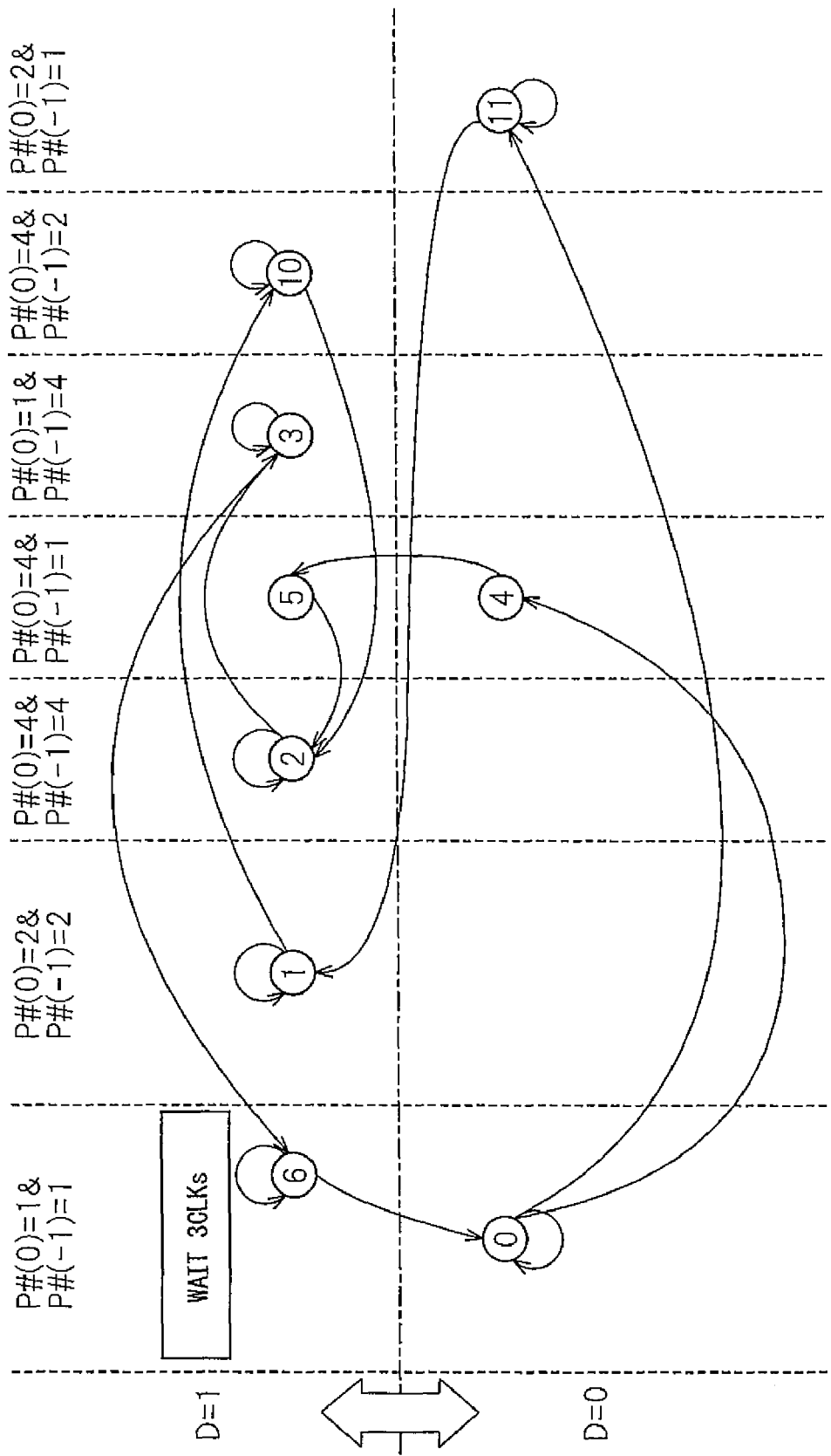
FIG. 42 is a state transition diagram of a mode switching signal generator 162 depicted in FIG. 21.
Figure 43:
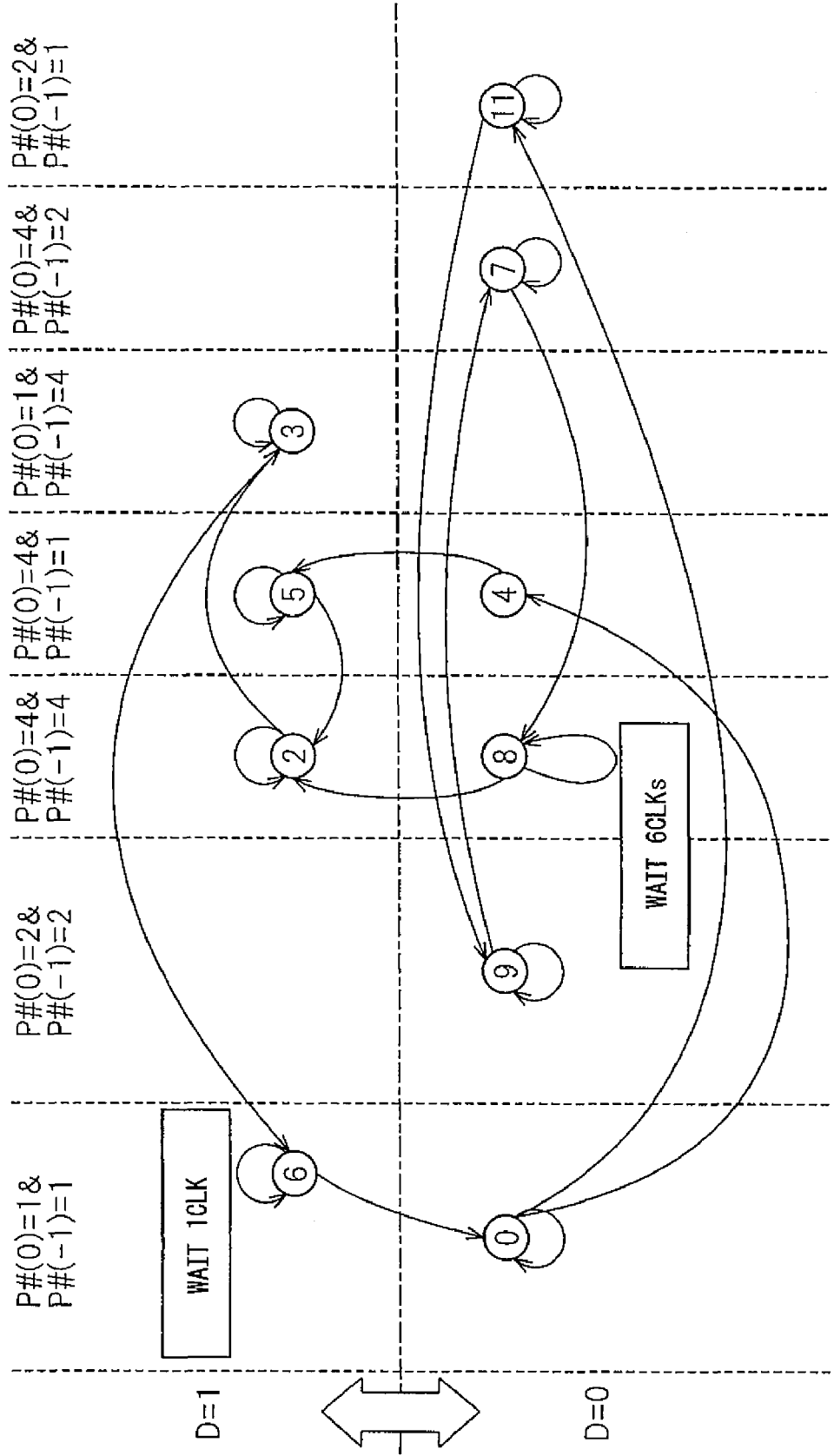
FIG. 43 is a state transition diagram of a mode switching signal generator 163 depicted in FIG. 21.
Figure 44:
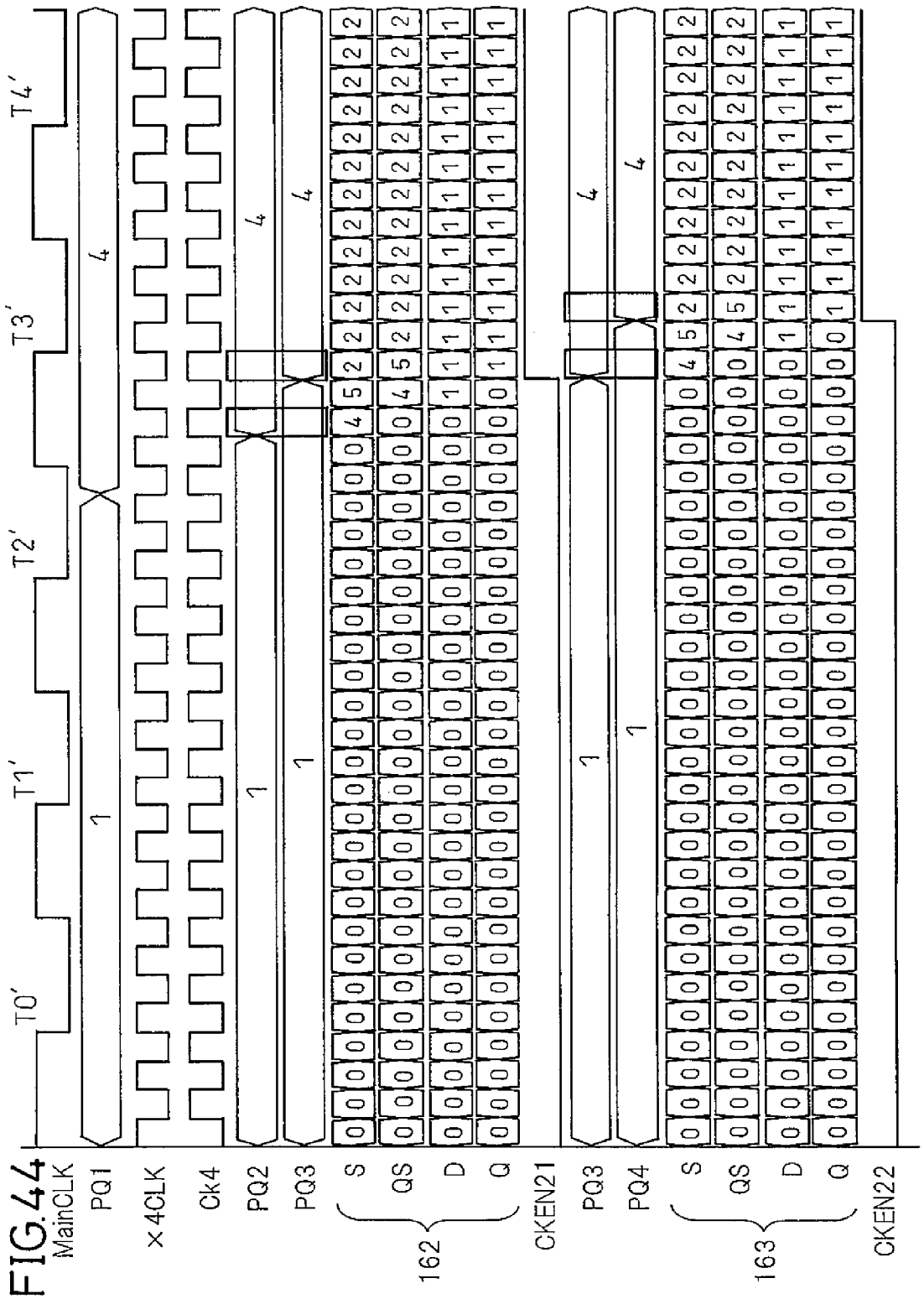
FIG. 44 is a timing chart illustrating the internal states of the mode switching signal generators 162 and 163 when the number of parallel operations changes from 1 to 4.

FIGS. 42 and 43 are state transition diagrams of the respective mode switching signal generators 162 and 163 depicted in FIG. 21. The state transitions that occur in the mode switching signal generators 162 and 163 when the number of parallel operations changes from 1 to 4 are the same as the state transitions that occur in the mode switching signal generators 161. Accordingly, as depicted in FIG. 44, the outputs CKEN21 and CKEN22 of the mode switching signal generators 162 and 163 when the number of parallel operations is 1 are both at "L", and the pipeline registers 221 to 228 and 231 to 237 depicted in FIG. 20 operate in the transparent mode.

When the number of parallel operations changes from 1 to 4, the state of the mode switching signal CKEN21 changes to "H" ΔTb/8 earlier than the cycle period of the clock signal φ21 changes to ΔTb/4, and the pipeline registers 221 to 228 begin to operate in the flip-flop mode. Likewise, the state of the mode switching signal CKEN22 changes to "H" ΔTb/8 earlier than the cycle period of the clock signal φ22 changes to ΔTb/4, and the pipeline registers 231 to 237 begin to operate in the flip-flop mode.

When the number of parallel operations changes from 1 to 4, the clock control unit 19 depicted in FIG. 21 causes the clock signals φ21 to φ23 and the mode switching signals CKEN20 to CKEN22 to change as described above.

As a result, as depicted in FIG. 24, the plurality of execution codes #4a to #4d and #5a to #5d generated by decoding the instructions Com#4 and Com#5 whose number of parallel operations P# is 4 are sequentially supplied to the respective sub-arithmetic-logic units 201 to 204 at intervals of time corresponding to ΔTb/4.

Here, the execution code #4b and the subsequent execution codes are sequentially supplied to the sub-arithmetic-logic units 202, 203, and 204 with a delay of ΔTb/4 relative to the timing that they are supplied to the preceding arithmetic-logic units 201, 202, and 203, respectively.

That is, when the number of parallel operations P# is 4, each 32-bit operation supplied to the arithmetic-logic unit 17 is decomposed into four sub-operations in the bit length direction, and the sub-operations are assigned to the respective sub-arithmetic-logic units 201 to 204. Then, the sub-arithmetic-logic unit 201 executes its assigned sub-operation ΔTb/4 earlier than the sub-arithmetic-logic unit 202 does, the sub-arithmetic-logic unit 202 executes its assigned sub-operation ΔTb/4 earlier than the sub-arithmetic-logic unit 203 does, and the sub-arithmetic-logic unit 203 executes its assigned sub-operation ΔTb/4 earlier than the sub-arithmetic-logic unit 204 does.

At any given time, the sub-arithmetic-logic units 201 to 204 are executing sub-operations of four different 32-bit operations in parallel. With the sub-arithmetic-logic units 201 to 204 operating in this manner, the arithmetic-logic unit 17 starts pipeline processing to execute the four operations in parallel.

Figure 45:
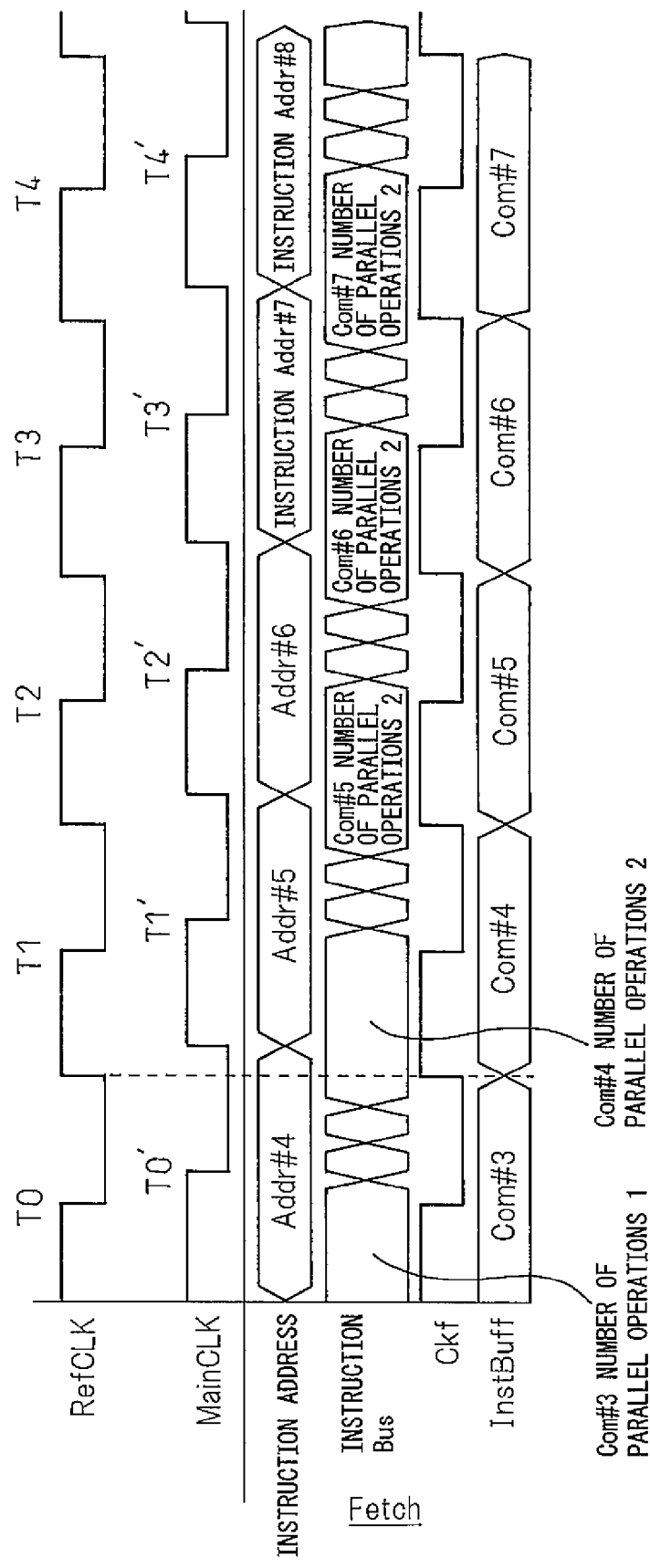
FIG. 45 is a timing chart illustrating the operation of the processor in the fetch stage when the number of parallel operations changes from 1 to 2.
Figure 46:
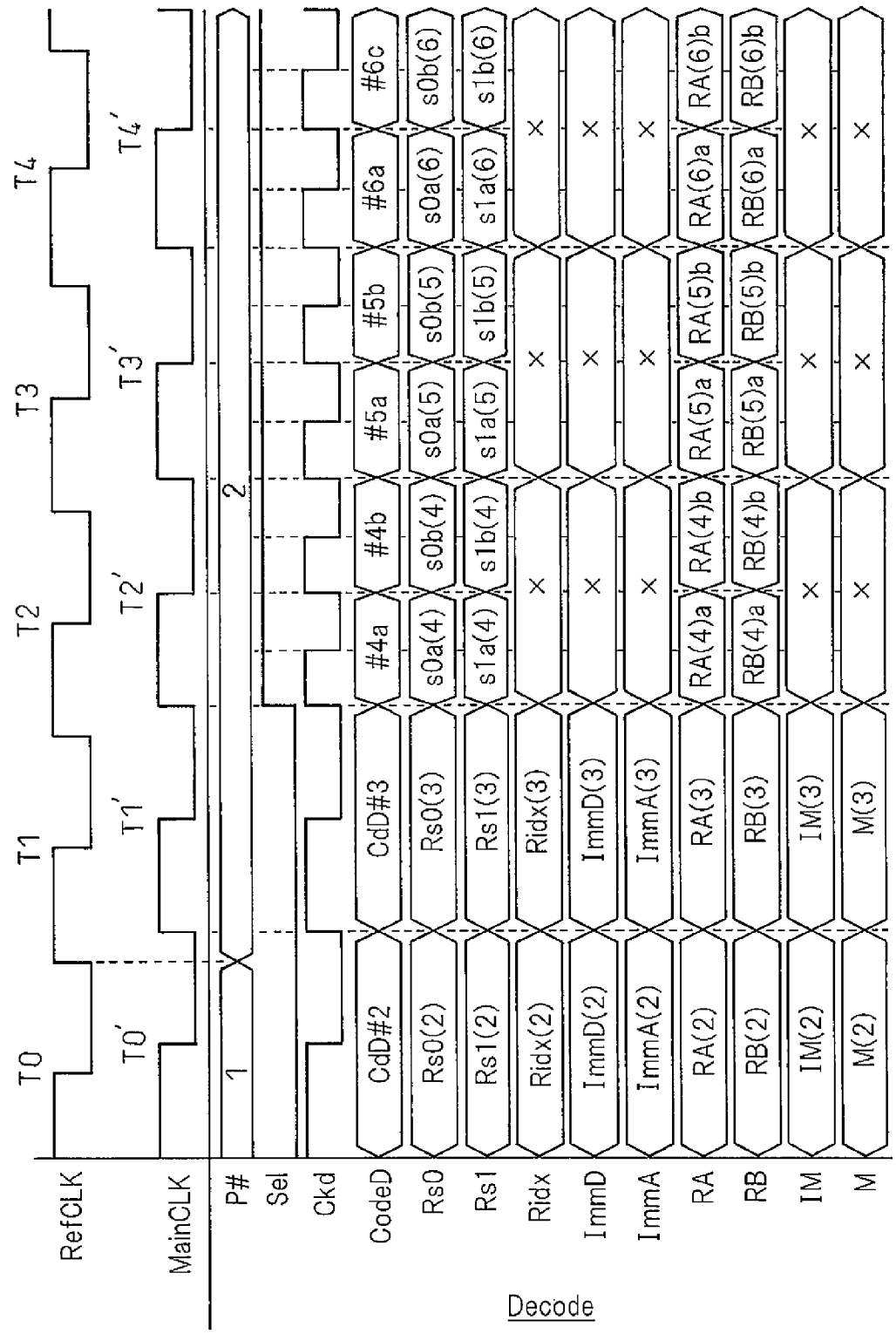
FIG. 46 is a timing chart illustrating the operation of the processor in the decode stage when the number of parallel operations changes from 1 to 2.
Figure 47:
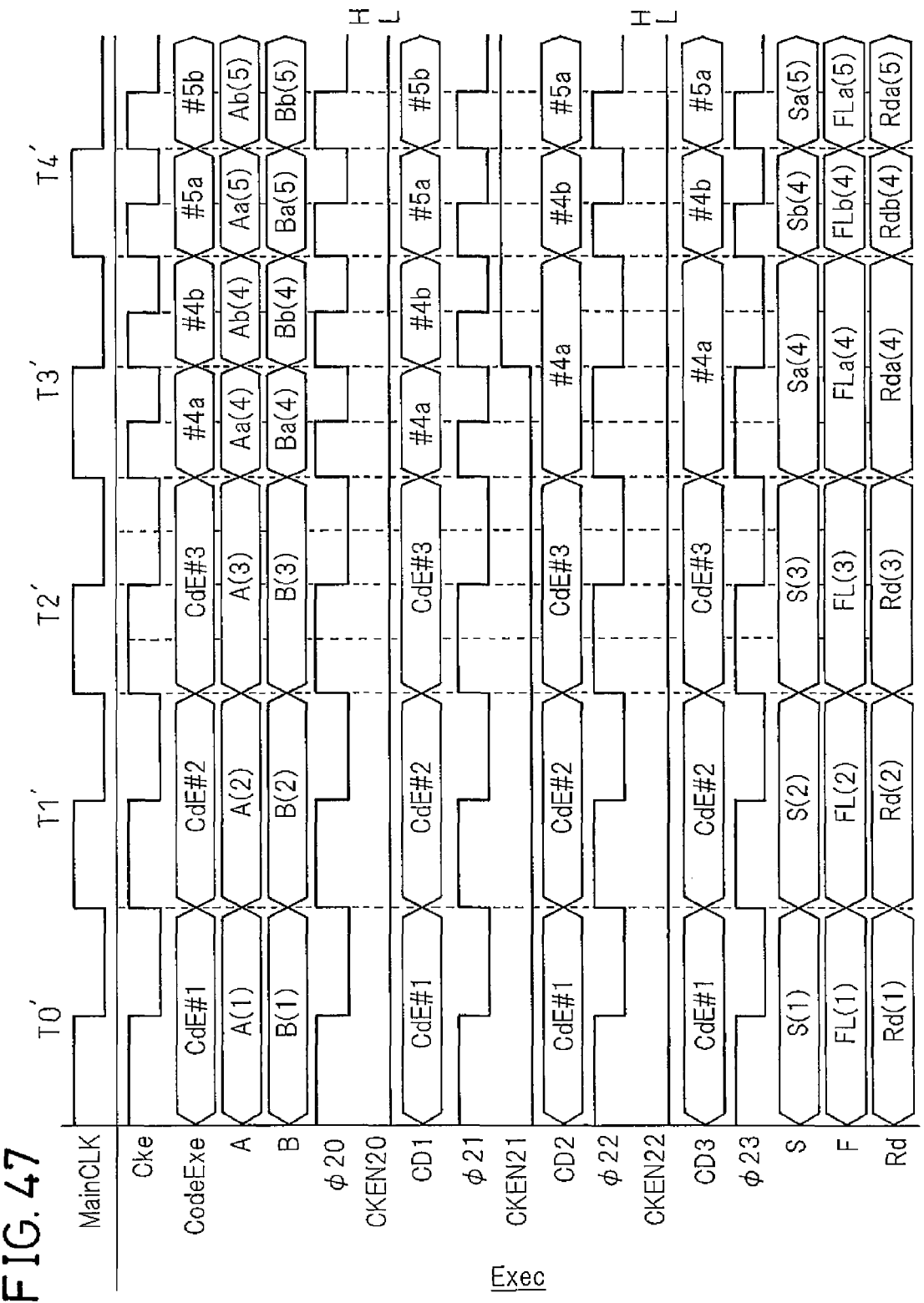
FIG. 47 is a timing chart illustrating the operation of the processor in the execution stage when the number of parallel operations changes from 1 to 2.

A description will be given below of the operation of the processor 1 when the number of parallel operations changes from 1 to 2. FIG. 45 is a timing chart illustrating the operation of the processor 1 in the fetch stage when the number of parallel operations changes from 1 to 2, FIG. 46 is a timing chart illustrating the operation of the processor 1 in the decode stage when the number of parallel operations changes from 1 to 2, and FIG. 47 is a timing chart illustrating the operation of the processor 1 in the execution stage when the number of parallel operations changes from 1 to 2. The definitions of the symbols depicted in FIGS. 46 and 47 are the same as those of the symbols depicted in FIGS. 23 and 24.

Suppose, as depicted in FIG. 45, that in the instruction Com#3 loaded into the instruction buffer 11 in cycle T0, the number of parallel operations is 1 and, in the instruction Com#4 loaded in cycle T1, the number of parallel operations changes from 1 to 2, the number of parallel operations remaining at 2 in the instructions Com#4 to Com#7 sequentially loaded into the instruction buffer 11 in cycles T1 to T4.

As depicted in FIGS. 45 and 46, the number-of-parallel-operations signal generator 111 in the main decoder 12 changes the value of the number of parallel operations P# from 1 to 2 in cycle T1 upon receiving the instruction Com#4 from the instruction buffer 11. At this time, the cycle period of the clock signal Ckd changes with a delay of (1+1/8)×one basic cycle ΔTb after the change in the number-of-parallel-operations signal P# has been detected by the main decoder 12. On the other hand, the cycle period of the clock signal Cke changes with a delay of one basic cycle ΔTb after the clock signal Ckd has changed.

The operation of the clock inverters 151 to 154 for generating the clock signals φ20 to φ23 depicted in FIG. 47 and the operation of the mode switching signal generators 161 to 163 for generating the mode switching signals CKEN20 to CKEN22 depicted in FIG. 47 will be described below.

As illustrated in FIG. 32, in the clock inverter 151 depicted in FIG. 21, the next state S is determined in such a manner that the state changes from "0" through to "7" in a cyclic fashion as long as the number of parallel operations remains at 1, i.e., as long as P#(0)=P#(−1)=1.

When P#(0) has changed to 2 with the number of parallel operations changing from 1 to 2, the next state S changes to "26" along the line indicated by reference numeral J4-1. Then, as long as P#(0)=2 and P#(−1)=1, the next state is determined in such a manner that the state changes from "26" through to "29" in a cyclic fashion.

Figure 48:
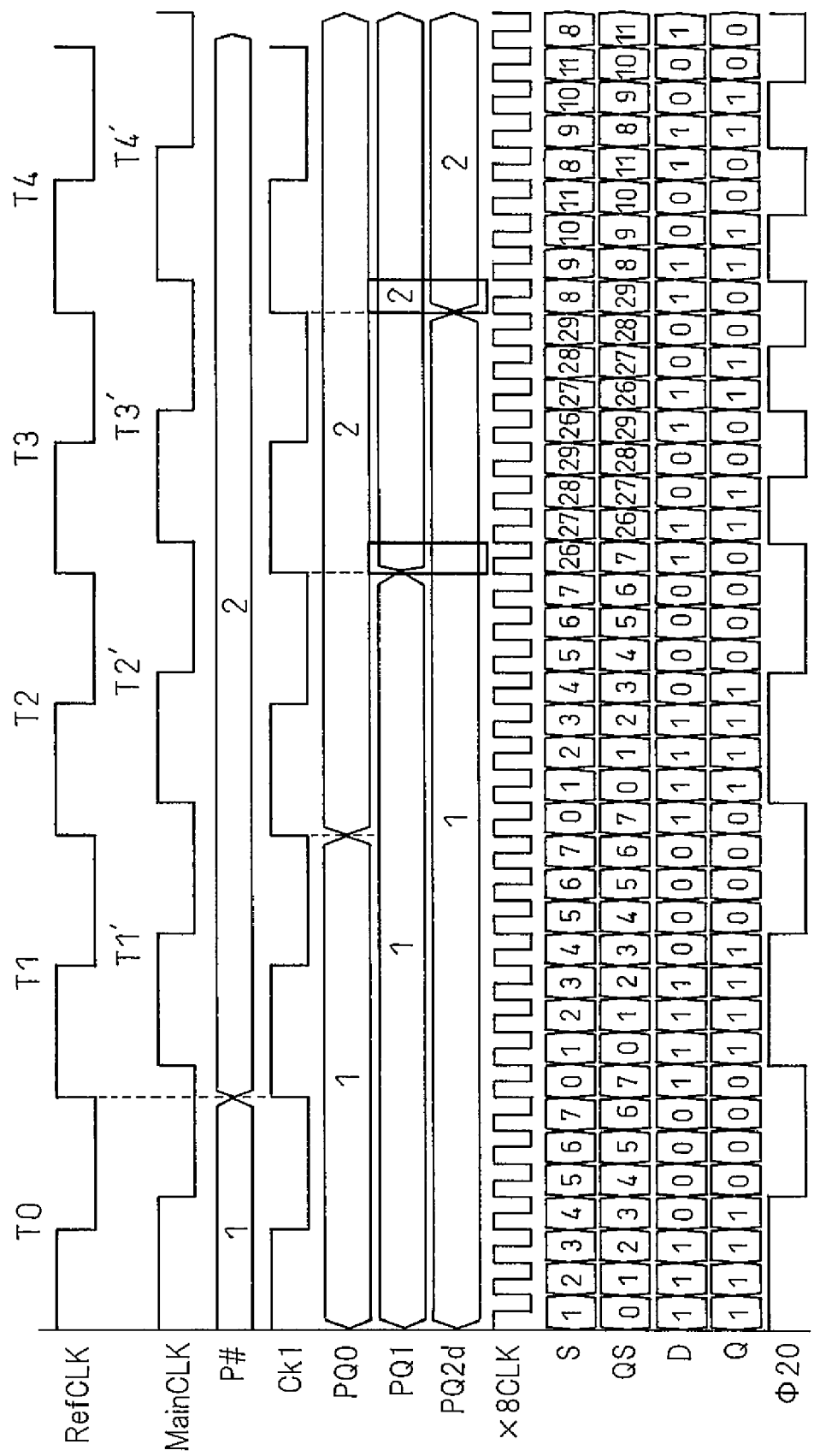
FIG. 48 is a timing chart illustrating the internal states of the clock inverter 151 when the number of parallel operations changes from 1 to 2.

When one basic cycle ΔTb has elapsed after P#(0) changed to 2, P#(−1) changes to 2. At this time, the next state S changes to "8" along the line indicated by reference numeral J4-2. Thereafter, the next state is determined in such a manner that the state changes from "8" through to "11" in a cyclic fashion. FIG. 48 is a timing chart illustrating the internal states of the clock inverter 151 when the number of parallel operations changes from 1 to 2 as described above.

As illustrated in FIG. 34, in the clock inverter 152 depicted in FIG. 21, the next state S is determined in such a manner that the state changes from "0" through to "7" in a cyclic fashion as long as the number of parallel operations remains at 1.

When P#(0) has changed to 2 with the number of parallel operations changing from 1 to 2, the next state S changes to "30" along the line indicated by reference numeral J4-1. Then, as long as P#(0)=2 and P#(−1)=1, the next state S remains at "30".

Figure 49:
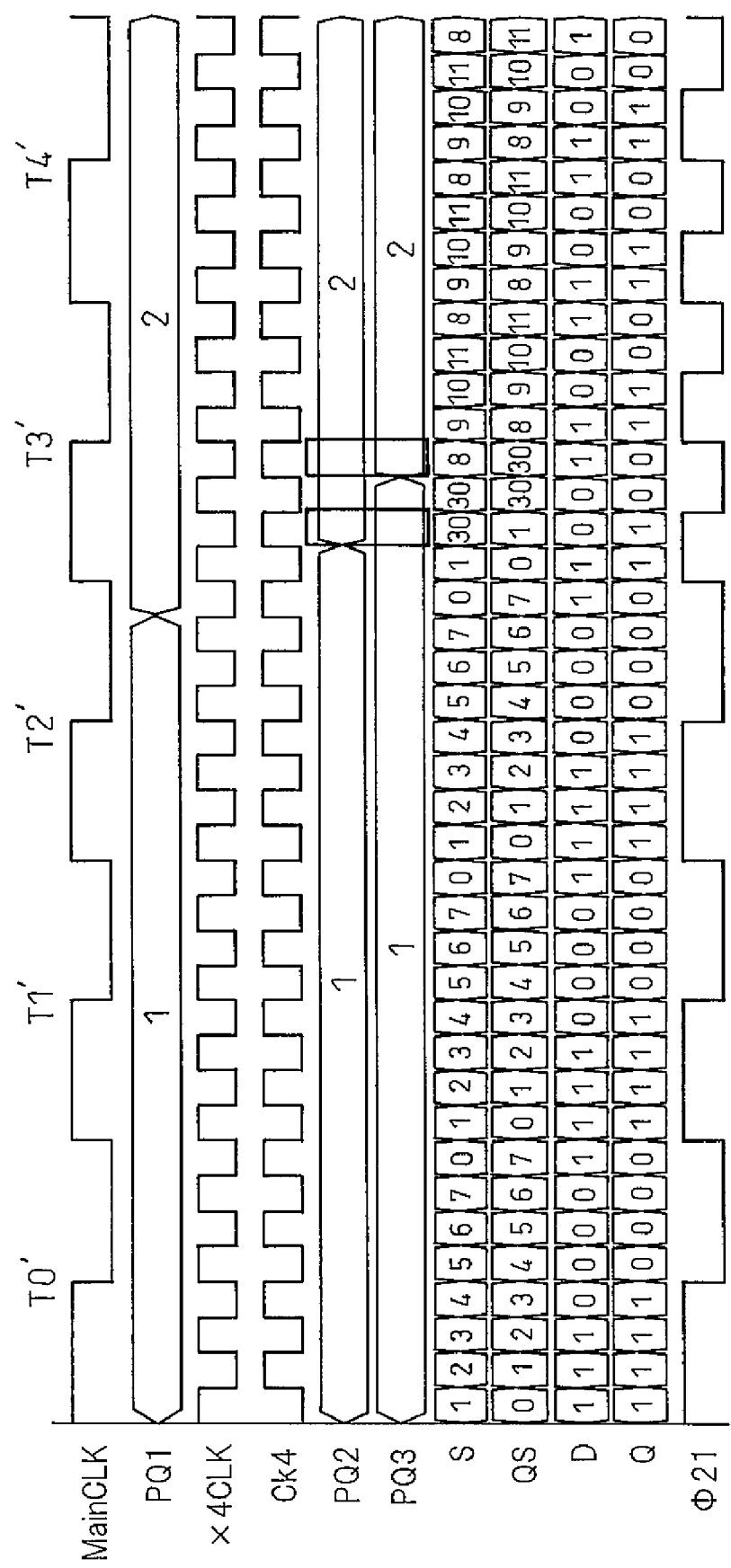
FIG. 49 is a timing chart illustrating the internal states of the clock inverter 152 when the number of parallel operations changes from 1 to 2.

When ΔTb/4 has elapsed after P#(0) changed to 2, P#(−1) changes to 2. At this time, the next state S changes to "8" along the line indicated by reference numeral J4-2. Thereafter, the next state S is determined in such a manner that the state changes from "8" through to "11" in a cyclic fashion. FIG. 49 is a timing chart illustrating the internal states of the clock inverter 152 when the number of parallel operations changes from 1 to 2 as described above.

As illustrated in FIG. 36, in the clock inverter 153 depicted in FIG. 21, the next state S is determined in such a manner that the state changes from "0" through to "7" in a cyclic fashion as long as the number of parallel operations remains at 1.

When P#(0) has changed to 2 with the number of parallel operations changing from 1 to 2, the next state S changes to "30" along the line indicated by reference numeral J4-1. Then, as long as P#(0)=2 and P#(−1)=1, the next state S remains at "30".

When ΔTb/4 has elapsed after P#(0) changed to 2, P#(−1) changes to 2. At this time, the next state S changes to "31" along the line indicated by reference numeral J4-2. Then, after repeating the state "31" twice, the next state S transitions to "8" along the line indicated by reference numeral J4-3. Thereafter, the next state S is determined in such a manner that the state changes from "8" through to "11" in a cyclic fashion.

Figure 50:
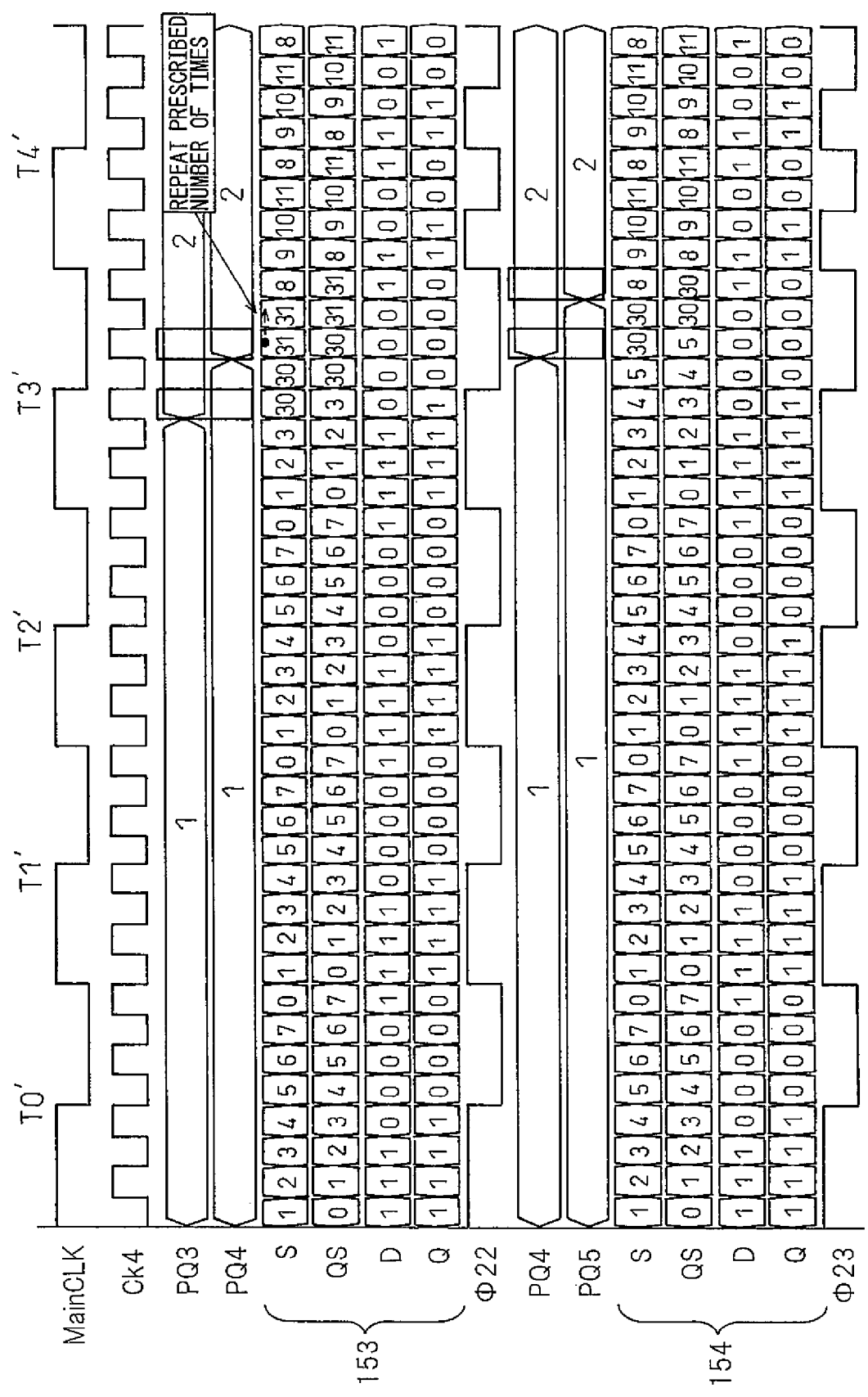
FIG. 50 is a timing chart illustrating the internal states of the clock inverters 153 and 154 when the number of parallel operations changes from 1 to 2.

FIG. 50 is a timing chart illustrating the internal states of the clock inverter 153 when the number of parallel operations changes from 1 to 2 as described above.

As illustrated in FIG. 38, in the clock inverter 154 depicted in FIG. 21, the next state S is determined in such a manner that the state changes from "0" through to "7" in a cyclic fashion as long as the number of parallel operations remains at 1.

When P#(0) has changed to 2, the next state S changes to "30" along the line indicated by reference numeral J4-1. Then, as long as P#(0)=2 and P#(−1)=1, the next state S remains at "30".

When ΔTb/4 has elapsed after P#(0) changed to 2, P#(−1) changes to 2. At this time, the next state S changes to "8" along the line indicated by reference numeral J4-2. Thereafter, the next state S is determined in such a manner that the state changes from "8" through to "11" in a cyclic fashion.

The timing chart of FIG. 50 illustrates the internal states of the clock inverter 154 when the number of parallel operations changes from 1 to 2 as described above.

Figure 51:
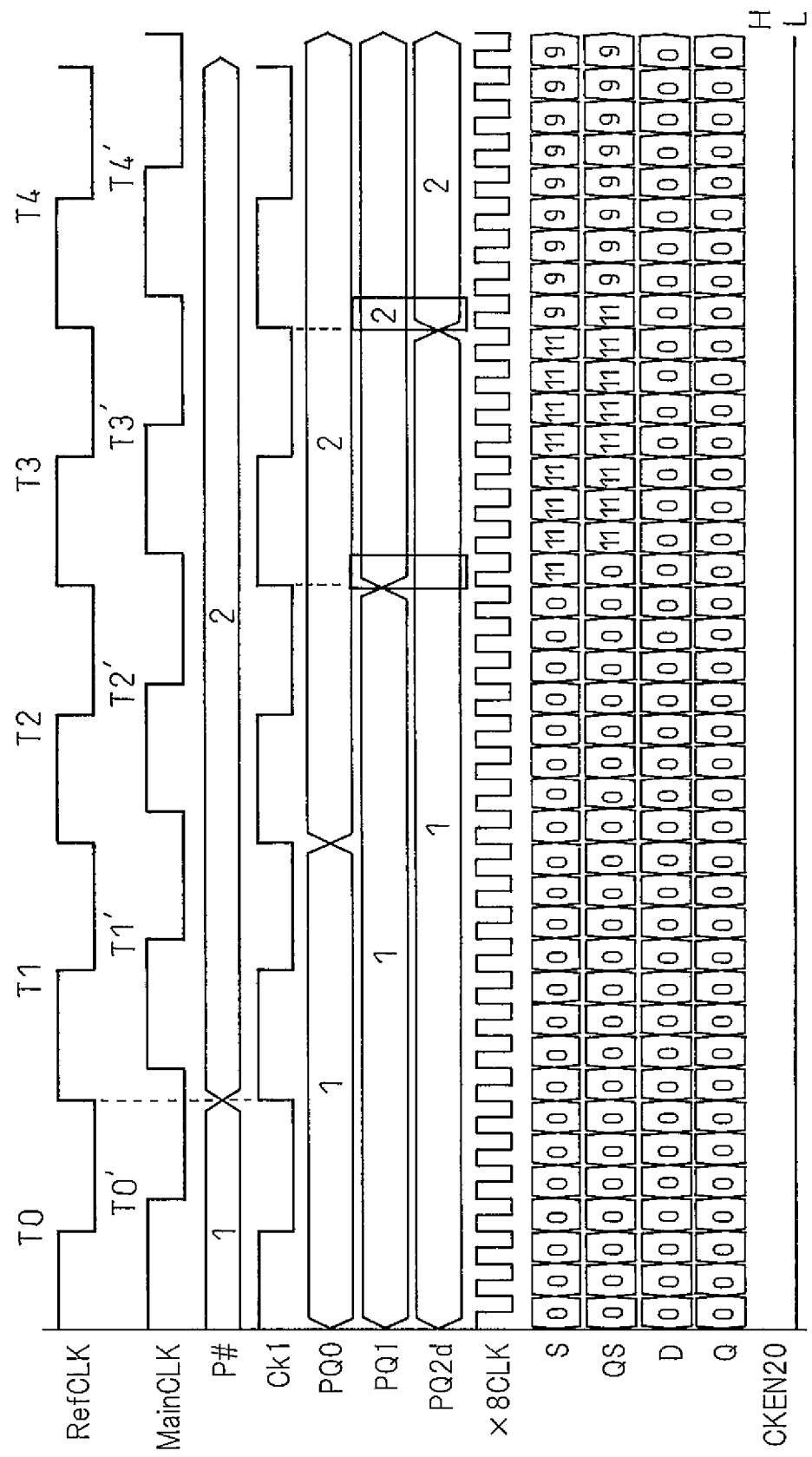
FIG. 51 is a timing chart illustrating the internal states of the mode switching signal generator 161 when the number of parallel operations changes from 1 to 2.

As illustrated in FIG. 40, in the mode switching signal generator 161 depicted in FIG. 21, the next state S remains at "0" as long as the number of parallel operations remains at 1, i.e., as long as P#(0)=P#(−1)=1. When P#(0) has changed to 2, the next state S changes to "11", and thereafter, the next state S remains at "11" until P#(−1) changes to 2. Then, when P#(−1) has changed to 2, the next state changes to "9". Thereafter, the next state S remains at "9". FIG. 51 is a timing chart illustrating the internal states of the mode switching signal generator 161 when the number of parallel operations changes from 1 to 2 as described above.

Figure 52:
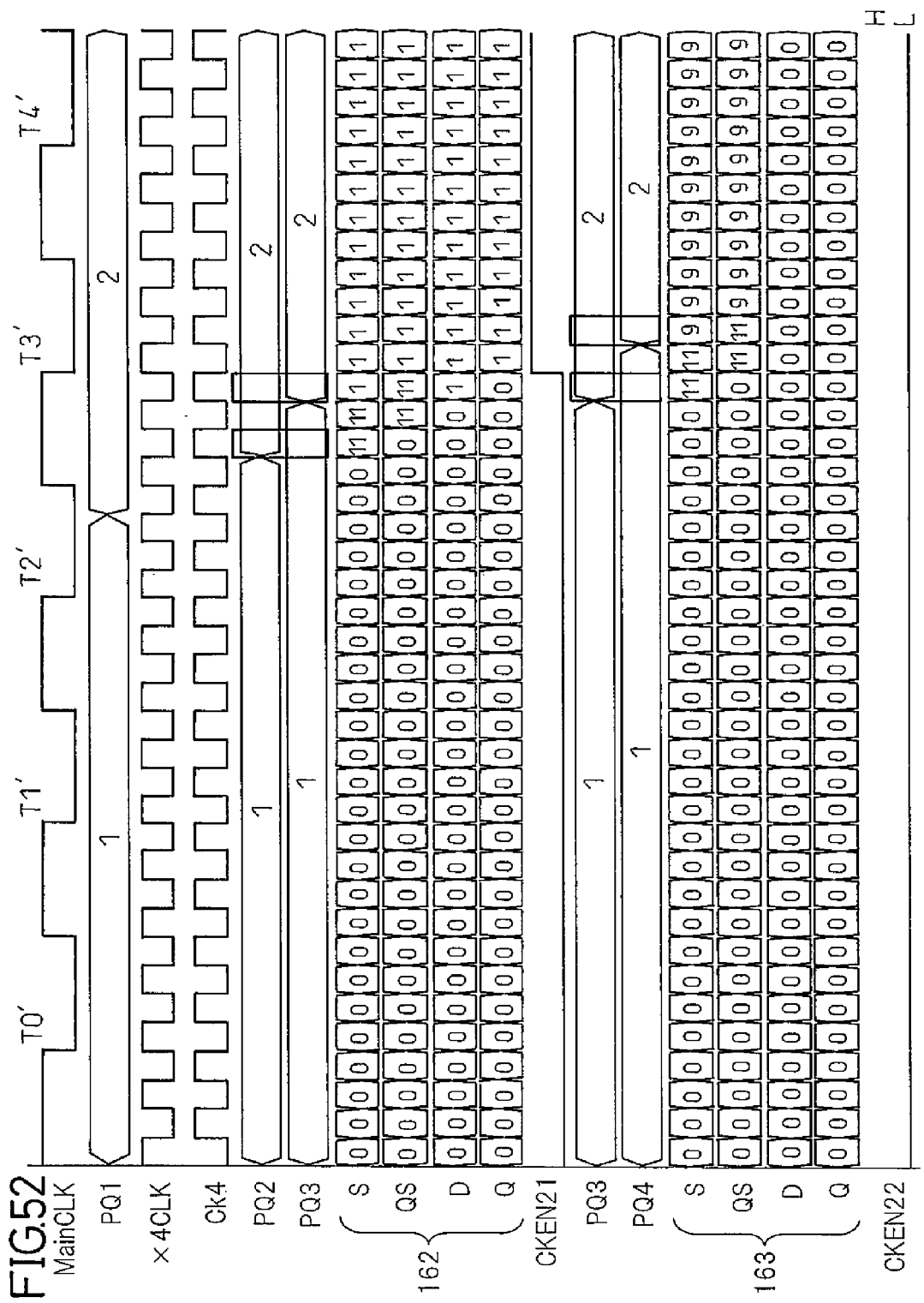
FIG. 52 is a timing chart illustrating the internal states of the mode switching signal generators 162 and 163 when the number of parallel operations changes from 1 to 2.

As illustrated in FIG. 42, in the mode switching signal generator 162 depicted in FIG. 21, the next state S remains at "0" as long as the number of parallel operations remains at 1. When P#(0) has changed to 2, the next state S changes to "11", and remains at "11" until P#(−1) changes to 2. Then, when P#(−1) has changed to 2, the next state changes to "1". Thereafter, the next state S remains at "1". FIG. 52 is a timing chart illustrating the internal states of the mode switching signal generator 162 when the number of parallel operations changes from 1 to 2 as described above.

As illustrated in FIG. 43, in the mode switching signal generator 163 depicted in FIG. 21, the next state S remains at "0" as long as the number of parallel operations remains at 1. When P#(0) has changed to 2, the next state S changes to "11", and remains at "11" until P#(−1) changes to 2. Then, when P#(−1) has changed to 2, the next state changes to "9". Thereafter, the next state S remains at "9". The timing chart of FIG. 52 illustrates the internal states of the mode switching signal generator 163 when the number of parallel operations changes from 1 to 2 as described above.

As depicted in FIGS. 51 and 52, when the number of parallel operations changes from 1 to 2, the mode switching signals CKEN20 and CKEN22 are both held at "L", and the pipeline registers 211 to 219 and 231 to 237 operate in the transparent mode.

On the other hand, the mode switching signal CKEN21 changes from "L" to "H" halfway through cycle T3'. Thereupon, the pipeline registers 221 to 228 depicted in FIG. 20 change to the flip-flop mode halfway through cycle T3'.

As a result, as illustrated in the timing chart of the arithmetic-logic unit 200 in FIG. 7, the first and second sub-arithmetic-logic units 201 and 202 of the arithmetic-logic unit 17 simultaneously execute sub-operations of the same 32-bit operation, and the third and fourth sub-arithmetic-logic units 203 and 204 execute sub-operations of the preceding 32-bit operation that was input to the arithmetic-logic unit 17 one half of the basic cycle (ΔTb/2) earlier than the 32-bit operation currently being executed by the first sub-arithmetic-logic unit 201. With the sub-arithmetic-logic units 201 to 204 operating in this manner, the arithmetic-logic unit 17 starts pipeline processing to execute the two operations in parallel.

Figure 53:
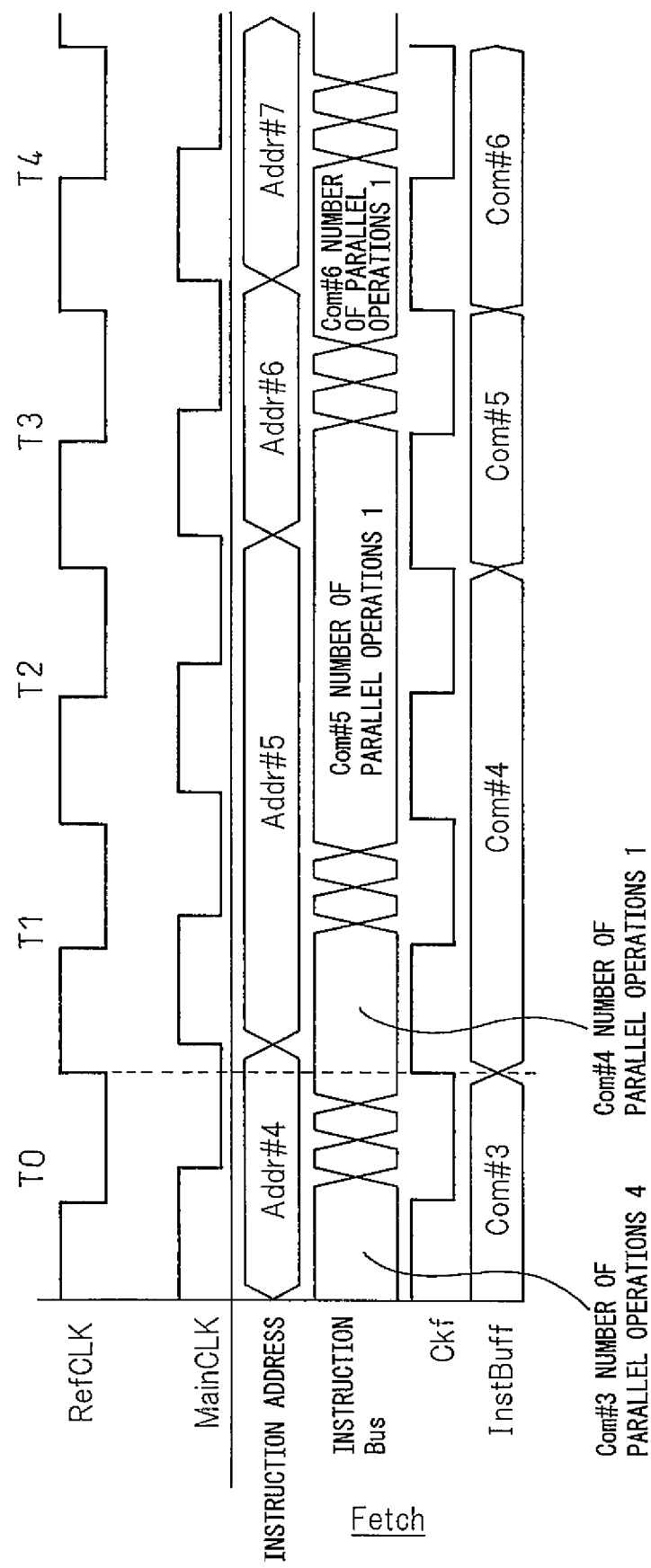
FIG. 53 is a timing chart illustrating the operation of the processor in the fetch stage when the number of parallel operations changes from 4 to 1.
Figure 54:
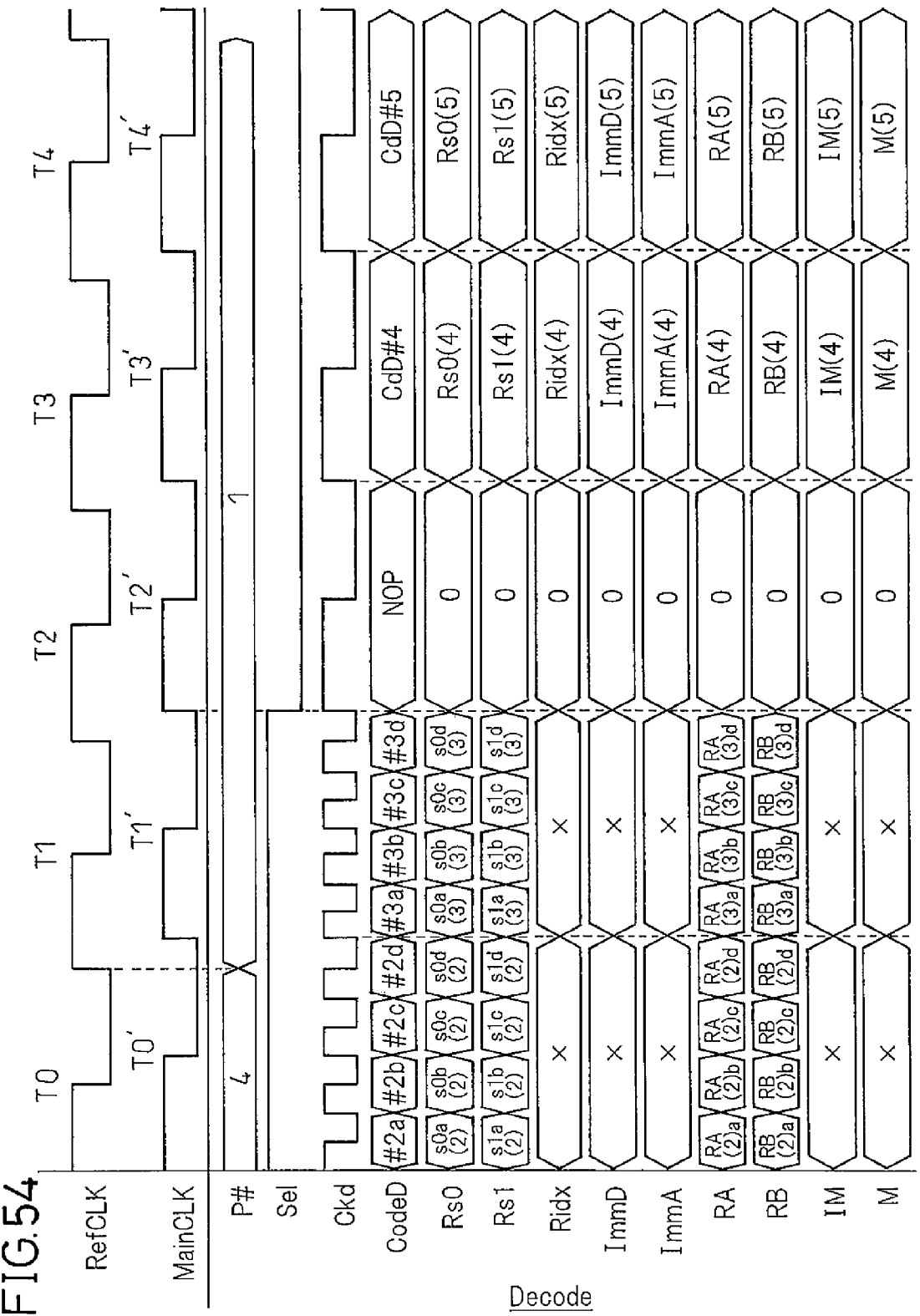
FIG. 54 is a timing chart illustrating the operation of the processor in the decode stage when the number of parallel operations changes from 4 to 1.
Figure 55:
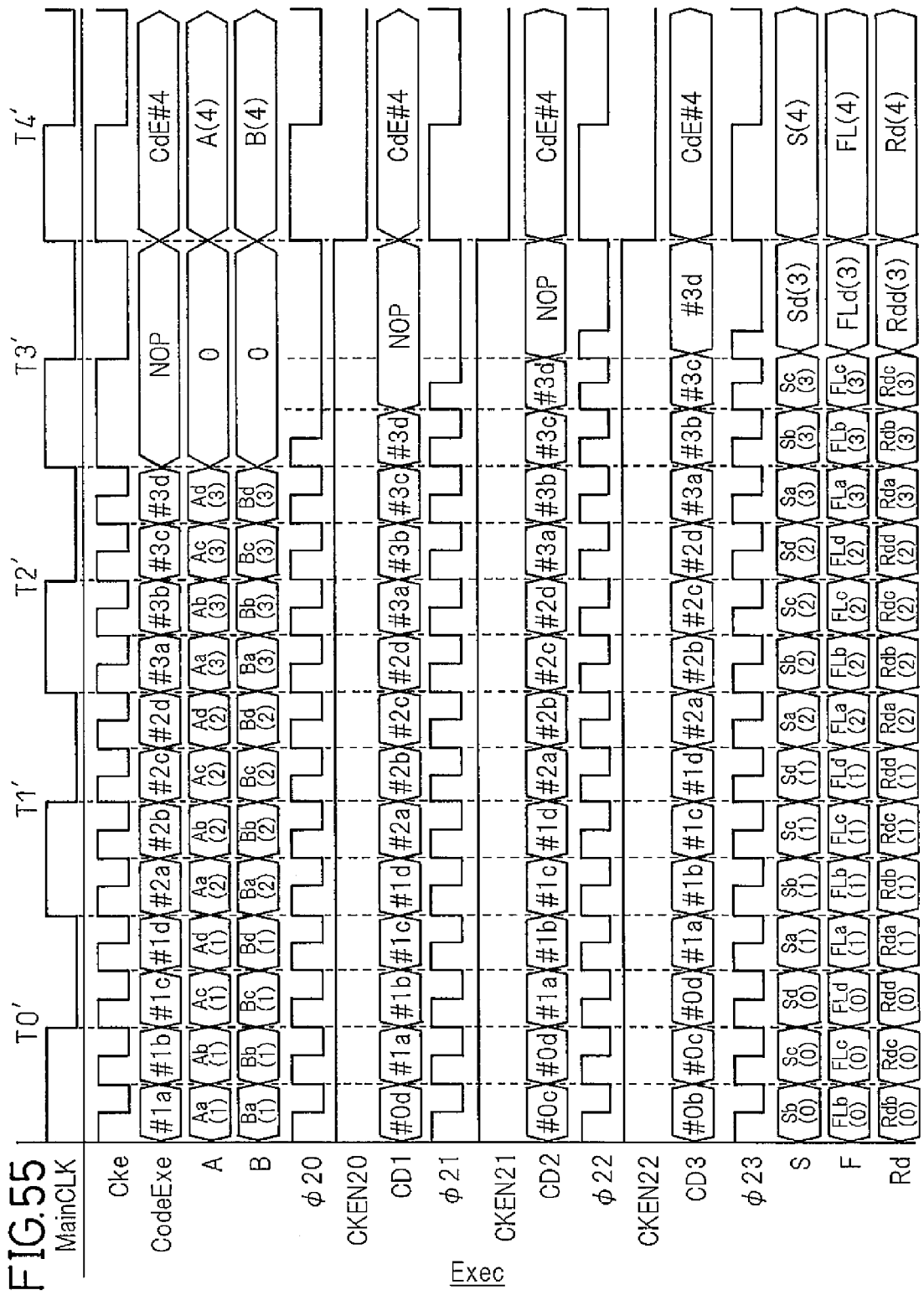
FIG. 55 is a timing chart illustrating the operation of the processor in the execution stage when the number of parallel operations changes from 4 to 1.

A description will be given below of the operation of the processor 1 when the number of parallel operations changes from 4 to 1. FIG. 53 is a timing chart illustrating the operation of the processor 1 in the fetch stage when the number of parallel operations changes from 4 to 1, FIG. 54 is a timing chart illustrating the operation of the processor 1 in the decode stage when the number of parallel operations changes from 4 to 1, and FIG. 55 is a timing chart illustrating the operation of the processor 1 in the execution stage when the number of parallel operations changes from 4 to 1. The definitions of the symbols depicted in FIGS. 54 and 55 are the same as those of the symbols depicted in FIGS. 23 and 24.

Suppose, as depicted in FIG. 53, that in the instruction Com#3 loaded into the instruction buffer 11 in cycle T0, the number of parallel operations is 4 and, in the instruction Com#4 loaded in cycle T1, the number of parallel operations changes from 4 to 1, the number of parallel operations remaining at 1 in the instructions Com#4 to Com#6 sequentially loaded into the instruction buffer 11 in cycles T1 to T4.

As depicted in FIGS. 53 and 54, the number-of-parallel-operations signal generator 111 in the main decoder 12 changes the value of the number of parallel operations P# from 4 to 1 in cycle T1 upon receiving the instruction Com#4 from the instruction buffer 11. Further, as described with reference to FIG. 15, since the number of parallel operations P# in the previously received instruction is larger than 1, and since the number of parallel operations P# in the currently received instruction is different from the number of parallel operations in the previously received instruction, the stall signal generator 113 generates a stall signal. As a result, the single instruction decoding unit 115 issues a NOP instruction during the period of one basic cycle ΔTb.

While an instruction whose number of parallel operations is larger than 1 is being executed, its execution codes Code-Exe, input data A and B, operation results, and carries are held in the pipeline registers 211 to 219, 221 to 228, and 231 to 237 in the arithmetic-logic unit 17. This means that the clock signals φ20 to φ23 and the mode switching signals CKEN20 to CKEN22 cannot be changed to match the number of parallel operations contained in the instruction Com#4, until after all of the operations contained in the instruction preceding the instruction Com#4, whose number of parallel operations is different, have been completed. It is for this reason that the main decoder 12 issues a NOP instruction during the period of one basic cycle ΔTb if a change occurs in the number of parallel operations while an instruction whose number of parallel operations is larger than 1 is still being executed.

The operation of the clock inverters 151 to 154 for generating the clock signals φ20 to φ23 depicted in FIG. 55 and the operation of the mode switching signal generators 161 to 163 for generating the mode switching signals CKEN20 to CKEN22 depicted in FIG. 55 will be described below.

As illustrated in FIG. 32, in the clock inverter 151 depicted in FIG. 21, the next state S alternates cyclically between states "12" and "13" as long as the number of parallel operations remains at 4, i.e., as long as P#(0)=P#(−1)=4.

When P#(0) has changed to 1 with the number of parallel operations changing from 4 to 1, the next state S changes to "18" along the line indicated by reference numeral J2-1. Then, the state S remains at "19" until P#(−1) thereafter changes to 1.

Figure 56:
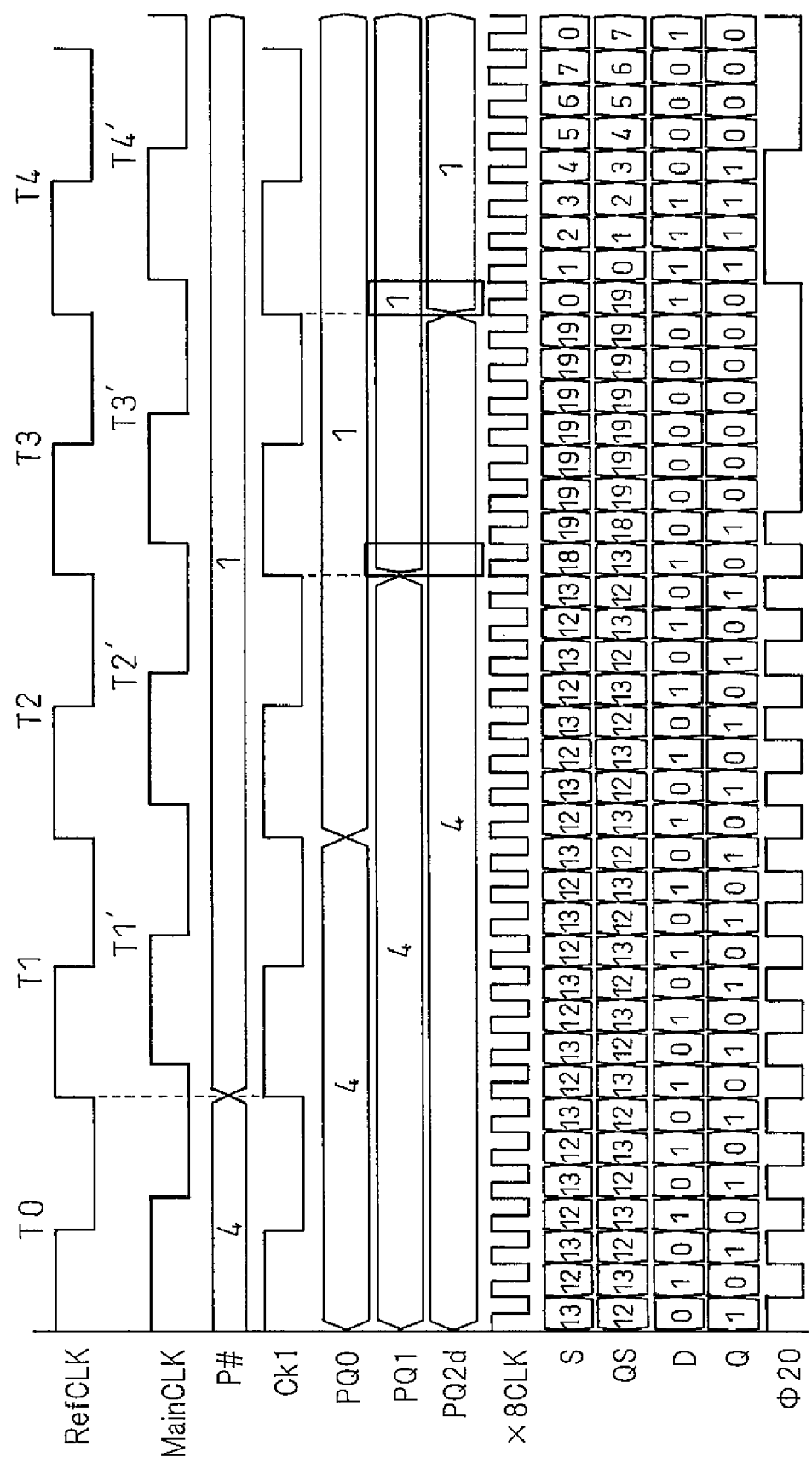
FIG. 56 is a timing chart illustrating the internal states of the clock inverter 151 when the number of parallel operations changes from 4 to 1.

When one basic cycle ΔTb has elapsed after P#(0) changed to 1, P#(−1) changes to 1. At this time, the next state S changes to "0" along the line indicated by reference numeral J2-2. Thereafter, the next state S is determined in such a manner that the state changes from "0" through to "7" in a cyclic fashion. FIG. 56 is a timing chart illustrating the internal states of the clock inverter 151 when the number of parallel operations changes from 4 to 1 as described above.

As illustrated in FIG. 34, in the clock inverter 152 depicted in FIG. 21, the next state S alternates cyclically between states "12" and "13" as long as the number of parallel operations remains at 4.

When P#(0) has changed to 1, the next state S changes to "20" along the line indicated by reference numeral J2-1. Then, the state S remains at "21" until P#(−1) thereafter changes to 1.

Figure 57:
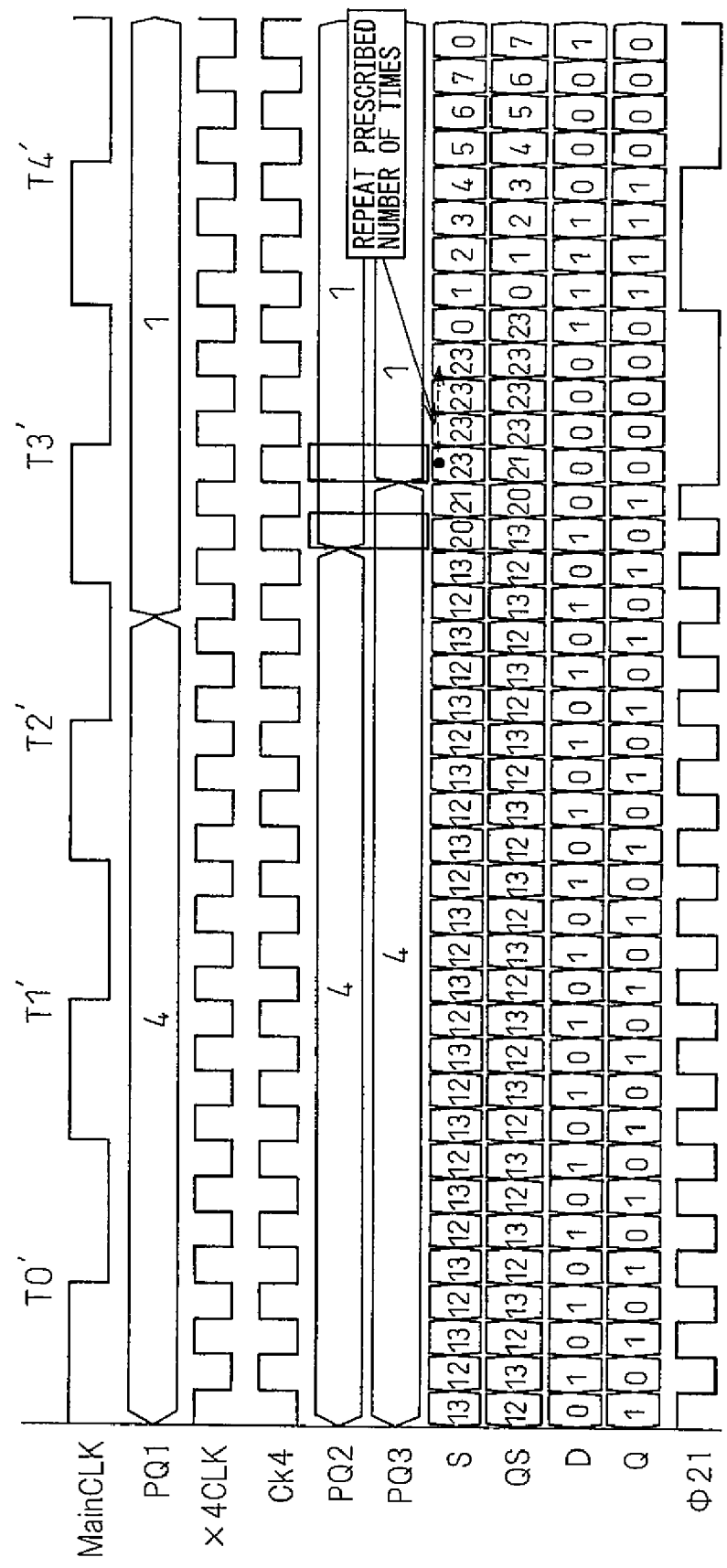
FIG. 57 is a timing chart illustrating the internal states of the clock inverter 152 when the number of parallel operations changes from 4 to 1.

When ΔTb/4 has elapsed after P#(0) changed to 1, P#(−1) changes to 1. At this time, the next state S transitions to "23" along the line indicated by reference numeral J2-2. Then, after repeating the state "23" four times, the next state S transitions to "0" along the line indicated by reference numeral J2-3. Thereafter, the next state S is determined in such a manner that the state changes from "0" through to "7" in a cyclic fashion. FIG. 57 is a timing chart illustrating the internal states of the clock inverter 152 when the number of parallel operations changes from 4 to 1 as described above.

As illustrated in FIG. 36, in the clock inverter 153 depicted in FIG. 21, the next state S alternates cyclically between states "12" and "13" as long as the number of parallel operations remains at 4.

When P#(0) has changed to 1, the next state S changes to "20" along the line indicated by reference numeral J2-1. Then, the state S remains at "21" until P#(−1) thereafter changes to 1.

Figure 58:
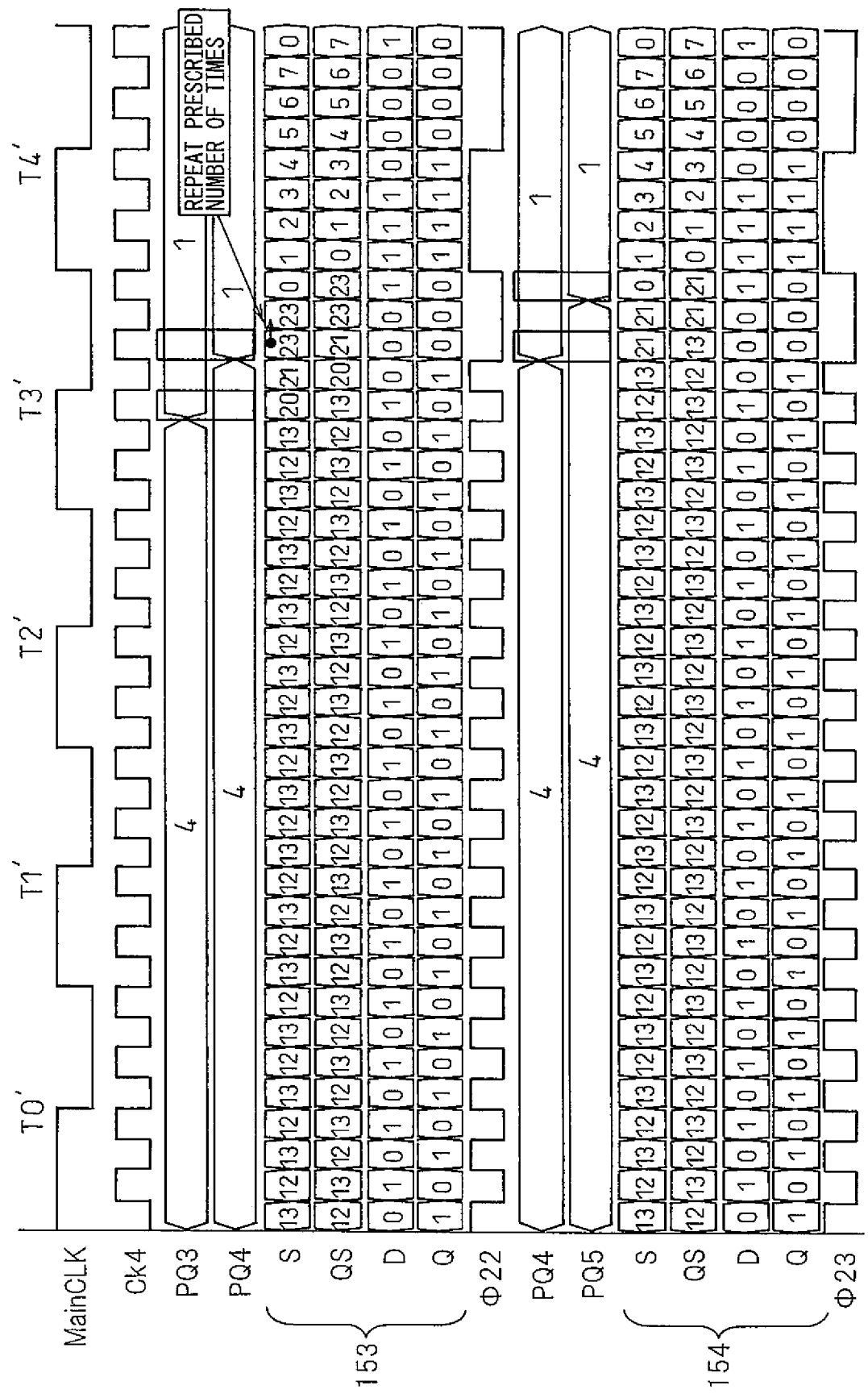
FIG. 58 is a timing chart illustrating the internal states of the clock inverters 153 and 154 when the number of parallel operations changes from 4 to 1.

When ΔTb/4 has elapsed after P#(0) changed to 1, P#(−1) changes to 1. At this time, the next state S transitions to "23" along the line indicated by reference numeral J2-2. Then, after repeating the state "23" twice, the next state S transitions to "0" along the line indicated by reference numeral J2-3. Thereafter, the next state S is determined in such a manner that the state changes from "0" through to "7" in a cyclic fashion. FIG. 58 is a timing chart illustrating the internal states of the clock inverter 153 when the number of parallel operations changes from 4 to 1 as described above.

As illustrated in FIG. 38, in the clock inverter 154 depicted in FIG. 21, the next state S alternates cyclically between states "12" and "13" as long as the number of parallel operations remains at 4.

When P#(0) has changed to 1, the next state S changes to "21" along the line indicated by reference numeral J2-1. Then, the state S remains at "21" until P#(−1) thereafter changes to 1.

When ΔTb/4 has elapsed after P#(0) changed to 1, P#(−1) changes to 1. At this time, the next state S transitions to "0" along the line indicated by reference numeral J2-2. Thereafter, the next state S is determined in such a manner that the state changes from "0" through to "7" in a cyclic fashion. The timing chart of FIG. 58 illustrates the internal states of the clock inverter 154 when the number of parallel operations changes from 4 to 1 as described above.

Figure 59:
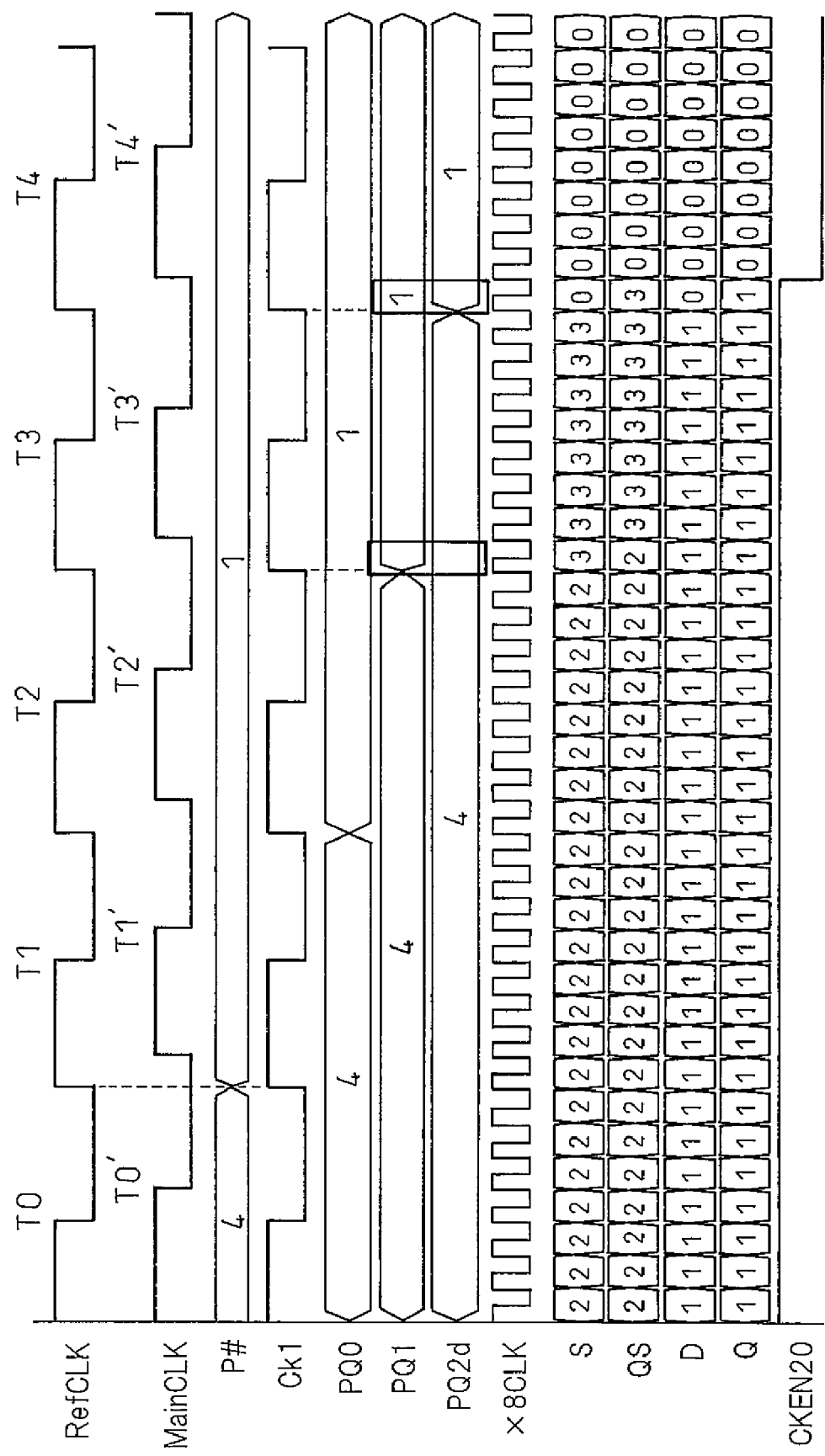
FIG. 59 is a timing chart illustrating the internal states of the mode switching signal generator 161 when the number of parallel operations changes from 4 to 1.

As illustrated in FIG. 40, in the mode switching signal generator 161 depicted in FIG. 21, the next state S remains at "2" as long as the number of parallel operations remains at 4, i.e., as long as P#(0)=P#(−1)=4. When P#(0) has changed to 1, the next state S transitions to "3", and remains at "3" until P#(−1) changes to 1. When P#(−1) has changed to 1, the nest state S transitions to "0". FIG. 59 is a timing chart illustrating the internal states of the mode switching signal generator 161 when the number of parallel operations changes from 4 to 1 as described above.

Figure 60:
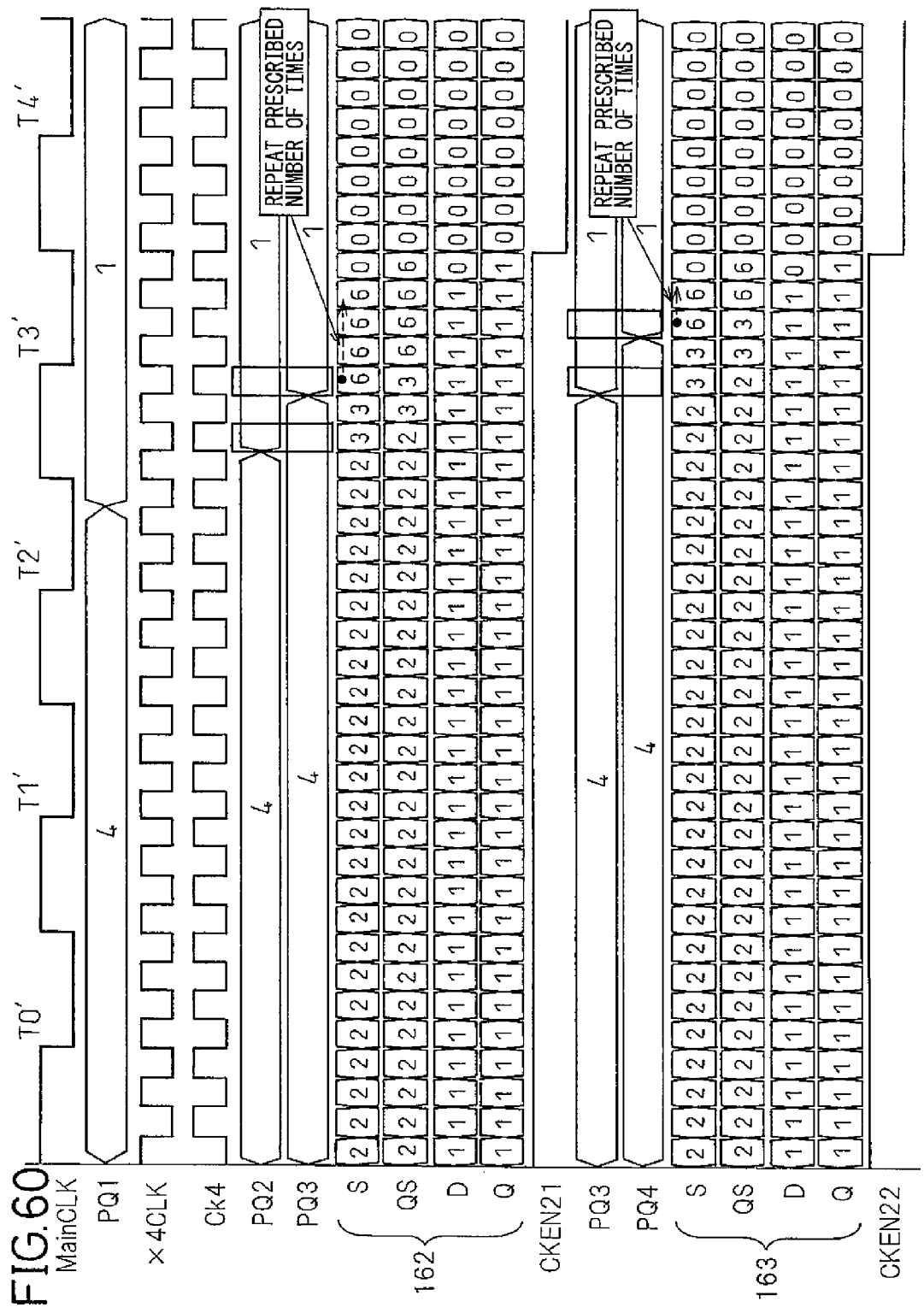
FIG. 60 is a timing chart illustrating the internal states of the mode switching signal generators 162 and 163 when the number of parallel operations changes from 4 to 1.

As illustrated in FIG. 42, in the mode switching signal generator 162 depicted in FIG. 21, the next state S remains at "2" as long as the number of parallel operations remains at 4. When P#(0) has changed to 1, the next state S transitions to "3", and remains at "3" until P#(−1) changes to 1. When P#(−1) has changed to 1, the nest state S transitions to "6". Then, after repeating the state "6" four times, the next state S transitions to "0". FIG. 60 is a timing chart illustrating the internal states of the mode switching signal generator 162 when the number of parallel operations changes from 4 to 1 as described above.

As illustrated in FIG. 43, in the mode switching signal generator 163 depicted in FIG. 21, the next state S remains at "2" as long as the number of parallel operations remains at 4. When P#(0) has changed to 1, the next state S transitions to "3", and remains at "3" until P#(−1) changes to 1. When P#(−1) has changed to 1, the nest state S transitions to "6". Then, after repeating the state "6" twice, the next state S transitions to "0". The timing chart of FIG. 60 illustrates the internal states of the mode switching signal generator 163 when the number of parallel operations changes from 4 to 1 as described above.

As illustrated in FIG. 55, after the number of operations has changed from 4 to 1, the arithmetic-logic unit 17 completes all the operations contained in the instruction Com#3, whose number of parallel operations P# is 4, in cycle T3' during which the NOP instruction is received, and thereafter proceeds to execute the operations contained in the instructions Com#4 to Com#6, whose number of parallel operations P# is 1, in the subsequent cycles T4', etc.

Figure 61:
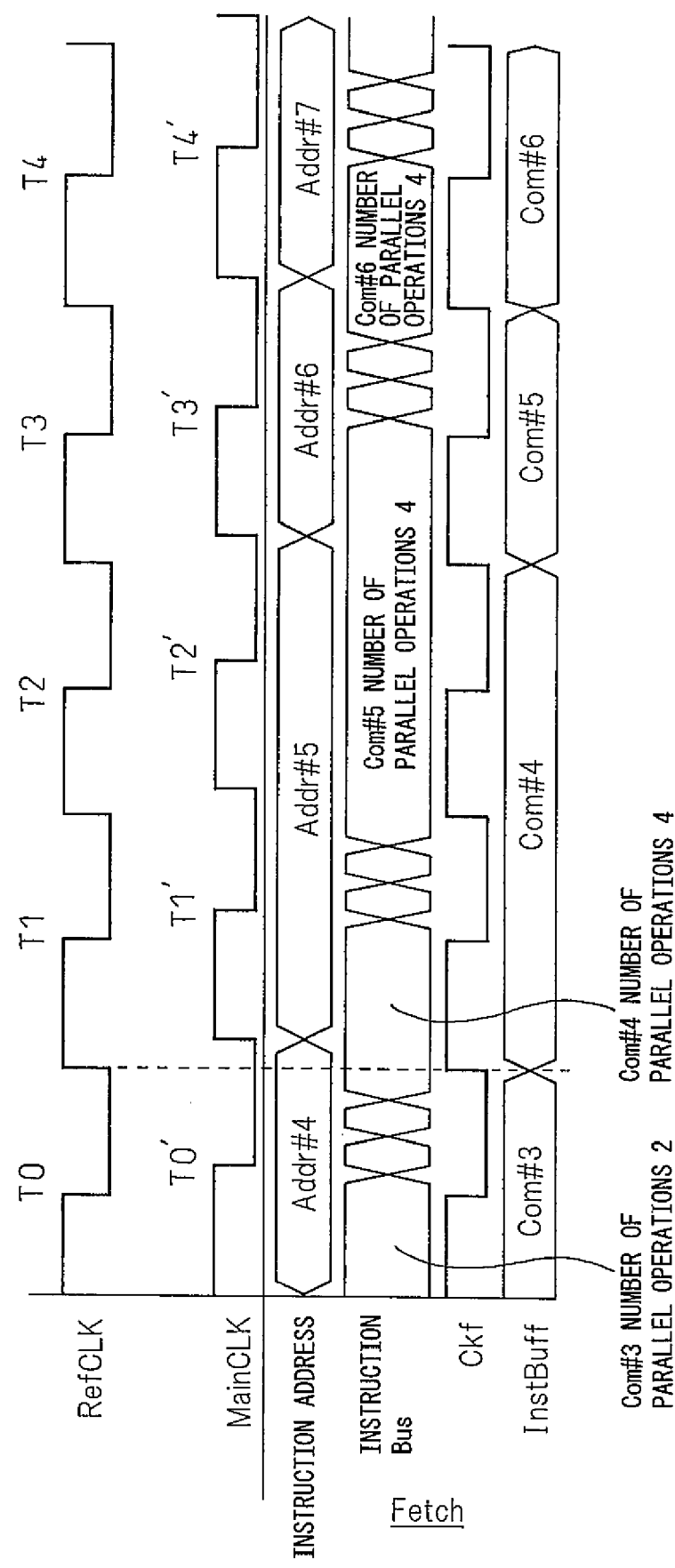
FIG. 61 is a timing chart illustrating the operation of the processor in the fetch stage when the number of parallel operations changes from 2 to 4.
Figure 62:
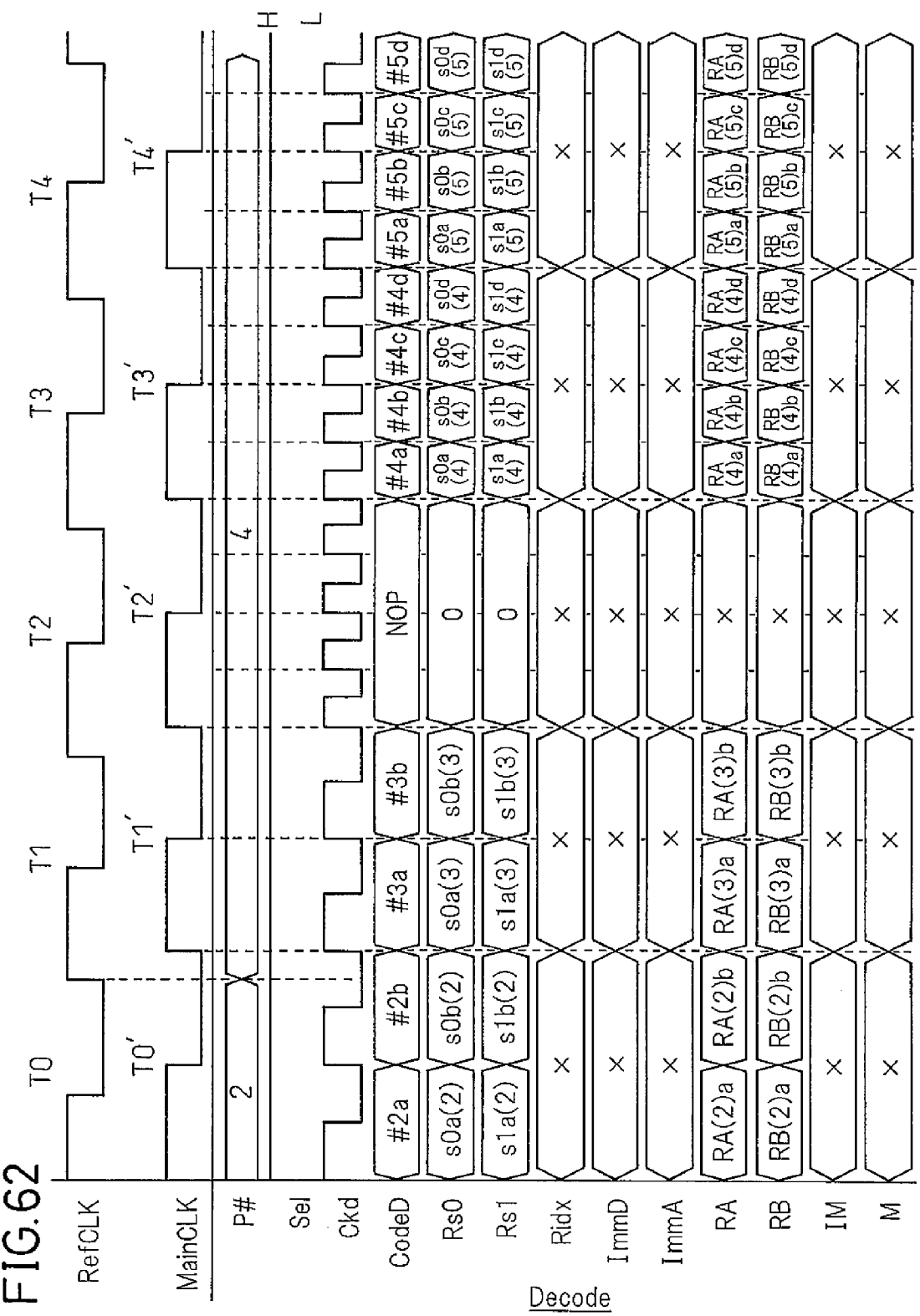
FIG. 62 is a timing chart illustrating the operation of the processor in the decode stage when the number of parallel operations changes from 2 to 4.
Figure 63:
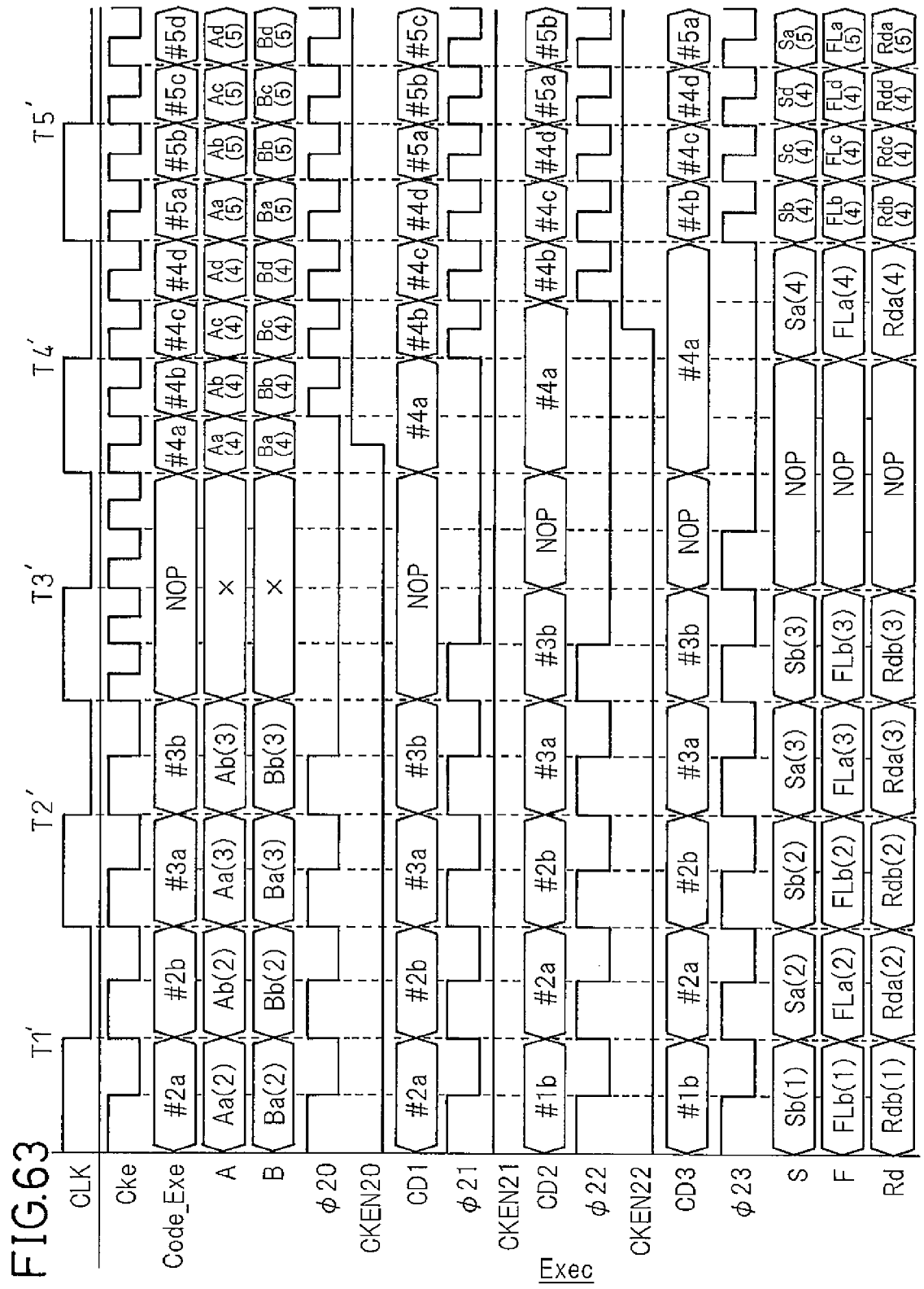
FIG. 63 is a timing chart illustrating the operation of the processor in the execution stage when the number of parallel operations changes from 2 to 4.

Next, a description will be given of the operation of the processor 1 when the number of parallel operations changes from 2 to 4. FIG. 61 is a timing chart illustrating the operation of the processor 1 in the fetch stage when the number of parallel operations changes from 2 to 4, FIG. 62 is a timing chart illustrating the operation of the processor 1 in the decode stage when the number of parallel operations changes from 2 to 4, and FIG. 63 is a timing chart illustrating the operation of the processor 1 in the execution stage when the number of parallel operations changes from 2 to 4. The definitions of the symbols depicted in FIGS. 62 and 63 are the same as those of the symbols depicted in FIGS. 23 and 24.

Suppose, as depicted in FIG. 61, that in the instruction Com#3 loaded into the instruction buffer 11 in cycle T0, the number of parallel operations is 2 and, in the instruction Com#4 loaded in cycle T1, the number of parallel operations changes from 2 to 4, the number of parallel operations remaining at 4 in the instructions Com#4 to Com#6 sequentially loaded into the instruction buffer 11 in cycles T1 to T4.

As depicted in FIGS. 61 and 62, the number-of-parallel-operations signal generator 111 in the main decoder 12 changes the value of the number of parallel operations P# from 2 to 4 in cycle T1 upon receiving the instruction Com#4 from the instruction buffer 11. Further, since the number of parallel operations P# in the previously received instruction is larger than 1, and since the number of parallel operations P# in the currently received instruction is different from the number of parallel operations in the previously received instruction, the stall signal generator 113 generates a stall signal. As a result, the instruction queue 117 issues a NOP instruction during the period of one basic cycle ΔTb.

The operation of the clock inverters 151 to 154 for generating the clock signals φ20 to φ23 depicted in FIG. 63 and the operation of the mode switching signal generators 161 to 163 for generating the mode switching signals CKEN20 to CKEN22 depicted in FIG. 63 will be described below.

As illustrated in FIG. 32, in the clock inverter 151 depicted in FIG. 21, the next state S is determined in such a manner that the state changes from "8" through to "11" in a cyclic fashion as long as the number of parallel operations remains at 2, i.e., as long as P#(0)=P#(−1)=2.

When P#(0) has changed to 4 with the number of parallel operations changing from 2 to 4, the next state S changes to "25" along the line indicated by reference numeral J3-1. Thereafter, as long as P#(0)=4 and P#(−1)=2, the state S remains at "25".

Figure 64:
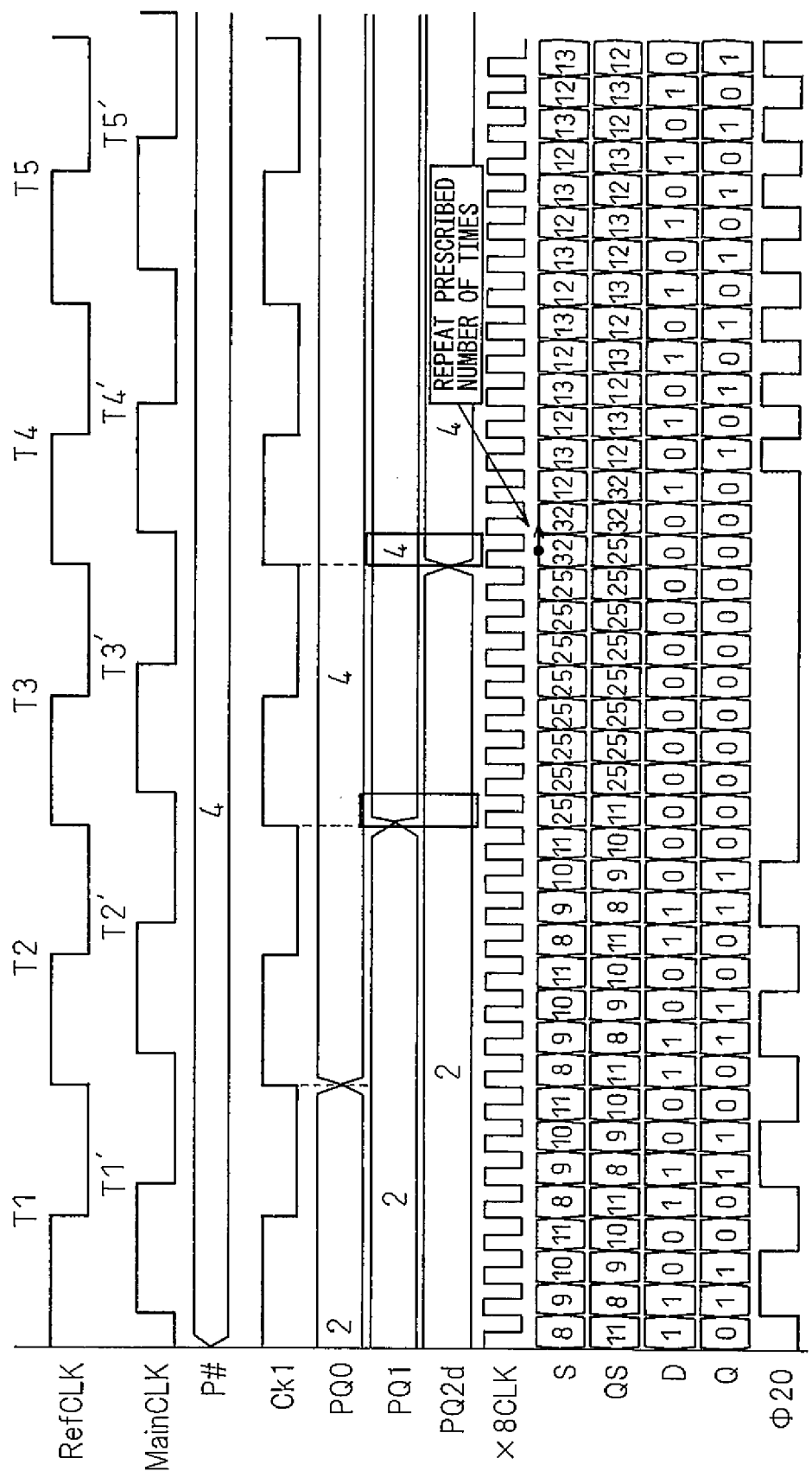
FIG. 64 is a timing chart illustrating the internal states of the clock inverter 151 when the number of parallel operations changes from 2 to 4.

When one basic cycle ΔTb has elapsed after P#(0) changed to 4, P#(−1) changes to 4. At this time, the next state S transitions to "32" along the line indicated by reference numeral J3-2. Then, after repeating the state "32" twice, the next state S transitions to "12" along the line indicated by reference numeral J3-3. Thereafter, the next state S alternates cyclically between states "12" and "13". FIG. 64 is a timing chart illustrating the internal states of the clock inverter 151 when the number of parallel operations changes from 2 to 4 as described above.

As illustrated in FIG. 34, in the clock inverter 152 depicted in FIG. 21, the next state S is determined in such a manner that the state changes from "8" through to "11" in a cyclic fashion as long as the number of parallel operations remains at 2.

When P#(0) has changed to 4, the next state S changes to "25" along the line indicated by reference numeral J3-1. Thereafter, as long as P#(0)=4 and P#(−1)=2, the state S remains at "25".

Figure 65:
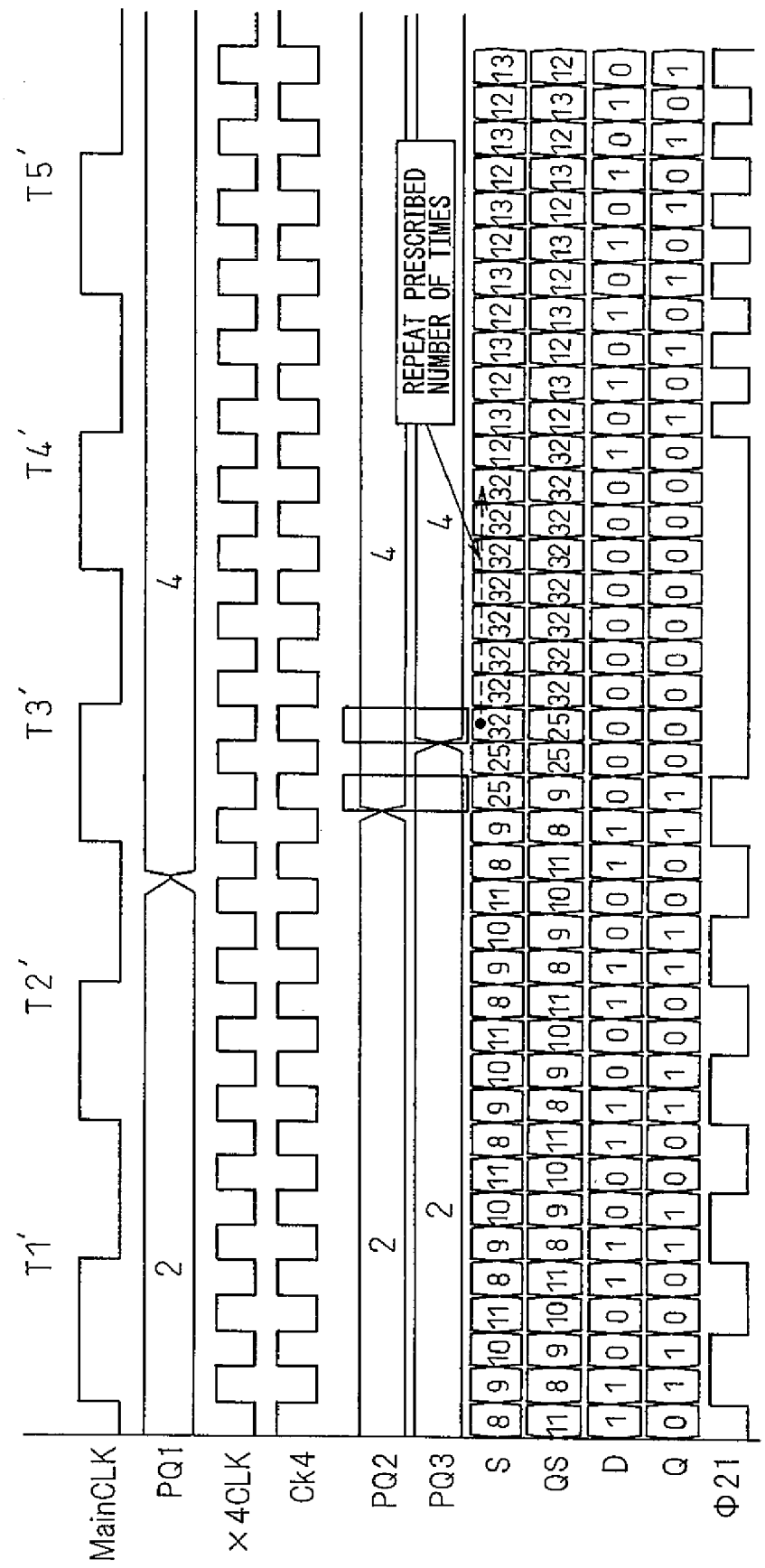
FIG. 65 is a timing chart illustrating the internal states of the clock inverter 152 when the number of parallel operations changes from 2 to 4.

When ΔTb/4 has elapsed after P#(0) changed to 4, P#(−1) changes to 4. At this time, the next state S transitions to "32" along the line indicated by reference numeral J3-2. Then, after repeating the state "32" eight times, the next state S transitions to "12" along the line indicated by reference numeral J3-3. Thereafter, the next state S alternates cyclically between states "12" and "13". FIG. 65 is a timing chart illustrating the internal states of the clock inverter 152 when the number of parallel operations changes from 2 to 4 as described above.

As illustrated in FIGS. 36 and 38, in the clock inverters 153 and 154 depicted in FIG. 21, the next state S is determined in such a manner that the state changes from "8" through to "11" in a cyclic fashion as long as the number of parallel operations remains at 2.

When P#(0) has changed to 4, the next state S changes to "25" along the line indicated by reference numeral J3-1. Thereafter, as long as P#(0)=4 and P#(−1)=2, the state S remains at "25".

Figure 66:
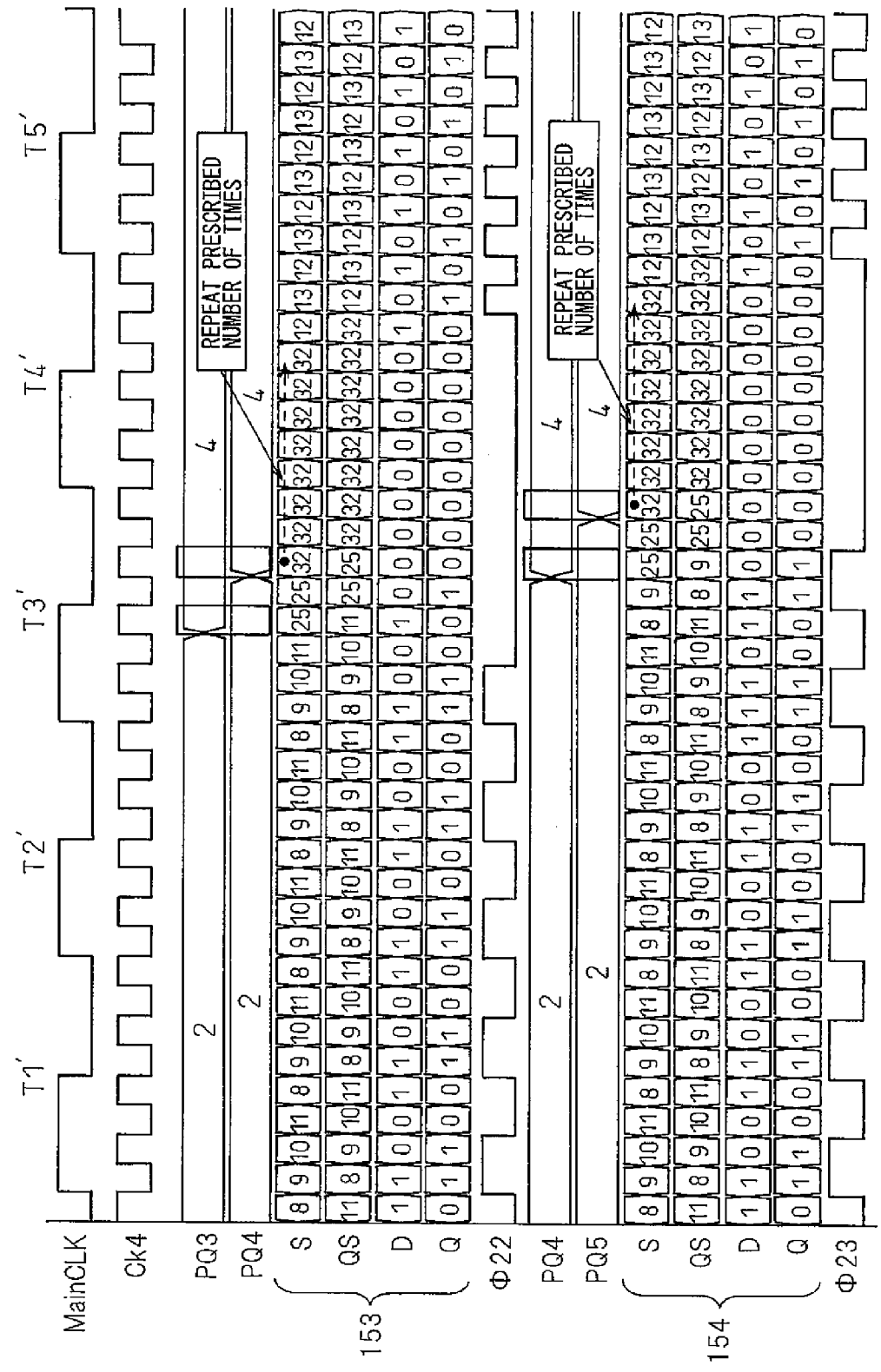
FIG. 66 is a timing chart illustrating the internal states of the clock inverters 153 and 154 when the number of parallel operations changes from 2 to 4.

When ΔTb/4 has elapsed after P#(0) changed to 4, P#(−1) changes to 4. At this time, the next state S transitions to "32" along the line indicated by reference numeral J3-2. Then, after repeating the state "32" eight times, the next state S transitions to "12" along the line indicated by reference numeral J3-3. Thereafter, the next state S alternates cyclically between states "12" and "13". FIG. 66 is a timing chart illustrating the internal states of the clock inverters 153 and 154 when the number of parallel operations changes from 2 to 4 as described above.

Figure 67:
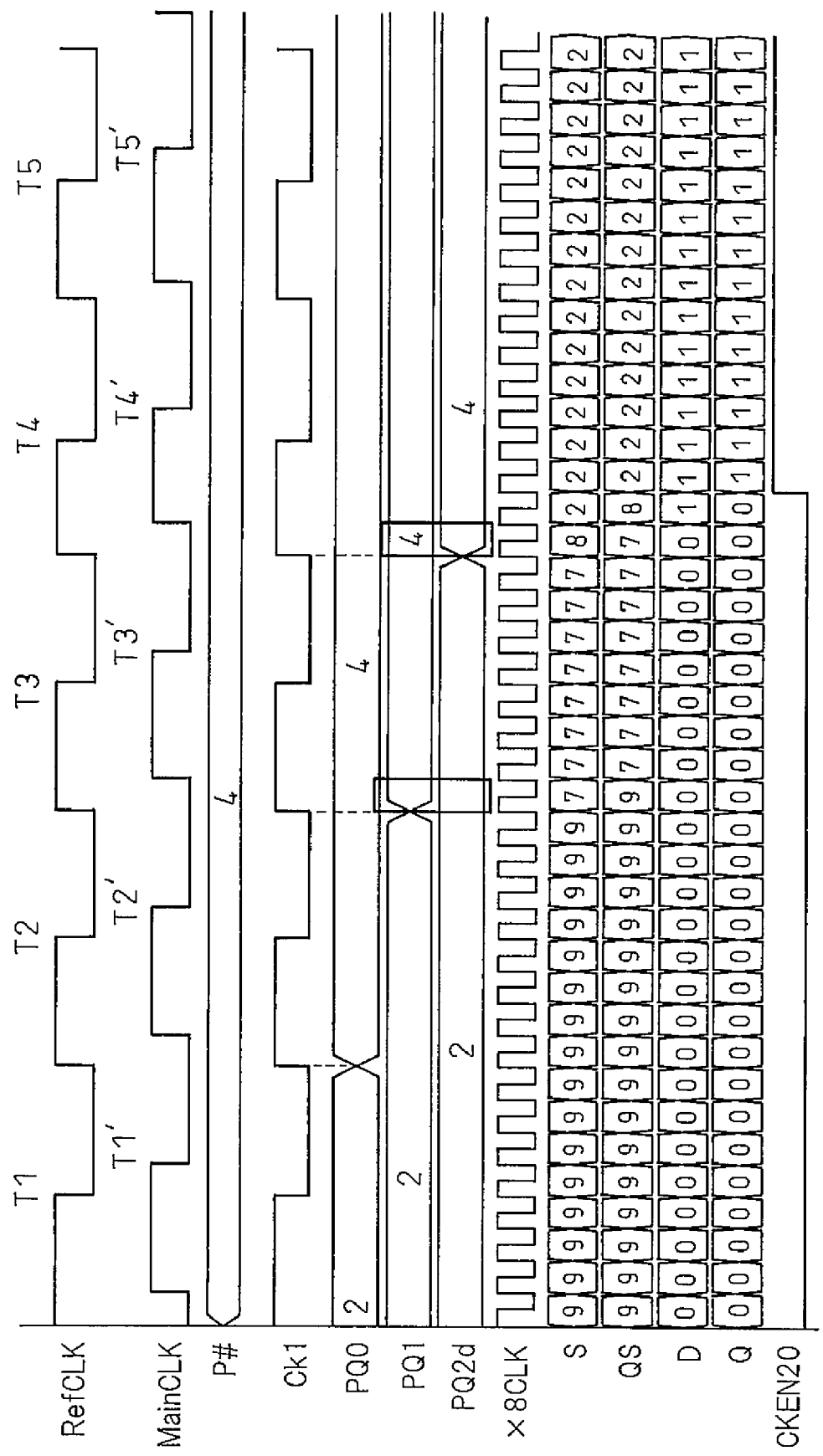
FIG. 67 is a timing chart illustrating the internal states of the mode switching signal generator 161 when the number of parallel operations changes from 2 to 4.

As illustrated in FIG. 40, in the mode switching signal generator 161 depicted in FIG. 21, the next state S remains at "9" as long as the number of parallel operations remains at 2, i.e., as long as P#(0)=P#(−1)=2. When P#(0) has changed to 4, the next state S changes to "7", and when P#(−1) has changed to 4, the next state first changes to "8" and then changes to "2". FIG. 67 is a timing chart illustrating the internal states of the mode switching signal generator 161 when the number of parallel operations changes from 2 to 4 as described above.

Figure 68:
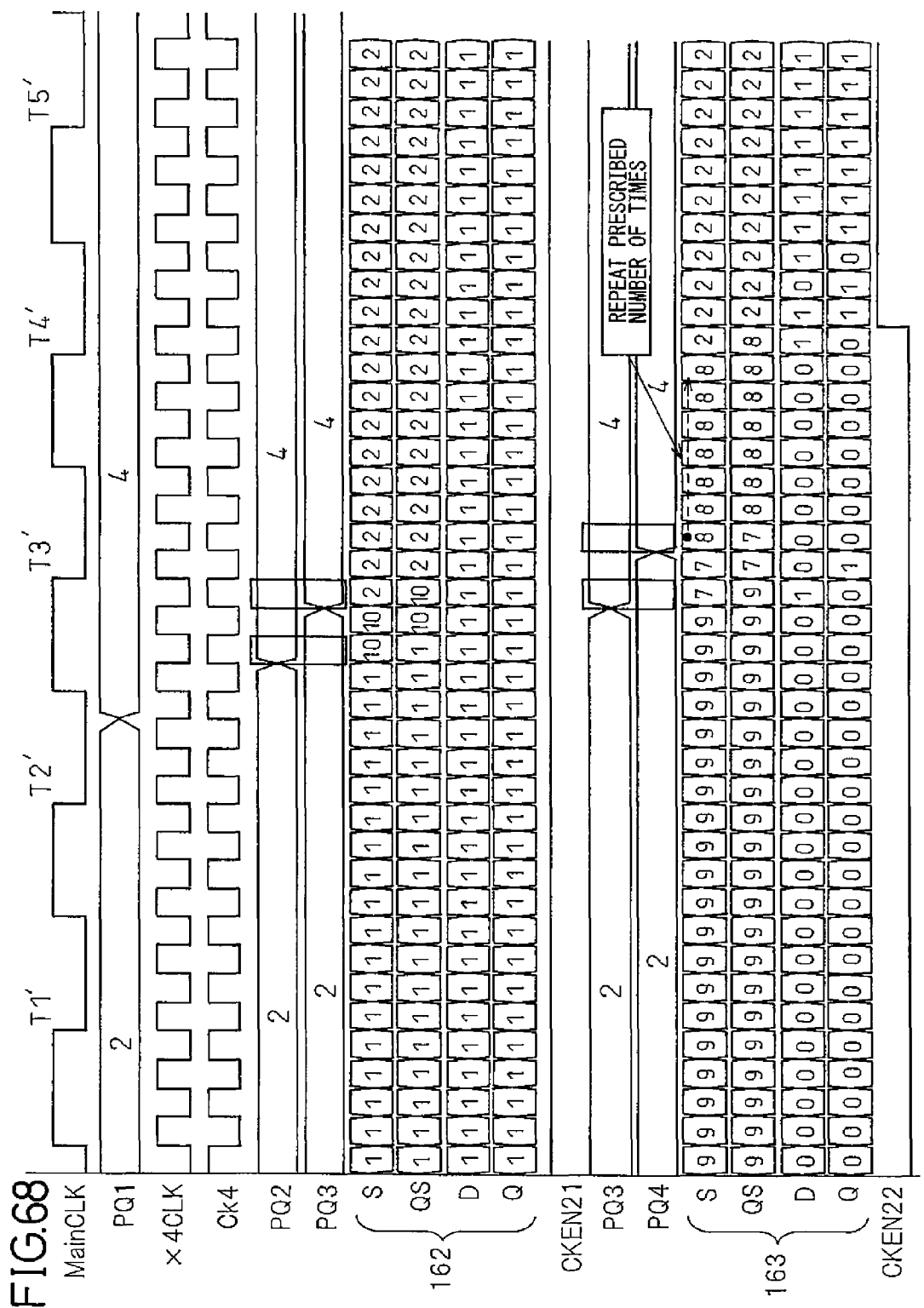
FIG. 68 is a timing chart illustrating the internal states of the mode switching signal generators 162 and 163 when the number of parallel operations changes from 2 to 4.

As illustrated in FIG. 42, in the mode switching signal generator 162 depicted in FIG. 21, the next state S remains at "1" as long as the number of parallel operations remains at 2. When P#(0) has changed to 4, the next state S changes to "10", and when P#(−1) has changed to 4, the next state changes to "2". FIG. 68 is a timing chart illustrating the internal states of the mode switching signal generator 162 when the number of parallel operations changes from 2 to 4 as described above.

As illustrated in FIG. 43, in the mode switching signal generator 163 depicted in FIG. 21, the next state S remains at "9" as long as the number of parallel operations remains at 2. When P#(0) has changed to 4, the next state S changes to "7", and when P#(−1) has changed to 4, the next state changes to "2" after repeating the state 8" seven times. The timing chart of FIG. 68 illustrates the internal states of the mode switching signal generator 163 when the number of parallel operations changes from 2 to 4 as described above.

As illustrated in FIG. 63, after the number of operations has changed from 2 to 4, the arithmetic-logic unit 17 completes all the operations contained in the instruction Com#3, whose number of parallel operations P# is 2, in cycle T3' during which the NOP instruction is received.

Then, in the subsequent cycles T4', etc., the arithmetic-logic unit 17 starts pipeline processing to execute in parallel the operations specified by the plurality of execution codes #4a to #4d and #5a to #5d generated by decoding the instructions Com#4 and Com#5 whose number of parallel operations P# is 4.

Figure 69:
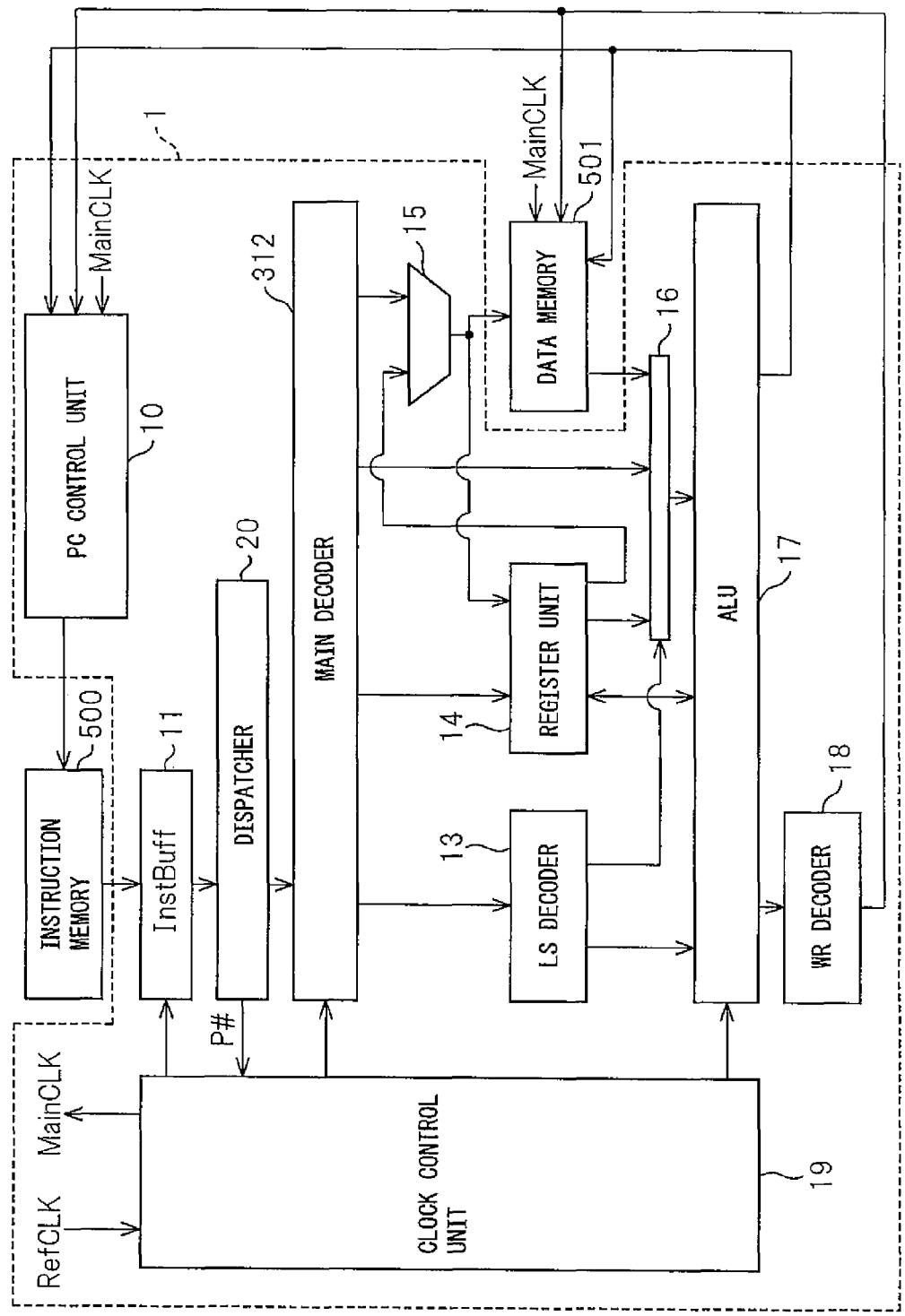
FIG. 69 is a diagram schematically illustrating the configuration of a superscalar processor according to an embodiment of the present invention.

FIG. 69 is a diagram schematically illustrating the configuration of a superscalar processor according to an embodiment of the present invention. The processor 1 includes, between the instruction buffer 11 and a main decoder 312, a dispatcher 20 which simultaneously issues a plurality of instructions to the main decoder 312 from among the instructions in the instruction buffer 11.

As illustrated, the processor 1 according to this embodiment is similar in configuration to the processor of the first embodiment described with reference to FIG. 10, and the same component elements are designated by the same reference numerals and will not be further described herein.

The dispatcher 20 is capable of dynamically changing the number of instructions to be simultaneously issued to the main decoder 312, and reports the number of simultaneously issued instructions as the number of parallel operations P# to the clock control unit 19.

Here, the main decoder 312 is configured so that N intermediate codes generated by decoding the N instructions simultaneously received from the dispatcher 20 can be output at intervals of ΔTb/4, just like the main decoder 12 depicted in FIG. 15 outputs N intermediate codes (N=1, 2, or 4) at intervals of ΔTb/4 when outputting the N intermediate codes generated from a single VLIW instruction. Further, the clock control unit 19 is configured to generate the clock signals Ckd, Cke, φ20 to φ23, etc., and the mode switching signals CKEN20 to CKEN22 in the same manner as the clock control unit depicted in FIG. 21.

By configuring the dispatcher 20, main decoder 312, and clock control unit 19 in this manner, the operations contained in the plurality of instructions simultaneously issued from the dispatcher 20 are executed in parallel by pipeline processing in the arithmetic-logic unit 17, just like the plurality of operations contained in the VLIW instruction are executed in parallel by the processor 1 depicted in FIG. 10.

While the present invention has been described in detail above with reference to the preferred embodiments, it should be understood by those skilled in the art that various modifications and changes can be made by anyone skilled in the art, and that all of such modifications and changes that come within the range of the true spirit and purpose of the present invention fall within the scope of the present invention as defined by the appended claims.

Industrial Applicability

The present invention is generally applicable to processors capable of parallel execution of a plurality of instructions. More particularly, the invention is applicable to a VLIW processor and a superscalar processor.

What is claimed is:

1. An arithmetic-logic unit for performing an operation of a prescribed bit length in an execution stage of a processor, comprising:

a plurality of sub-arithmetic-logic units which perform in respectively different pipeline stages sub-operations created by decomposing said operation of said prescribed bit length into N equal parts in a bit length direction (a divisor N is an integer not smaller than 2);

a plurality of pipeline registers provided so as to separate said pipeline stages from each other, wherein each of said pipeline registers operates in such a manner so as to be switchable between two operation modes, a flip-flop mode in which an output value is updated in synchronism with an input trigger and a transparent mode in which an input value is directly output; and a clock control unit comprising:

a clock inverter which supplies a clock signal to each of said sub-arithmetic-logic units and each of said pipeline registers, and a mode switching signal generator which supplies a mode switching signal to each of said pipeline registers; wherein said divisor N is changed dynamically so as to change the number of parallel execution of said operation dynamically.

2. The processor according to claim 1, wherein said clock control unit selects said divisor N according to the number of operations contained in an instruction fetched in a fetch stage of said processor.

3. The processor according to claim 1, further including a dispatcher for simultaneously issuing a plurality of operation instructions, and wherein said clock control unit selects said divisor N according to the number of operations simultaneously issued by said dispatcher.

4. A processor architecture for the processor according to claim 1, wherein said sub-operations to be performed by said sub-arithmetic-logic units are each of a bit length equal to said prescribed bit length divided by said divisor N, and wherein:

said processor is provided with a pipeline register control unit which switches the operation mode of each of said pipeline registers to either said flip-flop mode or said transparent mode, depending on the value of said divisor N; and said clock control unit drives said pipeline stages at an operating frequency having a cycle period equal in length to one-Nth of the period taken to execute one operation of said prescribed bit length.

5. The processor architecture according to claim 4, wherein said clock control unit selects said divisor N according to the number of operations contained in an instruction fetched in a fetch stage of said processor.

6. The processor architecture according to claim 4, wherein:

said processor is provided with further a dispatcher for simultaneously issuing a plurality of operation instructions; and said clock control unit selects said divisor N according to the number of operations simultaneously issued by said dispatcher.

* * * * *